(12) United States Patent
Rhee et al.

(10) Patent No.: US 11,314,898 B2
(45) Date of Patent: Apr. 26, 2022

(54) OPERATING METHOD OF ELECTRONIC DEVICE FOR FUNCTION EXECUTION BASED ON VOICE COMMAND IN LOCKED STATE AND ELECTRONIC DEVICE SUPPORTING THE SAME

(71) Applicant: SAMSUNG ELECTRONICS CO., LTD., Suwon-si (KR)

(72) Inventors: In Jong Rhee, Seongnam-si (KR); Sang Ki Kang, Suwon-si (KR); Sung Pa Park, Seoul (KR); Jang Seok Seo, Suwon-si (KR); Ji Soo Yi, Seoul (KR); Kook Tae Choi, Seongnam-si (KR); Han Jun Ku, Suwon-si (KR); Da Som Lee, Seoul (KR); Dong Ho Jang, Hwaseong-si (KR); Yong Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 606 days.

(21) Appl. No.: 15/906,144

(22) Filed: Feb. 27, 2018

(65) Prior Publication Data
US 2018/0247065 A1   Aug. 30, 2018

(30) Foreign Application Priority Data

Feb. 28, 2017   (KR) .................. 10-2017-0026705
Jun. 27, 2017   (KR) .................. 10-2017-0081506

(51) Int. Cl.
*H04L 29/06*       (2006.01)
*G06F 21/62*       (2013.01)
(Continued)

(52) U.S. Cl.
CPC ........ *G06F 21/629* (2013.01); *G06F 3/04883* (2013.01); *G06F 3/167* (2013.01);
(Continued)

(58) Field of Classification Search
CPC .... G06F 21/629; G06F 3/04883; G06F 3/167; G06F 21/32; G07C 9/27; G07C 9/257;
(Continued)

(56) References Cited

U.S. PATENT DOCUMENTS 8,811,948 B2   8/2014   Bandyopadhyay et al.
9,117,454 B2   8/2015   Ahn et al.
(Continued)

FOREIGN PATENT DOCUMENTS

KR   10-2013-0097442   9/2013
KR   10-2013-0133026   12/2013
(Continued)

OTHER PUBLICATIONS

Communication pursuant to Article 94(3) EPC dated Jun. 14, 2019 in counterpart European Patent Application No. EP 18159281.7.
(Continued)

*Primary Examiner* — Sarah Su
(74) *Attorney, Agent, or Firm* — Nixon & Vanderhye P.C.

(57) ABSTRACT

An operating method of an electronic device for function execution includes receiving an execution signal associated with executing a voice command function performed based on a voice input, confirming a locked state of an electronic device, and providing an entire function execution state in which access to the entire information stored in a memory is allowed or a partial function execution state in which access to a part of the information stored in the memory is allowed, based on the locked state in relation to executing a function corresponding to the voice input or outputting a result corresponding to the voice input.

17 Claims, 34 Drawing Sheets

(51) Int. Cl.
*G10L 15/22* (2006.01)
*G06K 9/00* (2022.01)
*G06F 3/16* (2006.01)
*G06F 3/04883* (2022.01)
*G06F 21/32* (2013.01)
*H04M 1/67* (2006.01)
*G07C 9/27* (2020.01)
*G07C 9/25* (2020.01)
*G07C 9/26* (2020.01)

(52) U.S. Cl.
CPC ......... *G06F 21/32* (2013.01); *G06K 9/00087* (2013.01); *G06K 9/00288* (2013.01); *G06K 9/00617* (2013.01); *G07C 9/257* (2020.01); *G07C 9/27* (2020.01); *G10L 15/22* (2013.01); *H04L 63/0861* (2013.01); *H04M 1/67* (2013.01); *G07C 9/26* (2020.01); *G10L 2015/223* (2013.01); *H04M 2250/74* (2013.01)

(58) Field of Classification Search
CPC .. G07C 9/26; G06K 9/00087; G06K 9/00288; G06K 9/00617; G10L 15/22; G10L 2015/223; H04L 63/0861; H04M 1/67; H04M 2250/74
See application file for complete search history.

(56) References Cited

U.S. PATENT DOCUMENTS

| | | | |
|---|---|---|---|
| 9,262,612 B2 | 2/2016 | Cheyer | |
| 9,521,247 B2 | 12/2016 | Bandyopadhyay et al. | |
| 9,619,200 B2 | 4/2017 | Chakladar et al. | |
| 9,852,278 B2 | 12/2017 | Ahn et al. | |
| 10,134,392 B2 | 11/2018 | Shima | |
| 10,587,742 B2 | 3/2020 | Cho et al. | |
| 11,127,405 B1* | 9/2021 | Antos | G10L 15/30 |
| 2009/0051649 A1 | 2/2009 | Rondel | |
| 2012/0009896 A1 | 1/2012 | Bandyopadhyay et al. | |
| 2012/0024594 A1 | 2/2012 | Guan | |
| 2012/0245941 A1 | 9/2012 | Cheyer | |
| 2013/0226591 A1 | 8/2013 | Ahn et al. | |
| 2013/0325484 A1 | 12/2013 | Chakladar et al. | |
| 2014/0379341 A1 | 12/2014 | Seo et al. | |
| 2015/0050916 A1 | 2/2015 | Bandyopadhyay et al. | |
| 2015/0051913 A1 | 2/2015 | Choi | |
| 2015/0074615 A1* | 3/2015 | Han | G06K 9/00033 715/863 |
| 2015/0340025 A1 | 11/2015 | Shima | |
| 2015/0363587 A1 | 12/2015 | Ahn et al. | |
| 2016/0119338 A1 | 4/2016 | Cheyer | |
| 2016/0140960 A1 | 5/2016 | Chae | |
| 2016/0259929 A1* | 9/2016 | Cash | G06Q 20/341 |
| 2017/0070606 A1 | 3/2017 | Bandyopadhyay et al. | |
| 2017/0153868 A1 | 6/2017 | Ahn et al. | |
| 2017/0162198 A1 | 6/2017 | Chakladar et al. | |
| 2017/0169199 A1* | 6/2017 | Clarke | G06F 3/038 |
| 2018/0260545 A1* | 9/2018 | Chen | G06F 3/0488 |
| 2018/0293975 A1 | 10/2018 | Shima | |

FOREIGN PATENT DOCUMENTS

| | | |
|---|---|---|
| KR | 10-2013-0133629 | 12/2013 |
| KR | 10-2015-0042637 | 4/2015 |
| KR | 2015-0033958 A | 4/2015 |
| KR | 10-1574243 B1 | 12/2015 |
| KR | 2016-0127614 A | 11/2016 |
| WO | 2007/142703 | 12/2007 |
| WO | WO 2013-137503 A1 | 9/2013 |
| WO | 2016/175396 | 11/2016 |

OTHER PUBLICATIONS

Extended Search Report dated Sep. 5, 2018 in counterpart European Patent Application 18159281.7.
Search Report dated Jun. 5, 2018 in counterpart International Patent Application No. PCT/KR2018/002361.
Written Opinion dated Jun. 5, 2018 in counterpart International Patent Application No. PCT/KR2018/002361.
Korean Office Action dated Jun. 28, 2021 for KR Application No. 10-2017-0081506.

* cited by examiner

OPERATING METHOD OF ELECTRONIC DEVICE FOR FUNCTION EXECUTION BASED ON VOICE COMMAND IN LOCKED STATE AND ELECTRONIC DEVICE SUPPORTING THE SAME

CROSS-REFERENCE TO RELATED APPLICATIONS

This application is based on and claims priority under 35 U.S.C. § 119 to a Korean patent application filed on Feb. 28, 2017 in the Korean Intellectual Property Office and assigned Serial number 10-2017-0026705 and a Korean patent application filed on Jun. 27, 2017 in the Korean Intellectual Property Office and assigned Serial number 10-2017-0081506, the disclosures of which are incorporated by reference herein in their entireties.

TECHNICAL FIELD

The disclosure relates to an electronic device for executing a user function using a voice command.

BACKGROUND

Modern electronic devices may support an input method using a user's speech, in addition to conventional input methods using a keyboard or a mouse. For example, electronic devices, such as smartphones or tablet PCs, may analyze a user's speech input based on a specific application (e.g., S-Voice, Siri, or the like) and may convert the speech into text or may perform a function corresponding to the speech. Furthermore, some electronic devices may normally remain in an always-on state for speech recognition so that the electronic devices may be awake or may perform functions, such as Internet surfing, telephone call, or SMS/e-mail reading, in response to a user's speech at any time.

In the related art, a voice command service (e.g., S-voice service) operation in a screen lock state is performed in the form in which a function execution result according to a voice command is simply output when the locked state is released. Accordingly, a user has to release a locked state every time the user applies a voice execution function to execute a function based on a voice command.

SUMMARY

The disclosure addresses at least the above-mentioned problems and/or disadvantages and provides at least the advantages described below. Accordingly, an aspect of the present disclosure provides a method for operating a voice execution function in a locked state and an electronic device supporting the same, in which the locked state is maintained or selectively released based on the type of voice execution function to address the inconvenience for control of the locked state and to enable a user to confirm a result of the voice execution function.

In addition, various example embodiments disclosed herein may adaptively provide a function execution result based on a voice command in a locked state.

According to various example embodiments of the disclosure, a result of a function executed based on a voice command in a locked state may be adaptively output based on the type of function. Various other effects may be provided according to various embodiments.

In accordance with an aspect of the disclosure, an electronic device is provided. The electronic device may include a housing including a first surface, a second surface opposite the first surface, and side surfaces, a touch screen display exposed through the first surface, a wireless communication circuit disposed inside the housing, an input button exposed through one of the side surfaces or the first surface, a microphone exposed through a surface of the housing, a processor disposed inside the housing and electrically connected with the wireless communication circuit, the input button, the microphone, and the touch screen display, and a memory disposed inside the housing and electrically connected with the processor and including an interactive application having a first user interface, wherein the memory stores at least one instruction which, when executed by the processor, causes the electronic device to maintain a locked state while a lock screen is being displayed on the touch screen display, to receive user authentication information through a biometric sensor in the locked state, to change the device state to an unlocked state while the lock screen is being output on the touch screen display, to execute the interactive application in response to a first user input received through the input button and/or the microphone, to receive a request through the touch screen display and/or the microphone after the receipt of the first input while the electronic device is unlocked, to transmit first data relating to the request to a server through the wireless communication circuit, to receive second data relating to at least one instruction from the server through the wireless communication circuit and to perform an action based on at least a part of the second data, and wherein the action includes at least one of: a first type function performed in the locked state of the electronic device, a second type function performed in a state in which a lock setting is released using the first user interface and the lock screen is displayed, a third type function set to instruct the use of the first user interface and requiring the execution of another application program, and a fourth type function set to change a home screen and automatically execute another application program.

In accordance with another aspect of the disclosure, an electronic device is provided. The electronic device may include a display, a memory configured to store at least one piece of information to be output on the display, an input unit comprising input circuitry configured to receive an input of an execution signal for executing a specified voice command function based on a voice input, and a processor electrically connected with the display, the input unit, and the memory, wherein the processor is configured to confirm a locked state of the electronic device when receiving the execution signal and the voice input associated with executing the voice command function, and to provide any one of: an entire function execution state in which access to the entire information stored in the memory is allowed and a partial function execution state in which access to a part of the information stored in the memory is allowed, based on the locked state in relation to executing a function corresponding to the voice input or outputting a result corresponding to the voice input.

In accordance with another aspect of the disclosure, an operating method for function execution based on a voice command in a locked state is provided. The method may include receiving an execution signal associated with executing a voice command function performed based on a voice input, confirming a locked state of an electronic device, and providing an entire function execution state in which access to the entire information stored in a memory is allowed or a partial function execution state in which access to a part of the information stored in the memory is allowed, based on the locked state in relation to executing a function corresponding to the voice input or outputting a result corresponding to the voice input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
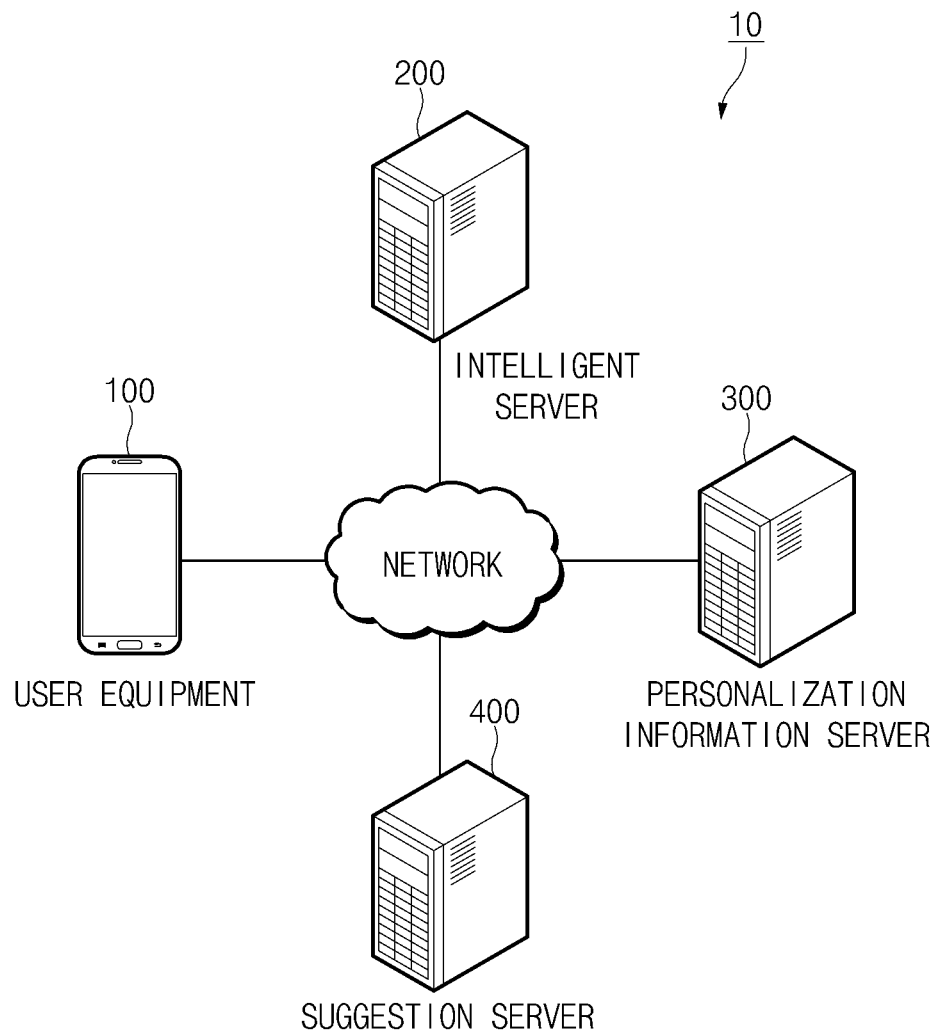
FIG. 1 is a diagram illustrating an example integrated intelligent system according to various embodiments of the present disclosure.

Various example embodiments of the present disclosure may be described with reference to accompanying drawings. Accordingly, those of ordinary skill in the art will recognize that modifications, equivalents, and/or alternatives on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used interchangeably with the expression "suitable for", "having the capacity to", "designed to", "adapted to", "made to", or "capable of". The term "configured to" must not refer only to "specifically designed to" in hardware. Instead, the expression "a device configured to" may refer to a situation in which the device is "capable of" operating together with another device or other components. CPU, for example, a "processor configured to perform A, B, and C" may refer, for example, and without limitation, to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the disclosure, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, or the like, but is not limited thereto.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like, but are not limited thereto.

According to another embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like), or the like, but are not limited thereto. In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a diagram illustrating an integrated intelligent system according to various embodiments of the present disclosure.

Referring to FIG. 1, an integrated intelligent system 10 may include user equipment 100, an intelligent server 200, a personalization information server 300, and a suggestion server 400. The user equipment 100 of the integrated intelligent system 10 may support limited use of a speech recognition function in a lock screen state (or a state in which a lock screen is displayed or a locked state). According to various embodiments, when using a limited speech recognition function in a lock screen state using a biometric signal (e.g., an iris or a fingerprint) as a second means for unlocking the lock screen, the user equipment 100 in the integrated intelligent system environment may prevent and/or reduce the possibility of an unlock not intended by the user to provide interface consistency and improve security of personal information.

The user equipment 100 may provide a necessary service to the user through an app (or an application program or an application) (e.g., an alarm, a message, a photo (gallery), or the like) stored in the user equipment 100. For example, the user equipment 100 may execute and operate another application through a speech recognition application (hereinafter, referred to as an app) stored in the user equipment 100. The user equipment 100 may receive, through the speech recognition app, a user input for executing and operating the other app. The user input may be received through various input circuitry, such as, for example, and without limitation, a physical button, a touch pad, a voice input, or the like. According to an embodiment, various types of terminal devices (or electronic devices), such as a mobile phone, a smartphone, a personal digital assistant (PDA), a notebook computer, or the like, which are connectable to the Internet, may correspond to the user equipment 100.

According to an embodiment, the user equipment 100 may receive the user's speech as a user input. The user equipment 100 may receive the user's speech and may generate a command to operate an app based on the user's speech. Accordingly, the user equipment 100 may operate the app using the command. In a lock screen state, the above-described user equipment 100 may partially or entirely perform the app execution operation depending on the command to operate the app.

The intelligent server 200 may receive a user voice input from the user equipment 100 through a communication network and may change the received voice input to text data. In another embodiment, the intelligent server 200 may generate (or select) a path rule based on the text data. The path rule may include information about an action (or operation) for performing the function of an app and information about parameters necessary for executing (or performing) the action. The path rule may include an operating sequence of the app. The user equipment 100 may receive the path rule, may select an application depending on the path rule, and may execute an operation included in the path rule in the selected application. The user equipment 100, when executing the application depending on the path rule, may partially or entirely execute the application according to various states relating to a lock screen (e.g., a locked state, an unlocked state, and a silent lock state in which lock is released by a simple input (e.g., a touch gesture)) and may output at least a part of the consequential execution screen on the lock screen or on an unlocked screen.

For example, the user equipment 100 may execute the operation and may display, on a display, a result (or an execution state) obtained by executing the operation. In another example, the user equipment 100 may execute the operation and may not display the operation execution result on the display according to settings. For example, the user equipment 100 may execute a plurality of operations and may display, on the display, only a part of results obtained by executing the plurality of operations. The user equipment 100 may display, for example, only a result obtained by executing the last operation on the display. In another example, the user equipment 100 may receive the user's input (e.g., the user's speech, touch, or the like) to display the operation execution result on the display.

The personalization information server 300 may include a database having user information stored therein. For example, the personalization information server 300 may receive user information (e.g., context information, app execution information, or the like) from the user equipment 100 and may store the received user information in the database. The intelligent server 200 may receive the user information from the personalization information server 300 through the communication network and may use the received user information to generate a path rule for a user input. According to an embodiment, the user equipment 100 may receive user information from the personalization information server 300 through the communication network and may use the received user information as information for managing a database.

The suggestion server 400 may include a database in which an introduction of a function or application in the user equipment 100 or information about a function to be provided is stored. For example, the suggestion server 400 may receive the user information of the user equipment 100 from the personalization information server 300 and may include a database for a function that the user is able to use. The user equipment 100 may receive the information about the function to be provided, from the suggestion server 400 through the communication network and may provide the information to the user.

That is, according to an embodiment, the integrated intelligent system 10 may receive the user's speech through the user equipment 100 as a user input, the intelligent server 200 may generate a path rule based on the user input, and the user equipment 100 may operate an app depending on the path rule. According to another embodiment, the user equipment 100 may include all or a part of functions of the intelligent server 200, the personalization information server 300, and the suggestion server 400. For example, the user equipment 100 may generate a path rule based on a user input to operate an app. According to another embodiment, the intelligent server 200, the personalization information server 300, and the suggestion server 400 may be implemented in one or more external devices.

Figure 2A:
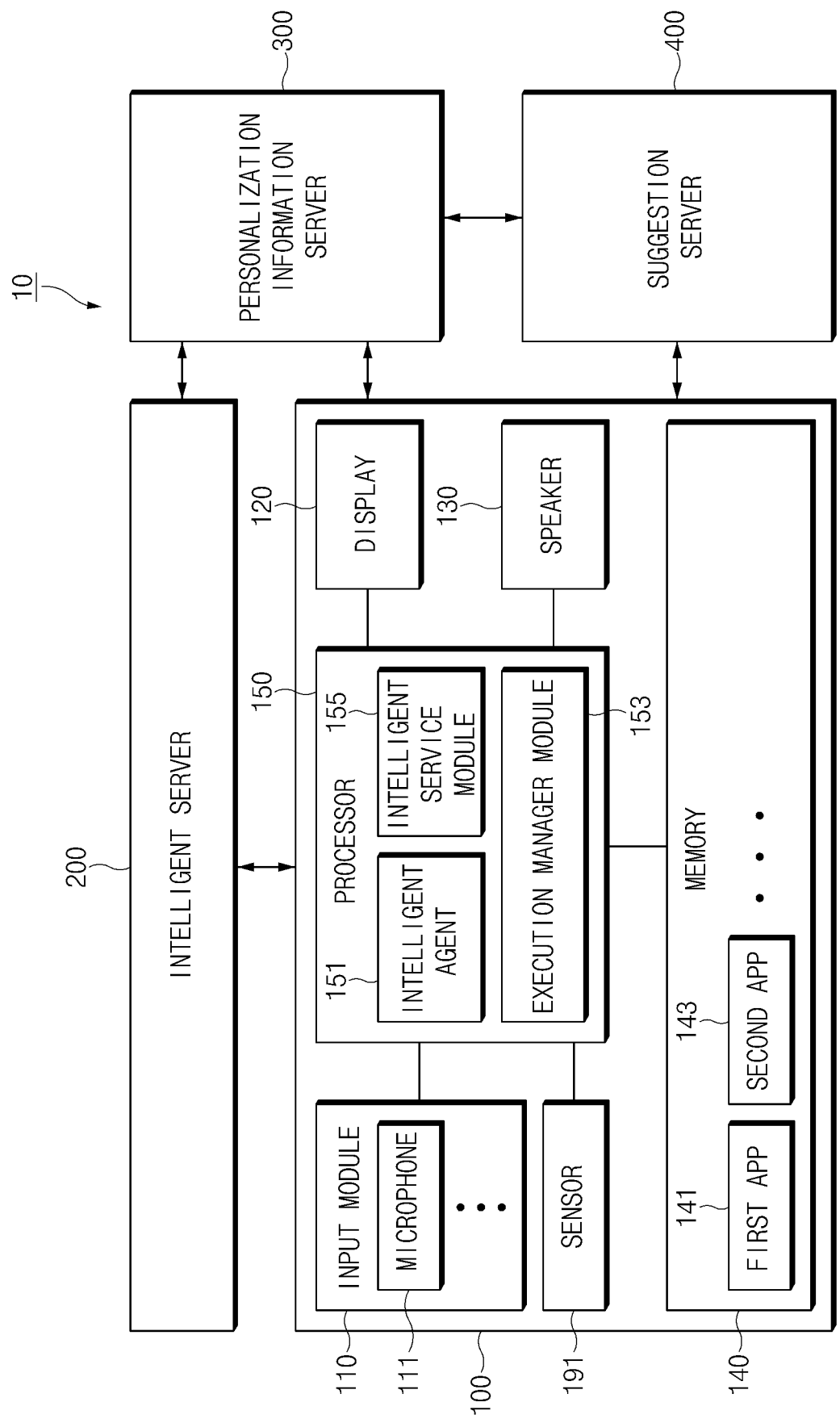
FIG. 2A is a block diagram illustrating an example of user equipment of an integrated intelligent system, according to an embodiment of the present disclosure.

FIG. 2A is a block diagram illustrating an example of user equipment of an integrated intelligent system, according to an embodiment of the present disclosure.

Referring to FIG. 2A, the integrated intelligent system 10 may include the user equipment 100, the intelligent server 200, the personalization information server 300, and the suggestion server 400.

The user equipment 100 may include an input module (e.g., including input circuitry) 110, a display 120, a speaker 130, a memory 140, a sensor 191, and a processor (e.g., including processing circuitry and/or program elements) 150. The user equipment 100 may further include a housing, and the elements of the user equipment 100 may be mounted in the housing or located on the housing. The housing may include a first surface, a second surface opposite the first surface, and side surfaces. At least a part of the display 120 (or the touch screen display) may be exposed through the first surface.

The input module 110 may include various input circuitry to receive a user input from a user. For example, the input module 110 may receive a user input from a connected external device (e.g., a keyboard, a headset, or the like). In another example, the input module 110 may include a touch screen (e.g., a touch screen display) combined with the display 120. In another example, the input module 120 may include a hardware key (or a physical key) located on the user equipment 100 (or the housing of the user equipment 100). An input button included in the input module 110 may be exposed through one of the side surfaces or the first surface of the housing.

According to an embodiment, the input module 110 may include a microphone 111 for receiving the user's speech as a voice signal. For example, the input module 110 may include a speech input system and may receive the user's speech as a voice signal through the speech input system. The microphone 111 may be exposed through one surface of the housing.

The display 120 may display an image, a video, and/or an execution screen of an application. For example, the display 120 may display a graphic user interface (GUI) of an app. According to an embodiment, the display 120 may, for example, and without limitation, be a touch screen display combined with a touch screen.

The speaker 130 may output a voice signal. For example, the speaker 130 may output a voice signal generated in the user equipment 100 to the outside.

The memory 140 may store a plurality of apps 141 and 143. The plurality of apps 141 and 143 stored in the memory 140 may be selected, executed, and operated according to a user input. For example, the memory 140 may include a non-volatile memory (e.g., a flash memory, a hard disk, or the like) and a volatile memory (e.g., a random access memory (RAM)), and the plurality of apps 141 and 143 may be stored in the non-volatile memory and may be loaded into the volatile memory to operate. The memory 140 may be located inside the housing and electrically connected to the processor 150 and may include (or store) a user interactive application (e.g., an application, the function of which is at least partly performed by a user input) that has a first user interface. The memory 140 may store one or more instructions associated with executing the operation of the processor 150.

According to an embodiment, the memory 140 may include a database for storing information necessary for recognizing a user input. For example, the memory 140 may include a log database for storing log information. In another example, the memory 140 may include a persona database for storing user information.

The processor 150 may include various processing circuitry and control an overall operation of the user equipment 100. For example, the processor 150 may control the input module 110 to receive a user input. The processor 150 may control the display 120 to display an image. The processor 150 may control the speaker 130 to output a voice signal.

The processor 150 may control the memory 140 to import or store necessary information. The processor 150 may be located inside the housing and may be electrically connected with a communication circuit (or a wireless communication circuit), the input button, the microphone 111, and the display 120.

According to an embodiment, the processor 150 may include various processing circuitry and/or program elements such as, for example, and without limitation, an intelligent agent 151, an execution manager module 153, and an intelligent service module 155. According to an embodiment, the processor 150 may execute instructions stored in the memory 140 to drive the intelligent agent 151, the execution manager module 153, and the intelligent service module 155. Modules mentioned in various embodiments of the present disclosure may be implemented with hardware or software. Operations performed by the intelligent agent 151, the execution manager module 153, and the intelligent service module 155 in various embodiments of the present disclosure may be understood as being performed by the processor 150.

The intelligent agent 151 may generate an instruction to operate an app based on a voice signal received as a user input. The execution manager module 153 may receive the generated instruction from the intelligent agent 151 to select, execute, and operate the apps 141 and 143 stored in the memory 140. The intelligent service module 155 may manage the user's information and may use the information to process a user input.

According to an embodiment, the processor 150 may operate according to instructions stored in the memory 140. For example, the processor 150 may control the equipment 100 by executing the instructions stored in the memory 140.

The sensor 191 may include various sensors and/or sensing circuitry, such as, for example, and without limitation, at least one of, for example, an iris recognition sensor, a fingerprint recognition sensor, an RGB camera sensor, and a location information collection sensor. The iris recognition sensor may include a light-emitting part that outputs light in a specified wavelength range and a light-receiving part that receives the light in the specified wavelength range and recognizes an iris. The fingerprint recognition sensor may be disposed in at least an area of the user equipment 100. For example, the fingerprint recognition sensor may be disposed in a home button of the user equipment 100, a side button (e.g., a physical button or an input unit disposed in relation to the execution of a voice command function) of the user equipment 100, or at least an area of the display 120. Accordingly, a fingerprint recognition function may be performed in the case where the user presses the home button, presses the side button allocated in relation to the execution of the voice command function (or a user interactive application), or touches the area of the display 120. The RGB camera sensor may obtain an image of a specified subject using visible light. For example, the RGB camera sensor may be activated to obtain an image of the user's face and transmit the image to the processor 150 while the user is pressing a specified input button (e.g., a home button, a side button, or the like).

The above-described user equipment 100 may adaptively perform at least a part of a voice command function in a locked state (e.g., a state in which a lock screen is output). For example, the user equipment 100 may provide an entire function execution state (e.g., a state in which the user equipment 100 executes a function with access to all information stored in the memory 140) for the voice command function in the locked state. According to an embodiment, the user equipment 100 may provide the entire function execution state for the voice command function in an unlocked state. In this regard, the processor 150 of the user equipment 100, when requested to execute the voice command function, may collect a voice command and simultaneously confirm whether the user equipment 100 is in a locked state at present. The processor 150 may differently execute a function according to the voice command depending on whether the user equipment 100 is in a locked state. In the following description, the voice command function may include at least one of a function of recognizing a user voice input, a function of executing at least one application of the user equipment 100 based on the recognized contents, a function of executing at least one action (e.g., a unit for executing a function of the user equipment 100 for each of the recognized contents), and a function of outputting results (e.g., answers) corresponding to the recognized contents.

In regard to the action, according to various embodiments, the voice command function may include at least one of a first action of detecting a photo taken in Hawaii, among photos stored in a gallery, based on location information stored in the photos if a voice input "send my mother a photo taken in Hawaii" is collected from a user, a second action of detecting address information relating to the mother from phonebook information, a third action of executing a message application, a fourth action of entering "mother" in the recipient address field of the message application and specifying the photo taken in Hawaii as an attached file in the corresponding message application, and a fifth action of sending the corresponding message. While performing the above-described actions, the user equipment 100 may output a user interface corresponding to at least one action (e.g., an execution screen of the corresponding action) on the display 120.

The user equipment 100 according to various embodiments may execute all or a part of the plurality of actions based on at least one of whether the user equipment is in a locked state, the type of locking, whether authentication is completed, the type of authentication, the current location, and the type of action in the state in which the user equipment 100 is configured to perform the plurality of actions according to a user voice input. According to an embodiment, the user equipment 100 may partially or entirely execute an application to be executed according to a user voice input, depending on whether the user equipment is in a locked state, the type of locking, or the like.

According to various embodiments, the user equipment 100 may partially or entirely output a result (e.g., text, an image, audio information, or the like) to be output according to a user voice input, depending on whether the user equipment is in a locked state, the type of locking, or the like. Accordingly, in the following description, an "entire function execution state" may include, for example, and without limitation, any one of a state of executing a function with access to all information stored in a memory, a state of executing the entirety of at least one action to be executed according to a user input, a state of executing the entirety of at least one application, and a function execution state of outputting all results to be output. A "partial function execution state" may include at least one of a state of executing a function with access to some information stored in a memory, a state of executing a part of at least one action to be executed according to a user input, a state of executing a part of at least one application, and a function execution state of outputting a part of results to be output.

Partial function execution of an application may include, for example, deferring the execution of a function for which security is available. Here, the partial function may include a gallery function, a schedule function, an e-mail function, or the like for which security processing is required when entrance is made. If the user equipment 100 is requested to activate the gallery function, the schedule function, or the e-mail function, the user equipment 100 may not output a function execution screen of a specified application on the display 120 and may output execution screens of the corresponding functions on the display 120 in the case where a locked state is released.

Figure 2B:
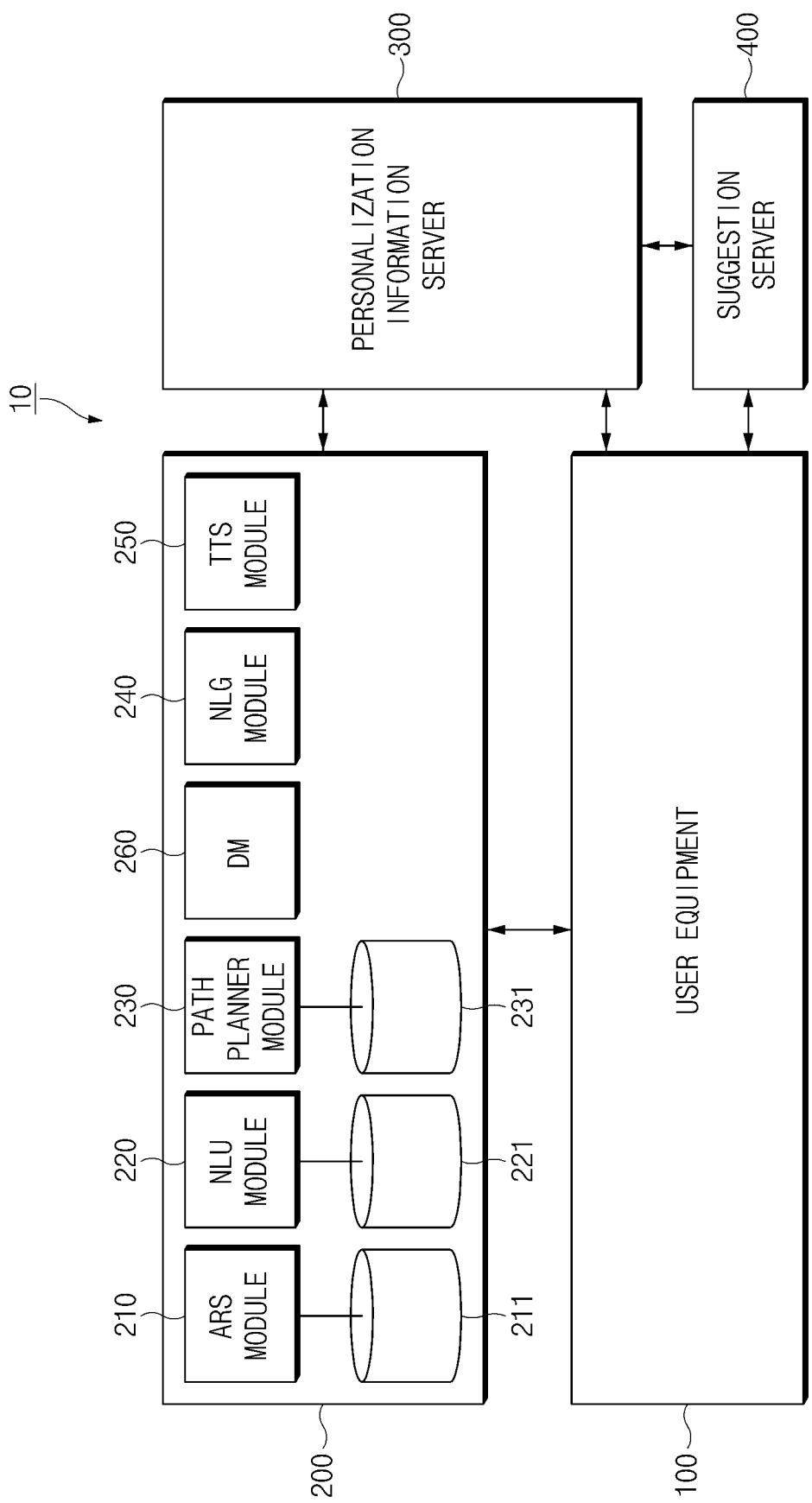
FIG. 2B is a block diagram illustrating an example of an intelligent server of an integrated intelligent system, according to an embodiment of the present disclosure.

FIG. 2B is a block diagram illustrating an example of an intelligent server of an integrated intelligent system, according to an embodiment of the present disclosure.

Referring to FIG. 2B, the intelligent server 200 may include an automatic speech recognition (ASR) module (e.g., including various processing circuitry and/or program elements) 210, a natural language understanding (NLU) module (e.g., including various processing circuitry and/or program elements) 220, a path planner module (e.g., including various processing circuitry and/or program elements) 230, a natural language generator (NLG) module (e.g., including various processing circuitry and/or program elements) 240, a text to speech (TTS) module (e.g., including various processing circuitry and/or program elements) 250, and a dialogue manager (DM) module 260.

The automatic speech recognition module 210, the natural language understanding module 220 (coupled to database 221), and the path planner module 230 (coupled to database 231) of the intelligent server 200 may generate a path rule.

According to an embodiment, the automatic speech recognition (ASR) module 210 may convert a user input received from the user equipment 100 into text data.

According to an embodiment, the automatic speech recognition module 210 may include a speech recognition module. The speech recognition module may include an acoustic model and a language model. For example, the acoustic model may include information relating to vocalization, and the language model may include unit phoneme information and information about a combination of the unit phoneme information. Furthermore, the language model may select a part of the unit phoneme information, or may assign a weighting value to a part of the unit phoneme information, based on surroundings (e.g., location, peripheral device information, and the like), service conditions (e.g., an app status, a previous inquiry history, and the like), and the like. The speech recognition module may convert a user's speech into text data using information relating to vocalization and unit phoneme information. Information about the acoustic model and the language model may be stored in, for example, an automatic speech recognition database 211.

According to an embodiment, the intelligent server 200 may further include a speaker recognition module. The speaker recognition module may recognize a speaker by analyzing a user's speech based on user information stored in a database. The speaker recognition module may generate a speaker recognition model based on speech input by the user for the first time and may store the generated speaker recognition model in the database. According to an embodiment, based on the speaker recognition model, the speaker recognition module may determine whether the user is a speaker registered in the model. For example, the speaker recognition module may perform all functions corresponding to the user's input in the case where the user is determined to be a registered speaker. In another example, the speaker recognition module may perform only a limited function of a user input in the case where the user is determined to be an unregistered speaker. According to an embodiment, the speaker recognition module may be used as a method for activating speech recognition (wakeup recognition). For example, the speaker recognition module may determine whether speech is a registered speaker's speech and may perform speech recognition or natural language processing on the registered speaker's speech.

According to an embodiment, the natural language understanding module 220 may discern user intent by performing a syntactic analysis and a semantic analysis. The syntactic analysis may divide a user input into syntactic units (e.g., a word, a phrase, a morpheme, and the like) and may discern syntactic elements of the units. The semantic analysis may be performed using semantic matching, rule matching, formula matching, or the like. Accordingly, the natural language understanding module 220 may obtain a domain and intent corresponding to a user input and a parameter (or slot) required to represent the intent, based on at least one of the syntactic analysis and the semantic analysis.

For example, the natural language understanding module 220 may discern user intent by matching a domain, intent, and a parameter to each case using a matching rule included in a rule-based algorithm. According to an embodiment, the path planner module 230 may generate a path rule using the user intent discerned by the natural language understanding module 220. The path planner module 230 will be described below in detail.

According to an embodiment, the natural language generator (NLG) module 240 may change specified information to text. The text form may be the form of natural language speech. The specified information may be, for example, information for an additional input, information for notifying of completion of an operation, or the like. The information changed in the form of text may be transmitted to the user equipment 100 and may be displayed on the display 120, or may be transmitted to the text to speech module 250 and may be changed in the form of speech.

According to an embodiment, the text to speech module 250 may change information in the form of text to information in the form of speech. The text to speech module 250 may receive information in the form of text from the natural language generator module 240, may change the information in the form of text to information in the form of speech, and may transmit the changed information to the user equipment 100. The user equipment 100 may output the information in the form of speech to the speaker 130.

Hereinafter, various embodiments of voice command based function execution associated with a lock screen state of the electronic device 100 will be described with reference to FIGS. 3 to 18B.

Figure 3:
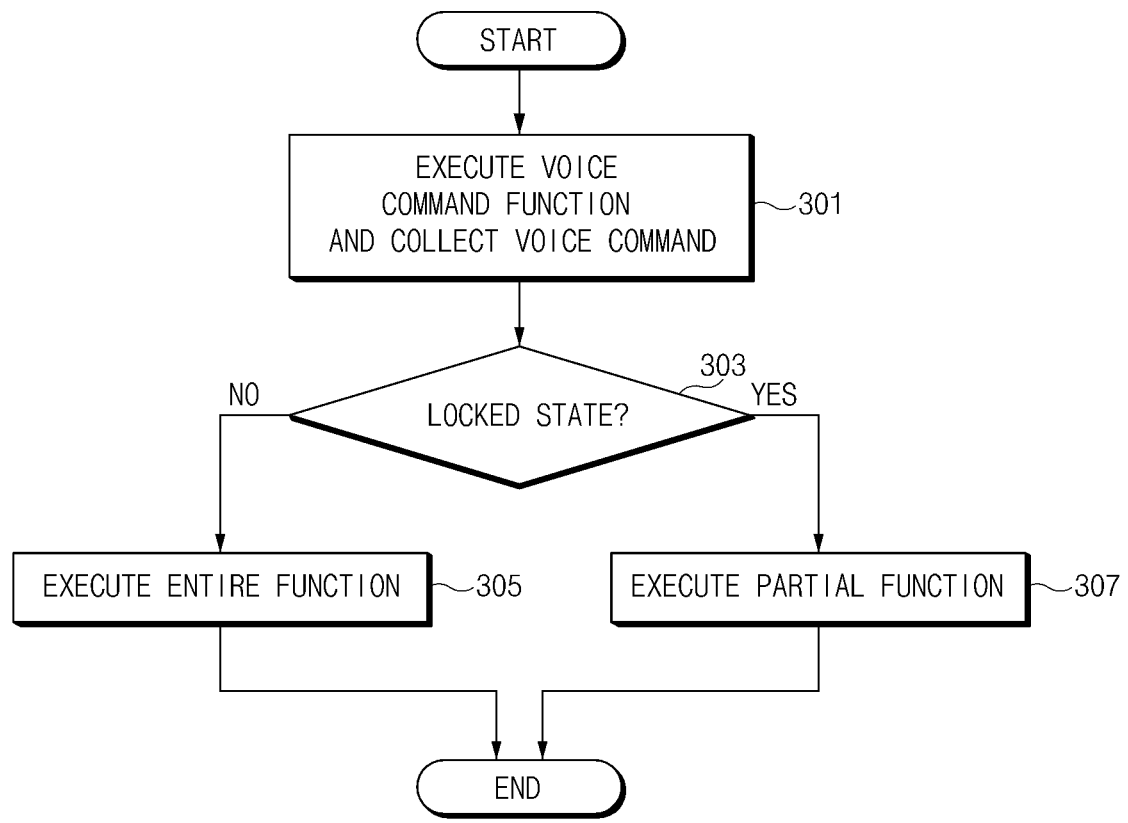
FIG. 3 is a flowchart illustrating an example of an operating method of an electronic device depending on a locked state, according to an embodiment of the present disclosure.

FIG. 3 is a flowchart illustrating an example of an operating method of an electronic device depending on a locked state, according to an embodiment of the present disclosure.

Referring to FIG. 3, in an operating method of an electronic device (e.g., the user equipment 100) depending on a locked state, a processor (e.g., the processor 150) of the electronic device may, in operation 301, execute a voice command function and collect a voice command. In this regard, the electronic device may allocate at least one physical button to execute the voice command function, or may provide a state for recognizing a specified user voice input (e.g., "Hi, Galaxy", "Hi, Bixby", or the like) to execute the voice command function. In regard to the recognition of the user voice input, the processor 150 may provide a state (e.g., an always-on state) in which a microphone is always turned on, and may determine whether a voice input collected by the microphone corresponds to the specified voice input for executing the voice command function. If an event associated with executing the voice command function (e.g., an input signal for selecting the physical button allocated to execute the voice command function or a user voice input for requesting the execution of the voice command function) occurs, the processor 150 may, in operation 303, determine whether the electronic device is in a locked state. In the case where there is no lock setting (e.g., in the case where a lock setting is not made, or in the case where a lock setting is released), the processor 150 may, in operation 305, execute the entire function according to the collected voice command. According to an embodiment, the processor 150 may turn on the display 120 and may output a result corresponding to the collected voice command on the display 120. In another embodiment, the processor 150 may turn on the display 120 and may sequentially output action execution screens on the display 120 while executing a plurality of actions corresponding to the collected voice command.

In the case where there is a lock setting, the processor 150 of the electronic device may, in operation 307, output a part of the result according the collected voice command on the display 120. According to an embodiment, the processor 150 may output, on the display 120, results obtained by performing some of the plurality of actions according to the collected voice command. According to another embodiment, the processor 150 may store and manage, in the memory 140, a function execution screen of an application according to the collected voice command without outputting the function execution screen on the display 120 and may provide information that the function execution screen is to be output when the locked state is released (e.g., may output a pop-up window or a message to make a request to release the locked state).

In performing the above-described operation, the electronic device may maintain a sleep state (e.g., a state in which the display 120 is turned off) before the execution of the voice command function while executing an always-on function of at least one microphone using a low-power processor. When an input event associated with executing the voice command function occurs, the electronic device may activate a main processor and may output a lock screen on the turned-on display 120. A result according to partial function execution or at least one object corresponding to the partial function execution may be included in the lock screen.

According to various embodiments, the electronic device may determine whether user authentication is completed, at the time when the user voice input ends after the voice command function is called (or executed). At the time when the user voice input ends, the electronic device may determine whether a locked state is released or maintained. In the case where the locked state is released according to the completion of the user authentication, the electronic device may access all applications to be performed according to the user voice input and information stored in the electronic device to provide entire function execution (or full service). In the case where the locked state is not released since the user authentication is not completed at the time when the user voice input ends, the electronic device may provide a limited service that is to be provided in the locked state (e.g., a state in which a lock screen is output), or may output a user interface (UI) to request a user to release the locked state. After providing the additional UI to request the user to release the locked state, the electronic device may access all information stored in the electronic device to provide a full service if the locked state is released by receiving authentication information according to a user input. In the case where the locked state is released while a user voice input is being collected, the electronic device may provide a screen for performing a plurality of actions according to the execution of the voice command function.

Figure 4:
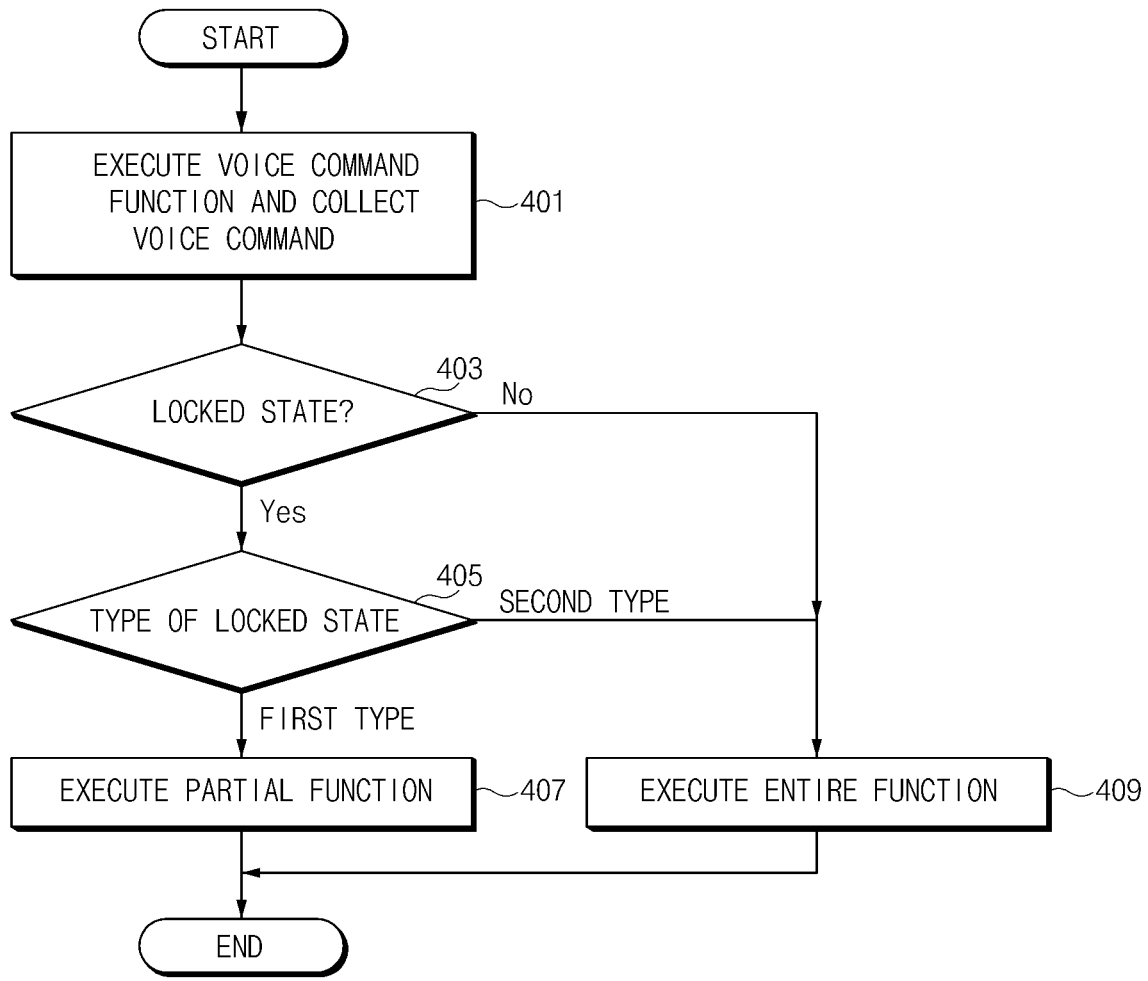
FIG. 4 is a flowchart illustrating an example of an operating method of an electronic device depending on the type of locked state, according to an embodiment of the present disclosure.

FIG. 4 is a flowchart illustrating an example of an operating method of an electronic device depending on the type of locked state, according to an embodiment of the present disclosure.

Referring to FIG. 4, in regard to an operating method of an electronic device depending on the type of locked state, the processor 150 of the electronic device may, in operation 401, execute a voice command and collect a voice command by which an input event for requesting the execution of a voice command function occurs. In this regard, if the input event for requesting the execution of the voice command function occurs, the processor 150 may activate a microphone and may collect a user voice input. According to an embodiment, the processor 150 may maintain the microphone in an always-on state to collect a user voice input for requesting the execution of the voice command function and the execution of a specified function.

In operation 403, the processor 150 may determine whether the electronic device is in a locked state. In the case where the electronic device is in a locked state, the processor 150 may, in operation 405, determine the type of locked state. In the case where the locked state is of a first type, the processor 150 may, in operation 407, execute a part of a function according to the user voice input (e.g., the collected voice command). For example, if a lock setting requiring unlock through completion of user authentication has been made, the processor 150 may execute only a part (or a partial function) of the function according to the user voice input.

In the case where the locked state is of a second type different from the first type, the processor 150 may, in operation 409, execute the entire function according to the user voice input. For example, if a lock screen requiring a specified touch event or a physical key input event for screen protection has been output, the processor 150 may execute the entire function according to the user voice input. In the case where the determination result in operation 403 shows that the electronic device is not in a locked state, the processor 450 may, in operation 409, execute the entire function according to the user voice input.

Figure 5:
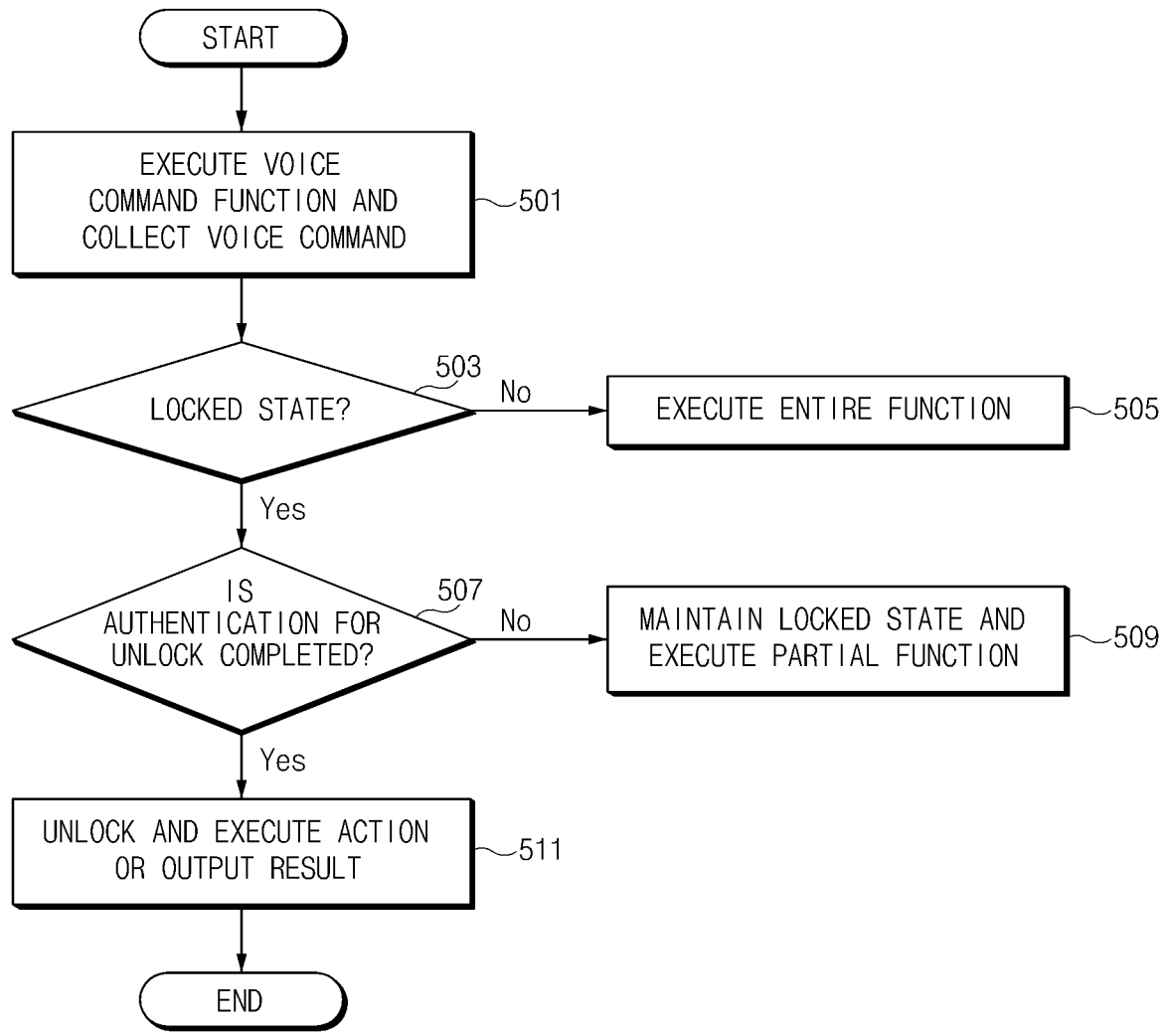
FIG. 5 is a flowchart illustrating an example of an operating method of an electronic device depending on unlock, according to an embodiment of the present disclosure.

FIG. 5 is a flowchart illustrating an example of an operating method of an electronic device depending on unlock, according to an embodiment of the present disclosure.

Referring to FIG. 5, in regard to an operating method of an electronic device depending on unlock, the processor 150 may, in operation 501, execute a voice command function and collect a voice command. In this operation, the processor 150 may perform the same operation as, or an operation similar to, the operation of executing the voice command function and collecting the voice command, which has been described with reference to FIG. 3 or 4.

If the processor 150 is requested to execute the voice command function or a specified voice command is collected, the processor 150 may, in operation 503, determine whether the electronic device is in a locked state. In the case where the electronic device is not in a locked state, the processor 150 may, in operation 505, execute the entire function according to the user voice input (or the collected voice command).

In the case where the electronic device is in a locked state, the processor 150 may, in operation 507, determine whether authentication for unlock is completed. In this regard, the processor 150 may, for example, collect a user's fingerprint information and may compare the collected fingerprint information with fingerprint information stored in advance. According to an embodiment, the processor 150 may, for example, collect the user's iris information and may compare the collected iris information with iris information stored in advance. According to another embodiment, the processor 150 may, for example, collect at least one of user face information, user fingerprint information, and a specified password and may compare the collected information with information stored in advance.

In the case where the authentication for unlock is not completed or fails, the processor 150 may, in operation 509, maintain the locked state and execute a partial function. Accordingly, the processor 150 may output, on a lock screen, a result according to the execution of the partial function, at least a part of a function execution screen, or a specified screen.

According to various embodiments, in the case where the locked state is released during the partial function execution in which only a part of a specified function (or an app execution rule) is performed in response to user speech, the processor 150 may provide information maintained in the locked state, through an unlock screen. According to an embodiment, if the lock screen is unlocked while the lock screen is being output and information according to the execution of the partial function is being displayed, the processor 150 may output the information according to the execution of the partial function on a lock-screen unlock screen (e.g., a standby screen, a home screen, or a specified application execution screen). Alternatively, the processor 150 may change the phase (or the screen state) from the partial function execution to the entire function execution and may output information according to the entire function execution (e.g., including the information according to the partial function execution) on the unlock screen.

In the case where the authentication for unlock is completed, the processor 150 may, in operation 511, unlock and execute an action or output a result. For example, the processor 150 may unlock the lock screen and may output a result according to the user voice input on a specified screen (e.g., a standby screen, a home screen, or the like configured to be output when unlock is executed). According to an embodiment, the processor 150 may unlock the lock screen and may sequentially output action execution screens on the display 120 while executing a plurality of actions according to the user voice input.

According to various embodiments, if the processor 150 is requested to execute a voice command function, the processor 150 may automatically perform an iris recognition function or a fingerprint recognition function to complete authentication and then may maintain a silent unlock state (e.g., a state in which a lock screen is releasable by a specified simple input (e.g., a touch drag or a long press)). To automatically perform the recognition function, a fingerprint sensor may be disposed in an input button associated with executing the voice command function, and the processor 150 may automatically perform fingerprint recognition based on the fingerprint sensor when the corresponding button is pressed. Alternatively, if an input (e.g., an input button or speech corresponding to a specified word or sentence) associated with executing the voice command function is received to automatically perform a recognition function, the processor 150 may automatically activate an iris sensor and may perform a recognition function by tracking the user's iris, obtaining an image, and comparing the iris information with iris information stored in advance.

The processor 150 may allow a silent unlock function to be selected through a lock screen setting screen. Accordingly, in the case where silent unlock is set, the processor 150 may output a silent unlock screen (e.g., a screen in which a lock screen and locking are releasable by a simple input) on the display 120 even though authentication is performed in a locked state. At least a part of the partial function execution result or the entire function execution result of the voice command function execution may be output on the silent unlock screen.

Figure 6:
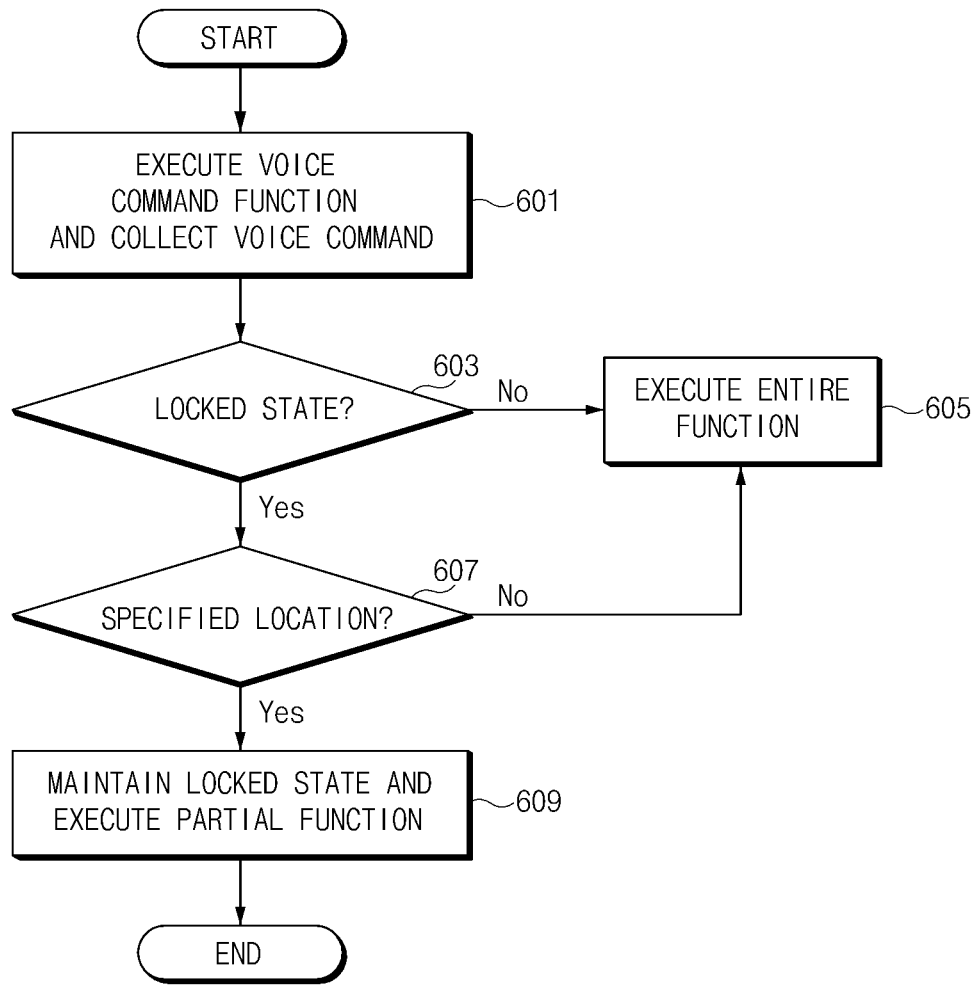
FIG. 6 is a flowchart illustrating an example of an operating method of an electronic device based on a locked state and a location, according to an embodiment of the present disclosure.

FIG. 6 is a flowchart illustrating an example of an operating method of an electronic device based on a locked state and a location, according to an embodiment of the present disclosure.

Referring to FIG. 6, in an operating method of an electronic device based on a locked state and a location, the processor 150 may, in operation 601, execute a voice command function and collect a voice command, as in operation 501 described above.

If the processor 150 is requested to execute the voice command function or the voice command is collected, the processor 150 may, in operation 603, determine whether the electronic device is in a locked state. In the case where the electronic device is not in a locked state, the processor 150 may, in operation 605, execute the entire function corresponding to the user voice input (e.g., the collected voice command).

In the case where the electronic device is in a locked state, the processor 150 may, in operation 607, determine whether the electronic device is situated at a specified location. In this regard, the processor 150 may activate a location information collection sensor depending on at least one of the case where a specified user voice command is collected when the voice command function is executed and the case where the execution of the voice command function is requested in the locked state. The location information collection sensor may include, for example, a GPS sensor, a Wi-Fi based positioning sensor, or the like.

If the current location of the electronic device corresponds to the specified location, the processor 150 may proceed to operation 605 to execute the entire function according to the user voice input. If the current location of the electronic device does not correspond to the specified location, the processor 150 may, in operation 609, execute a part of the function according to the user voice input while maintaining the locked state. For example, if a user voice input is collected while the electronic device is located at home, the processor 150 may execute the entire function according to the voice command. Alternatively, in the case where the electronic device is located at an office or a public place, the processor 150 may execute a part of the function according to the user voice input while maintaining the locked state (e.g., a state in which a lock screen is output on the display 120).

Figure 7:
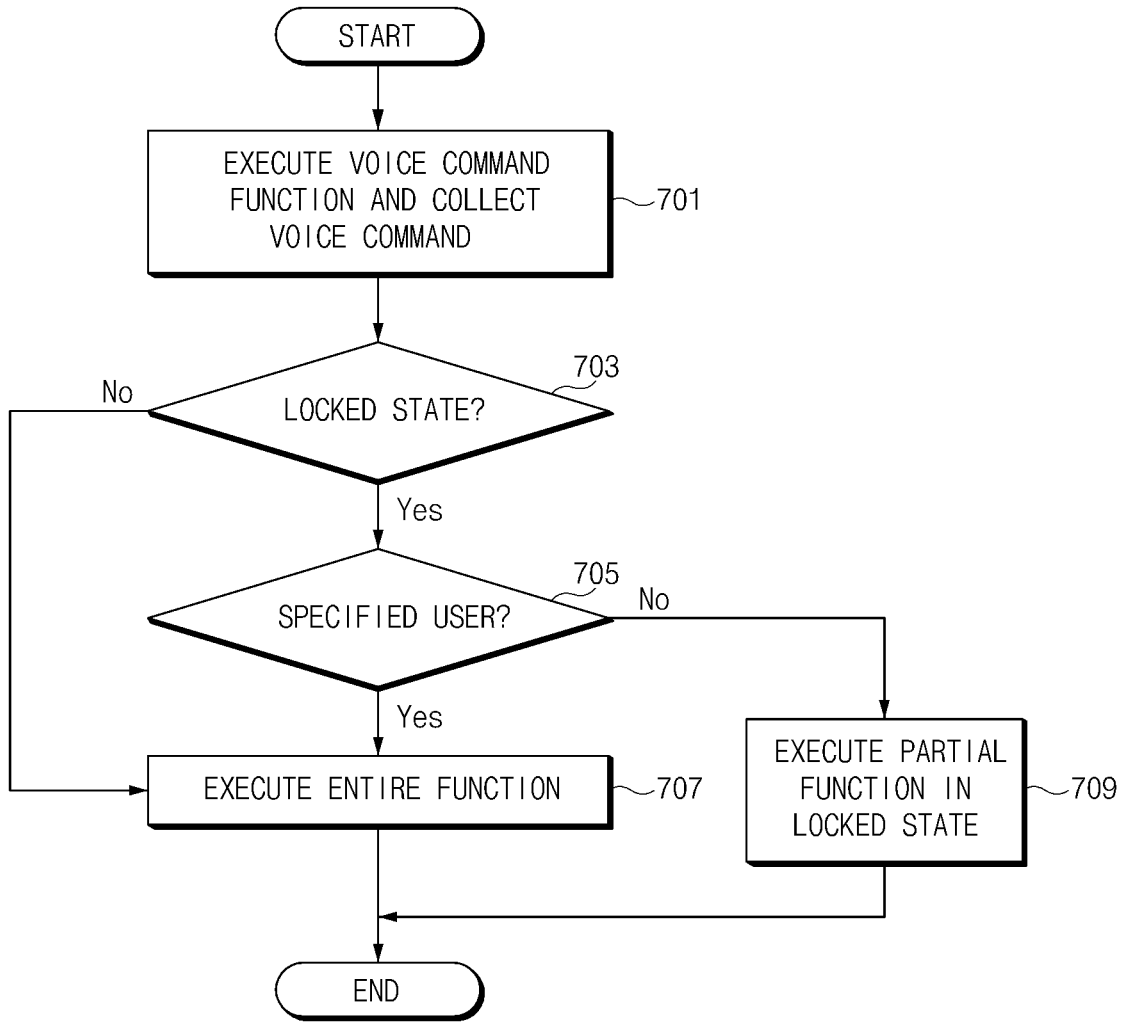
FIG. 7 is a flowchart illustrating an example of an operating method of an electronic device depending on a locked state and user identification, according to an embodiment of the present disclosure.

FIG. 7 is a flowchart illustrating an example of an operating method of an electronic device depending on a locked state and user identification, according to an embodiment of the present disclosure.

Referring to FIG. 7, in regard to an operating method of an electronic device depending on a locked state and user identification, the processor 150 may, in operation 701, execute a voice command function and collect a voice command and may, in operation 703, determine whether the electronic device is in a locked state. If the electronic device is not in a locked state, the processor 150 may proceed to operation 707 to execute the entire function according to the collected voice command.

In the case where the determination result in operation 703 is that the electronic device is in a locked state, the processor 150 may, in operation 705, determine whether a user of the electronic device corresponds to a specified user. To determine whether the user corresponds to the specified user, the processor 150, if requested to execute the voice command function, may, for example, automatically activate a camera to collect the user's face information and may compare the collected face information with face information stored in advance to determine the type of user or whether the user corresponds to the specified user. If the face identification result shows that the user corresponds to the specified user, the processor 150 may, in operation 707, execute the entire function according to the collected voice command. According to an embodiment, in the case where the user does not correspond to the specified user, the processor 150 may, in operation 709, execute a partial function according to the voice command in the locked state.

In the above-described operation, the processor 150 may perform another operation instead of the operation of collecting face information and comparing the collected face information with face information stored in advance. For example, and without limitation, the processor 150 may perform user identification based on, for example, at least one of fingerprint recognition, iris recognition, and voice print recognition. According to an embodiment, in the case of voice print recognition, the processor 150, when collecting the voice command, may compare the collected voice command and a voice pattern stored in advance to determine whether the voice command corresponds to the specified user's voice. In the case of fingerprint recognition, the electronic device may include a fingerprint sensor disposed in a physical button (e.g., a side button) allocated in relation to the execution of the voice command function, and when the corresponding physical button is selected, the electronic device may collect user fingerprint information to determine whether the user corresponds to the specified user.

Figure 8:
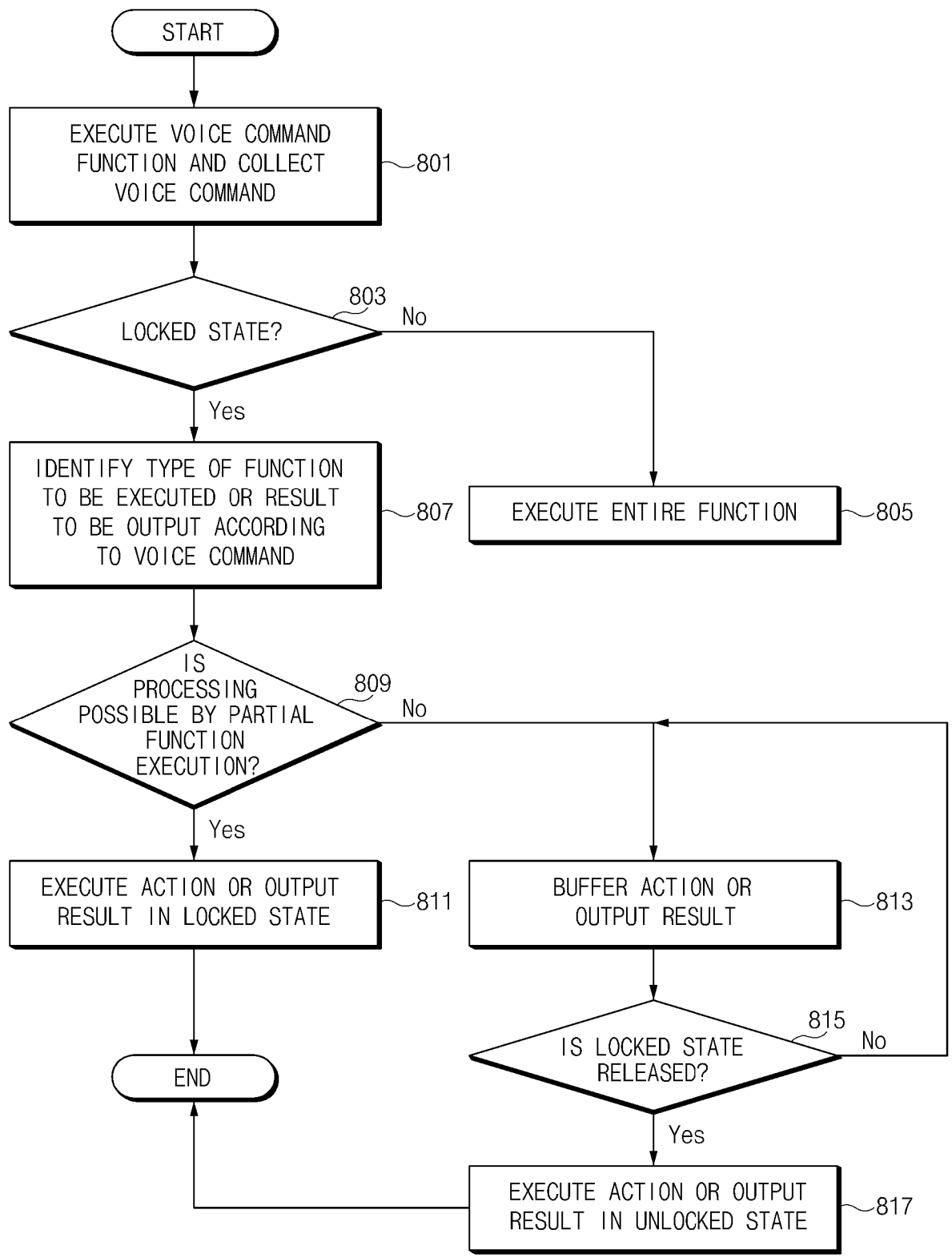
FIG. 8 is a flowchart illustrating an example of an operating method of an electronic device depending on a locked state and a voice command, according to an embodiment of the present disclosure.

FIG. 8 is a flowchart illustrating an example of an operating method of an electronic device depending on a locked state and a voice command, according to an embodiment of the present disclosure.

Referring to FIG. 8, in regard to an operating method of an electronic device depending on a locked state and a voice command, the processor 150 may, in operation 801, execute a voice command function and collect a voice command. In operation 803, the processor 150 may determine whether the electronic device is in a locked state. In the case where the electronic device is not in a locked state, the processor 150 may, in operation 805, execute the entire function according to the collected voice command.

In the case where the electronic device is in a locked state, the processor 150 may, in operation 807, identify the type of function to be executed according to the voice command or a result value to be output based on the voice command. In this regard, the processor 150 may perform speech recognition on the collected voice command and may identify the type of function (e.g., application or action) to be performed, or classification information of results to be output, according to the voice recognition result. In this regard, the electronic device may include a classification database for the results to be output. The classification database may include, for example, classification information obtained by classifying which results are output in an unlocked state and which results are partially output (or executed) in a locked state. According to an embodiment, the processor 150 may transmit the collected voice command to a server and may receive the type of function or classification information of results from the server. The server may previously store the type of action to be executed in the electronic device according to the voice command or classification information of results and may provide, to the electronic device, the type of function or classification information of results according to the voice command provided by the electronic device.

In operation 809, the processor 150 may determine whether the type of function or the classification information of the results according to the voice command is possible to be processed by partial function execution. In this regard, the processor 150 may compare the type of function or the result value with the classification database stored in advance, or may identify information indicating whether the processing is possible or not, among the information provided by the server. In the case where the processing is possible by the partial function execution, the processor 150 may, in operation 811, execute an action or output a result in the locked state. For example, the processor 150 may output the result on an area of the display 120, may output at least a part of an action execution screen, or may output a result according to the execution of the action while maintaining at least a part of the lock screen.

In the case where the processing is not possible by the partial function execution, the processor 150 may, in operation 813, buffer an action or an output result. In this state, the processor 150 may output a UI informing a user that the locked state needs to be released, while maintaining the locked state. In operation 815, the processor 150 may determine whether the locked state is released. In the case where the locked state is not released, the processor 150 may proceed to the state prior to operation 813 to maintain the action or the output result in the buffered state while maintaining the locked state. According to various embodiments, the processor 150 may remove the buffered output result, the action result, or the action execution screens if a specified period of time passes. The result or the action result removed from the buffering may not be output on the display 120 even though the locked state is released.

If the locked state is released within a specified period of time, the processor 150 may, in operation 817, execute the action and output the result in the unlocked state. According to an embodiment, the processor 150 may output the buffered result or the buffered action result in the unlocked state.

Figure 9:
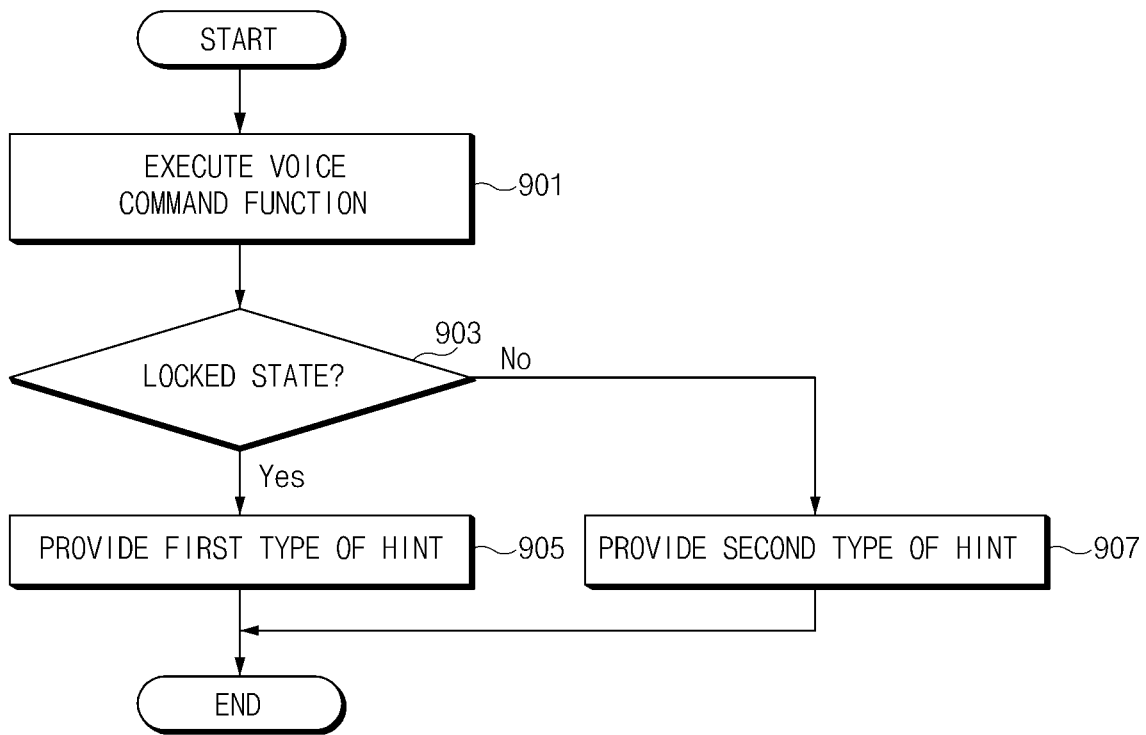
FIG. 9 is a flowchart illustrating an example of an operating method of an electronic device in relation to providing a hint, according to an embodiment of the present disclosure.

FIG. 9 is a flowchart illustrating an example of an operating method of an electronic device in relation to providing a hint, according to an embodiment of the present disclosure.

Referring to FIG. 9, in regard to an operating method of an electronic device in relation to providing a hint, the processor 150 may, in operation 901, execute a voice command function in response to an input event for requesting the execution of the voice command function. For example, the processor 150 may execute the voice command function in response to a user voice input mapped to the execution of the voice command function. Alternatively, the processor 150 may execute the voice command function in response to a selection of a physical button configured to execute the voice command function. In this operation, the display 120 in a turned-off state may be turned on according to the request to execute the voice command function.

In operation 903, the processor 150 may determine whether the electronic device is in a locked state. If the electronic device is in a locked state, the processor 150 may, in operation 905, provide a first type of hint. If the electronic device is not in a locked state, the processor 150 may, in operation 907, provide a second type of hint.

The first type of hint, which is output in the locked state, may include a hint associated with providing information having no security setting or having a public character. The second type of hint may include a hint associated with providing information having a security setting or having a private character.

The hints may include a list of instructions that a user is likely to request when the voice command function is called. According to various embodiments, the hints may include an introduction hint, a contextual hint, or a reuse hint.

The introduction hint may include information that introduces new functions of the electronic device to the user or introduces functions frequently used by other persons. Alternatively, the introduction hint may include information about functions that the user is likely to use among unused functions in the electronic device.

The contextual hint may be a hint exposed in a specific situation and may include information recommended when satisfying a condition defined in advance based on TOP in consideration of the user's time, position, and occurrence (TOP). The processor 150 may select a hint appropriate for a TOP condition from a pre-defined present hint pool as a contextual hint and may display the hint on the display 120.

The reuse hint may provide a hint that recommends functions frequently used based on user speech and utterance performed through a text input, according to the frequency of use based on personal TOP.

According to various embodiments, the processor 150 may classify and process the introduction hint as the first type of hint provided in the locked state. The processor 150 may classify at least one of the contextual hint and the reuse hint as the second type of hint provided in an unlocked state.

According to various embodiments, the processor 150 may provide various hints according to the type of locking. For example, the processor 150 may provide the reuse hint (e.g., output the reuse hint on the display 120 or output the reuse hint as audio information) in an unlocked state in which there is no lock screen. The processor 150 may output the contextual hint on the display 120 if a lock screen is output on the display 120 but is in an un-secured lock state. The processor 150 may output the introduction hint on the display 120 in a locked state requiring user authentication (e.g., fingerprint authentication, password input, or the like). As described above, the processor 150 may differently provide the hint according to the type of hint and the lock screen state.

Figure 10:
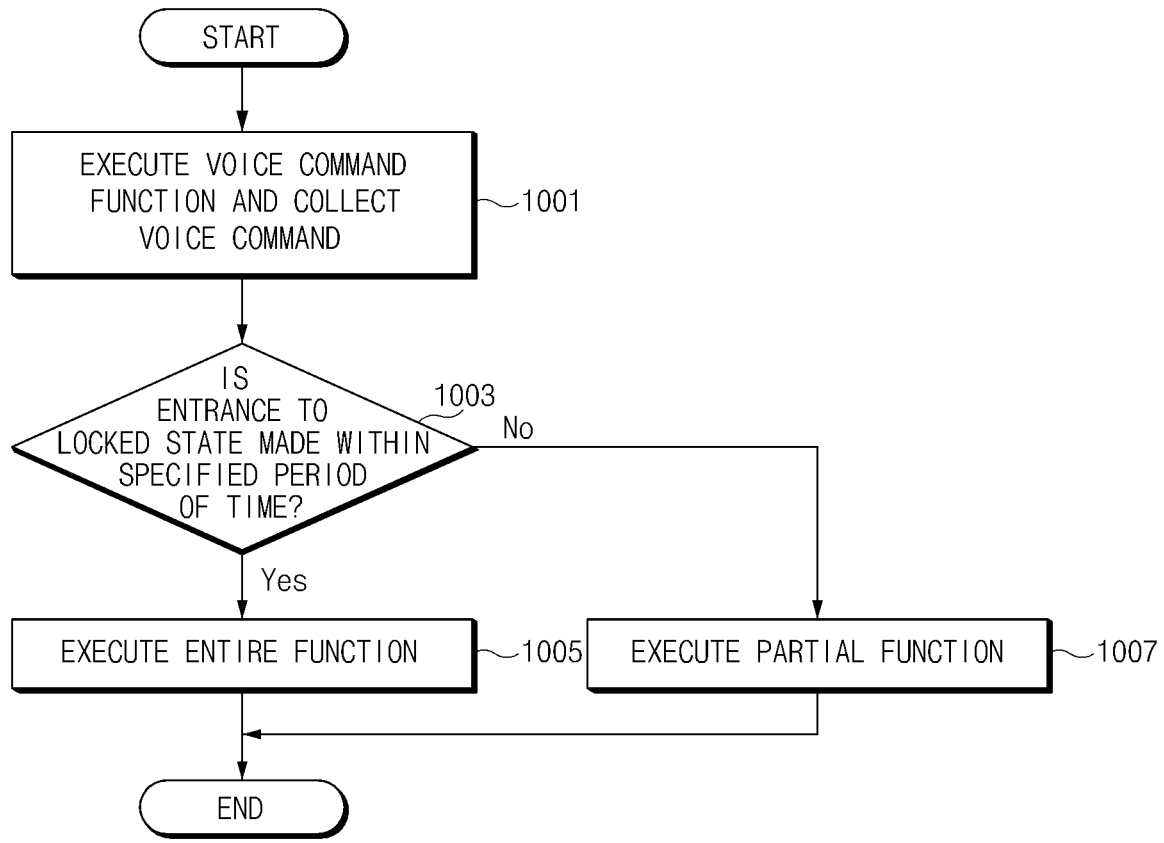
FIG. 10 is a flowchart illustrating an example of an operating method of an electronic device depending on a change in a locked state, according to an embodiment of the present disclosure.

FIG. 10 is a flowchart illustrating an example of an operating method of an electronic device depending on a change in a locked state, according to an embodiment of the present disclosure.

Referring to FIG. 10, in regard to an operating method of an electronic device depending on a change in a locked state, the processor 150 may, in operation 1001, execute a voice command function and collect a voice command.

In operation 1003, the processor 150 may determine whether entrance to a locked state is made within a specified period of time. For example, in the case where the display 120 is turned off through an input of a power key so that the electronic device automatically enters a locked state, the processor 150 may count time after the input of the power key to determine whether the specified period of time has elapsed. According to an embodiment, in the case where the locked state is executed according to elapsing of time for locked-state transition (e.g., time settings relating to sleep-state transition of the display 120), the processor 150 may count time after the execution time point to determine whether the specified period of time has elapsed. The processor 150 may determine whether the entrance to the locked state has been made within the specified period of time, by comparing the time point when the voice command function was executed and the time point when the electronic device entered the locked state. In this regard, if the electronic device enters the locked state, the processor 150 may determine whether the execution of the voice command function is requested, while counting time. If the specified period of time passes, the processor 150 may stop counting the time.

If the entrance to the locked state is made within the specified period of time (or in the case where a request to execute the voice command function occurs within the specified period of time after the entrance to the locked state), the processor 150 may, in operation 1005, execute the entire function according to the collected voice command. In this operation, the processor 150 may release the locked state while executing the entire function according to the voice command. According to an embodiment, the processor 150 may automatically enter the locked state after the execution of the entire function.

In the case where the entrance to the locked state is not made within the specified period of time (or in the case where a request to execute the voice command function occurs after the specified period of time passes after the entrance to the locked state), the processor 150 may, in operation 1007, execute a part of the function according to the collected voice command. In this operation, the processor 150 may maintain the locked state while executing the partial function according to the voice command. Accordingly, the processor 150 may output a result according to the voice command on a lock screen or may output at least a part of a plurality of action execution screens according to the voice command on at least a part of the lock screen.

According to an example embodiment of the present disclosure, an operating method for function execution based on a voice command in a locked state is provided. The method includes receiving an execution signal associated with executing a voice command function performed based on a user voice input, confirming (or obtaining information representing) a locked state of an electronic device, and providing an entire function execution state in which access to the entire information stored in a memory is allowed or a partial function execution state in which access to a part of the information stored in the memory is allowed, based on the locked state in relation to executing a function corresponding to the user voice input or outputting a result corresponding to the user voice input.

According to various example embodiments of the present disclosure, the receiving of the execution signal includes at least one of: detecting pressing of a physical button allocated in relation to executing the voice command function and obtaining of voice corresponding to a specified word based on an activated microphone.

According to various example embodiments of the present disclosure, the providing of the entire function execution state or the partial function execution state includes outputting the result corresponding to the user voice input based on the partial function execution state if a display of the electronic device is in a locked state.

According to various example embodiments of the present disclosure, the providing of the entire function execution state or the partial function execution state includes outputting the result corresponding to the user voice input based on the entire function execution state if a display of the electronic device is in an unlocked state or has no lock setting.

Figure 11:
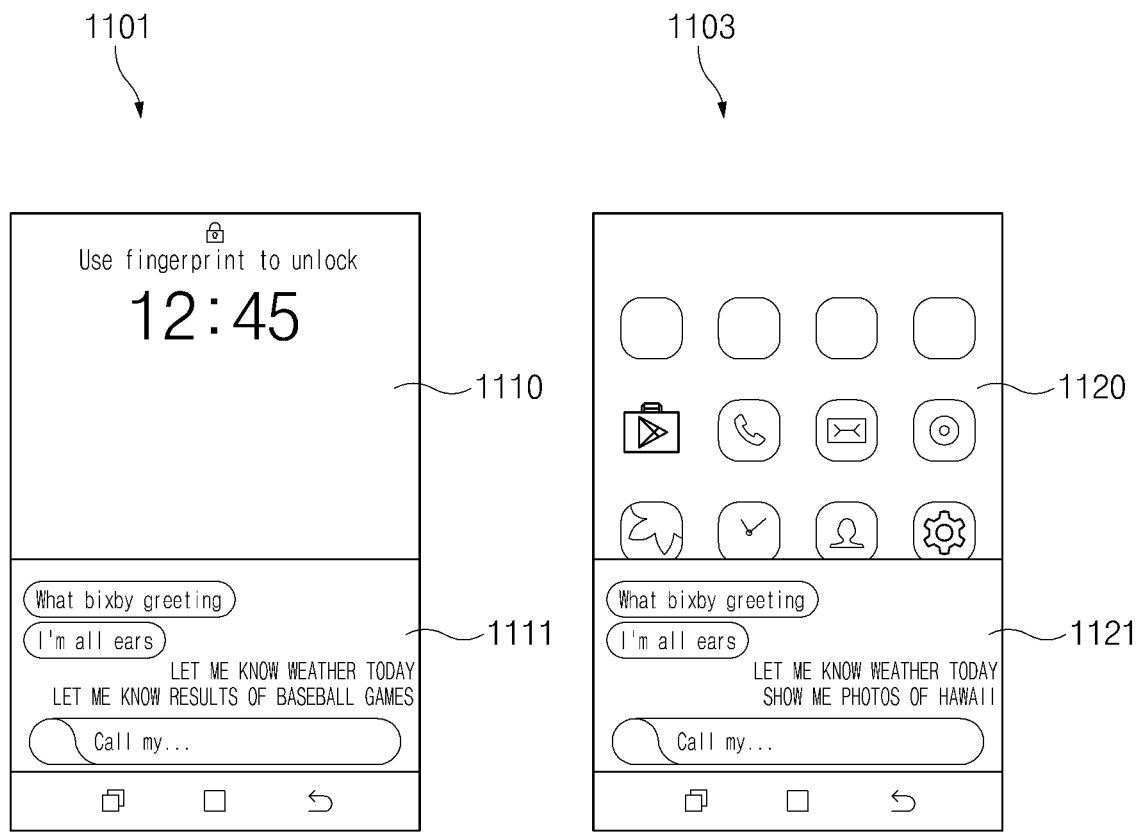
FIG. 11 is a diagram illustrating an example of a screen interface depending on whether a screen is in a locked state, according to an embodiment of the present disclosure.

FIG. 11 is a diagram illustrating an example of a screen interface depending on whether a screen is in a locked state, according to an embodiment of the present disclosure.

Referring to FIG. 11, if an input event relating to a voice command function occurs, the processor 150 of the electronic device may output a screen according to the execution of the voice command function on the display 120. In this operation, the processor 150 may output a lock screen on the display 120 in the case where a locked state has been set, and may output the screen according to the execution of the voice command function on the display 120 if the locked state is released. According to an embodiment, if an input event for requesting the execution of the voice command function occurs in the locked state, the processor 150 may output, on the display 120, a message to make a request to preferentially release the locked state, and if the locked state is released, the processor 150 may execute the voice command function.

According to various embodiments, in the case where a physical button relating to the voice command function is pressed in the state in which the lock screen according to the locked state is output on the display 120, the processor 150 may output the screen according to the execution of the voice command function on the display 120. According to an embodiment, if receiving a voice input (e.g., a speech input "Hi, Bixby") corresponding to a request to execute the voice command function, the processor 150 may execute the voice command function. In this operation, the processor 150 may release the locked state (remove the lock screen), or may dispose the lock screen in the background and the execution screen of the voice command function in the top layer. If the voice command function ends, the processor 150 may dispose the lock screen in the top layer again.

According to various embodiments, the processor 150 may output, on the display 120, a screen according to partial function execution. The partial function execution state may include a state in which the electronic device partially executes a function according to a user voice input in the case where the voice command function is executed in the locked state. Accordingly, the processor 150 may output, on the display 120, information that corresponds to a part of a result, a part of an application, or a part of actions relating to the function executed according to the user voice input.

The processor 150 may support partial function execution or entire function execution depending on a current lock setting of the electronic device before the execution of the voice command function. For example, if a lock screen is output on the display 120 before the voice command function is executed, the processor 150 may support a partial function execution state, as in a state 1101. The partial function execution state may include a state in which a part of functions to be executed according to a user voice input is executed. A screen according to the partial function execution state may include, for example, a locked-state indication area 1110 and a partial function execution indication area 1111. The locked-state indication area 1110 may be, for example, an area in which at least a part of the lock screen is displayed or an area including an object indicating the lock screen. The partial function execution state may include a state in which functions to be executed, or a result to be output, according to a user voice input provide functions or a result with a relatively low security level. Referring to the illustrated drawing, a hint on public information (e.g., information associated with searching for weather, sports, politics, or the like) may be displayed as a hint in the partial function execution indication area 1111. The screen state of the display 120 in the partial function execution state may differ from the screen state of the display 120 in the entire function execution state. For example, the partial function execution state may differ from the entire function execution state in terms of the background color or the displaying of a specified object (e.g., the displaying of a lock icon on a screen in the partial function execution state).

According to various embodiments, the processor 150 may output guide information to request unlock in the case where a result according to the entire function execution is desired after a result according to a user voice input is output (or a part of actions is output) in the partial function execution state. The processor 150 may output the entire function execution result in the case where locking is released.

If locking is released before the voice command function is executed, the processor 150 may support the entire function execution state, as in a state 1103. According to the entire function execution state, the processor 150 may display, on the display 120, a home screen area 1120 according to unlock and an entire function execution indication area 1121 for the voice command function. The entire function execution state may include a state in which functions to be executed, or a result to be output, according to a user voice input provide functions or a result with a relatively high security level. Referring to the illustrated drawing, a hint on private information (e.g., information associated with searching for a schedule or a personal photo) may be displayed as a hint in the entire function execution indication area 1121.

According to various embodiments, in the case where the voice command function is executed in a locked state based on the location of the electronic device, the processor 150 may differently provide the state of the executed function (e.g., a partial function execution state or an entire function execution state). For example, in the case where the electronic device is at a specified first place (e.g., home), the processor 150 may automatically release locking and may provide the entire function execution state relating to the voice command function if the processor 150 is requested to execute the voice command function in a locked state. According to an embodiment, in the case where the electronic device is at the specified first place (e.g., home), if a voice command function execution request and a user voice input are collected in a locked state, the processor 150 may execute the entire function according to the user voice input and may output the result.

According to another embodiment, if the electronic device is at a specified second place (e.g., an office) and is requested to execute the voice command function in a locked state, the processor 150 may maintain the locked state and may provide a partial function execution state relating to the voice command function. According to an embodiment, if the electronic device is at the specified second place and a voice command function execution request and a user voice input are collected in a locked state, the processor 150 may execute a partial function according to the user voice input and may output the result. The above-described first or second place may be added, changed, or deleted through user settings. The processor 150 may output map information associated with specifying a place.

Figure 12:
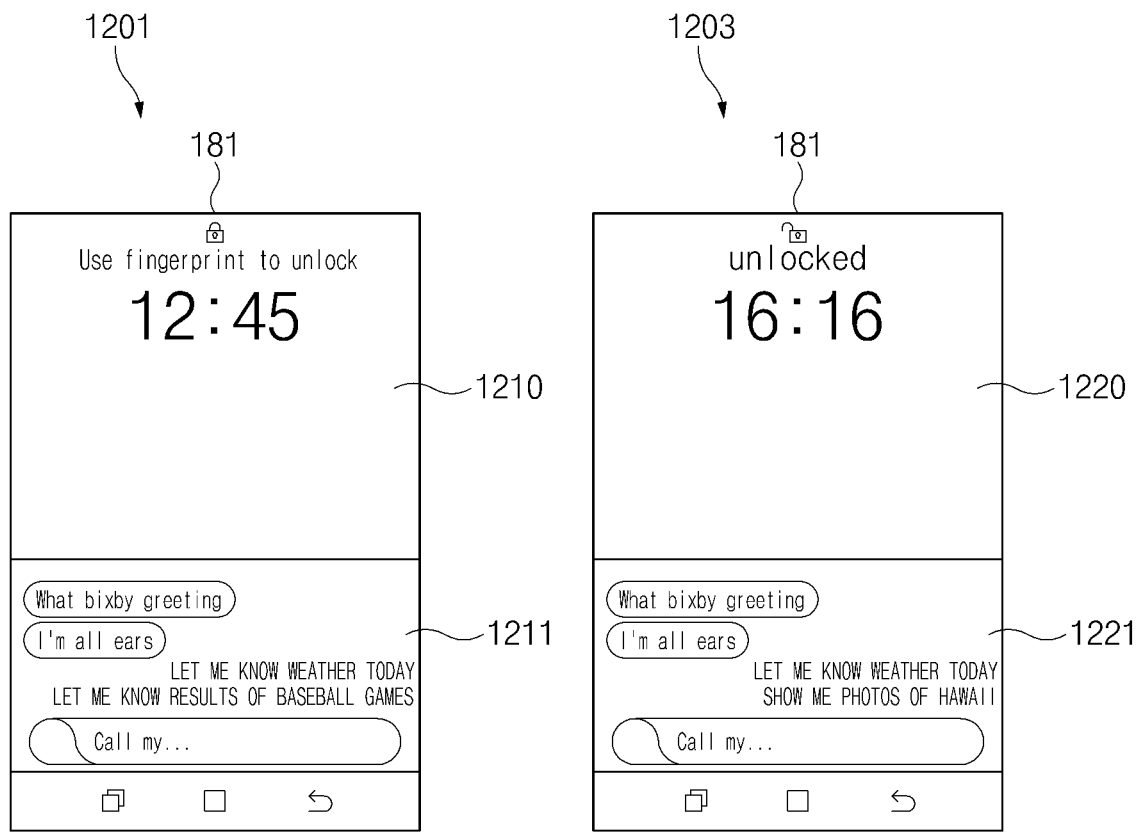
FIG. 12 is a diagram illustrating an example of a screen interface in which the state of a voice command function varies depending on the type of locking, according to an embodiment of the present disclosure.

FIG. 12 is a diagram illustrating an example of a screen interface 181 in which the state of a voice command function varies depending on the type of locking, according to an embodiment of the present disclosure.

Referring to FIG. 12, the processor 150 may output a first lock screen 1210 on the display 120 according to settings, as in a state 1201. The first lock screen 1210 may include, for example, a lock screen that is releasable by authenticating a fingerprint. If the electronic device, in which the first lock screen 1210 has been set, is requested to execute a voice command function, the processor 150 may output a partial function execution indication area 1211 relating to partial function execution. For example, a hint that is relatively public may be displayed in the partial function execution indication area 1211. If a user input for requesting relatively private information is collected in the state in which the partial function execution indication area 1211 is output on the display 120, the processor 150 may output information to make a request to perform unlock first. In this regard, the electronic device may include a classification data base for performing analysis of a user voice input to distinguish whether the user voice input is a public inquiry or a private inquiry.

The processor 150 may output a second lock screen 1220 on the display 120 according to settings, as in a state 1203. The second lock screen 1220 may include, for example, a lock screen that is releasable by a specified gesture, such as a touch drag. If the electronic device, in which the second lock screen 1220 has been set, is requested to execute a voice command function, the processor 150 may output an entire function execution indication area 1221 relating to entire function execution. For example, a relatively private hint may be displayed in the entire function execution indication area 1221.

According to various embodiments, the processor 150 may output a relatively private hint in the state of the first lock screen 1210. If a user voice input corresponding to the private hint is collected, the processor 150 may request unlock, and if unlock is performed, the processor 150 may output a processing result according to the user voice input. According to various embodiments, the processor 150 may output relatively public and private hints in the state of the second lock screen 1220, and if a user voice input is collected, the processor 150 may output a processing result according to the user voice input on a screen in a locked state, or may output the processing result after releasing the locked state.

Figure 13:
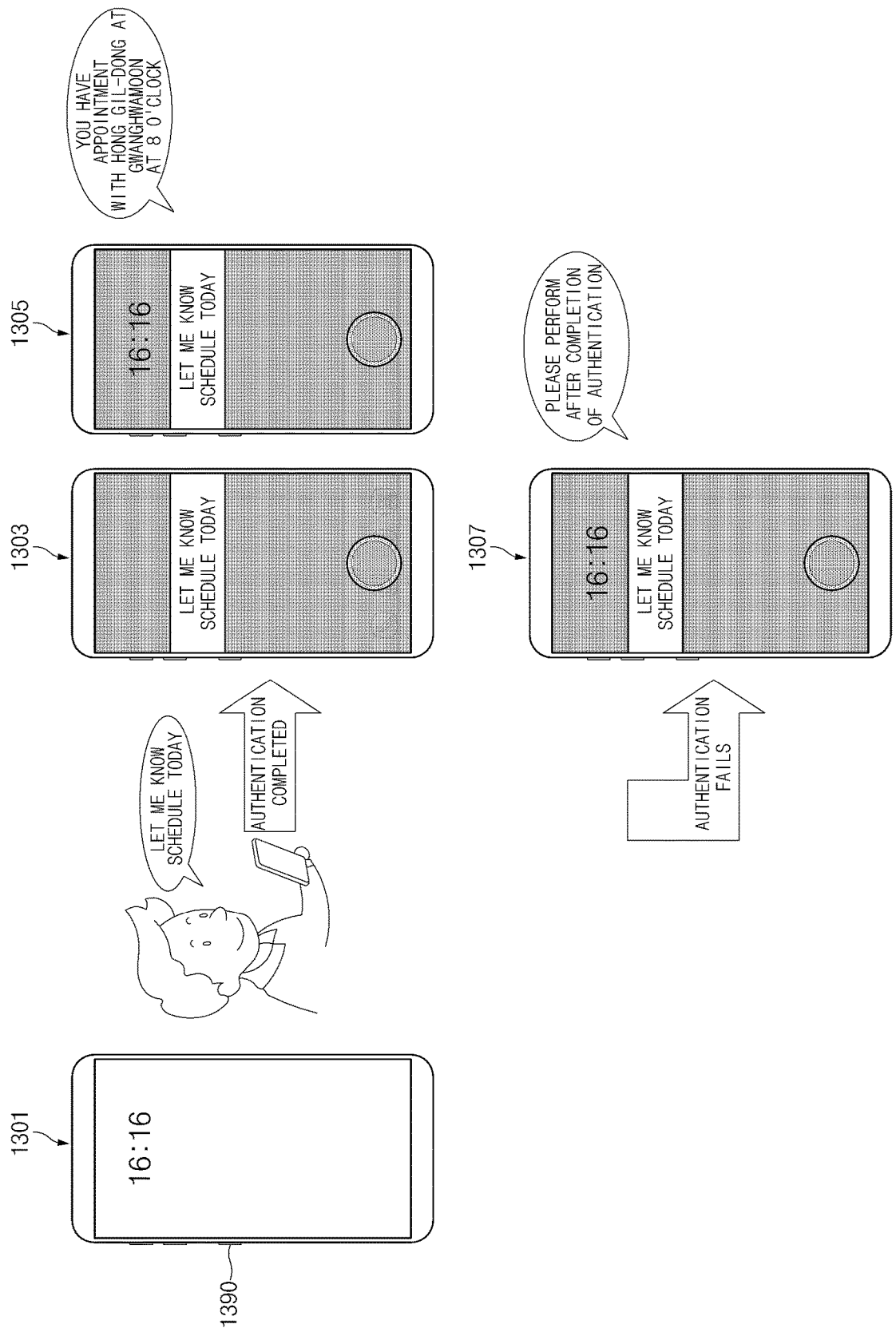
FIG. 13 is a diagram illustrating an example of a screen interface for outputting various function execution results depending on whether authentication is completed, according to an embodiment of the present disclosure.

FIG. 13 is a diagram illustrating an example of a screen interface for outputting various function execution results depending on whether authentication is completed, according to an embodiment of the present disclosure.

Referring to FIG. 13, in a state 1301, the processor 150 may execute a voice command function if a physical button 1390 associated with executing the voice command function is selected. In this operation, if the display 120 is in a turned-off state, the processor 150 may turn on the display 120 and may output an execution screen of the voice command function. According to an embodiment, in the case where a lock screen has been set, the processor 150 may output the lock screen on the display 120 in the state in which the voice command function is executed.

If the execution of the voice command function is requested by selecting the physical button 1390, the processor 150 may perform user identification or user authentication. In this regard, the processor 150 may, for example, take an image of a user's face with a camera (e.g., a front camera) disposed on a side of the electronic device and may perform user identification by comparing the face image with face information stored in advance. In the above-described operation, the processor 150 may activate the camera to take an image of the face if the physical button 1390 is selected and a user voice input is entered. According to an embodiment, the processor 150 may collect the user's iris information using an iris recognition sensor and may perform user authentication or user identification based on the collected iris information.

If the user is identified or authenticated, the processor 150 may execute a function corresponding to the voice input entered by the user, as in a state 1303. For example, the processor 150 may output text corresponding to the user voice input on the display 120 and may collect a result corresponding to the voice input. In this operation, the processor 150 may collect the result corresponding to the voice input based on information stored in the memory 140, or may provide the voice input to a server and may collect a result from the server. If the result is collected, the processor 150 may output the result, as in a state 1305. In the illustrated drawing, the result corresponding to the voice input is output using audio information. According to an embodiment, the processor 150 may also output the result corresponding to the voice input on the display 120.

In the case where the user authentication or identification fails, the processor 150 may not output a voice command function execution result corresponding to the voice input, but may output specified guide information (e.g., guide information for requesting the completion of authentication) while outputting a user voice input recognition result on the display 120, as in a state 1307. The guide information may be output in the form of at least one of audio, text, and an image.

According to various embodiments, the processor 150 may perform fingerprint recognition while the user is pressing the physical button 1390 to make a request to execute the voice command function. In this regard, a fingerprint recognition sensor may be disposed in the physical button 1390. The processor 150 may perform fingerprint recognition to authenticate the user while the user is pressing the physical button 1390, and according to the user authentication result, the processor 150 may execute the voice command function corresponding to the user voice input and may output a voice command function execution result, as in the states 1303 and 1305, or may output guide information to request the completion of authentication, as in the state 1307. In the above-described operation, the processor 150 may provide an entire function execution state for the user voice input if the fingerprint recognition is completed before the completion of the user voice input. If user authentication is not performed before the completion of the user voice input, the processor 150 may provide a partial function execution state, which is provided together with a lock screen, or may request the completion of authentication. Whether the user voice input is completed may be determined based on a state in which there is no voice input for a specified period of time after user speech with a predetermined length is input.

Figure 14:
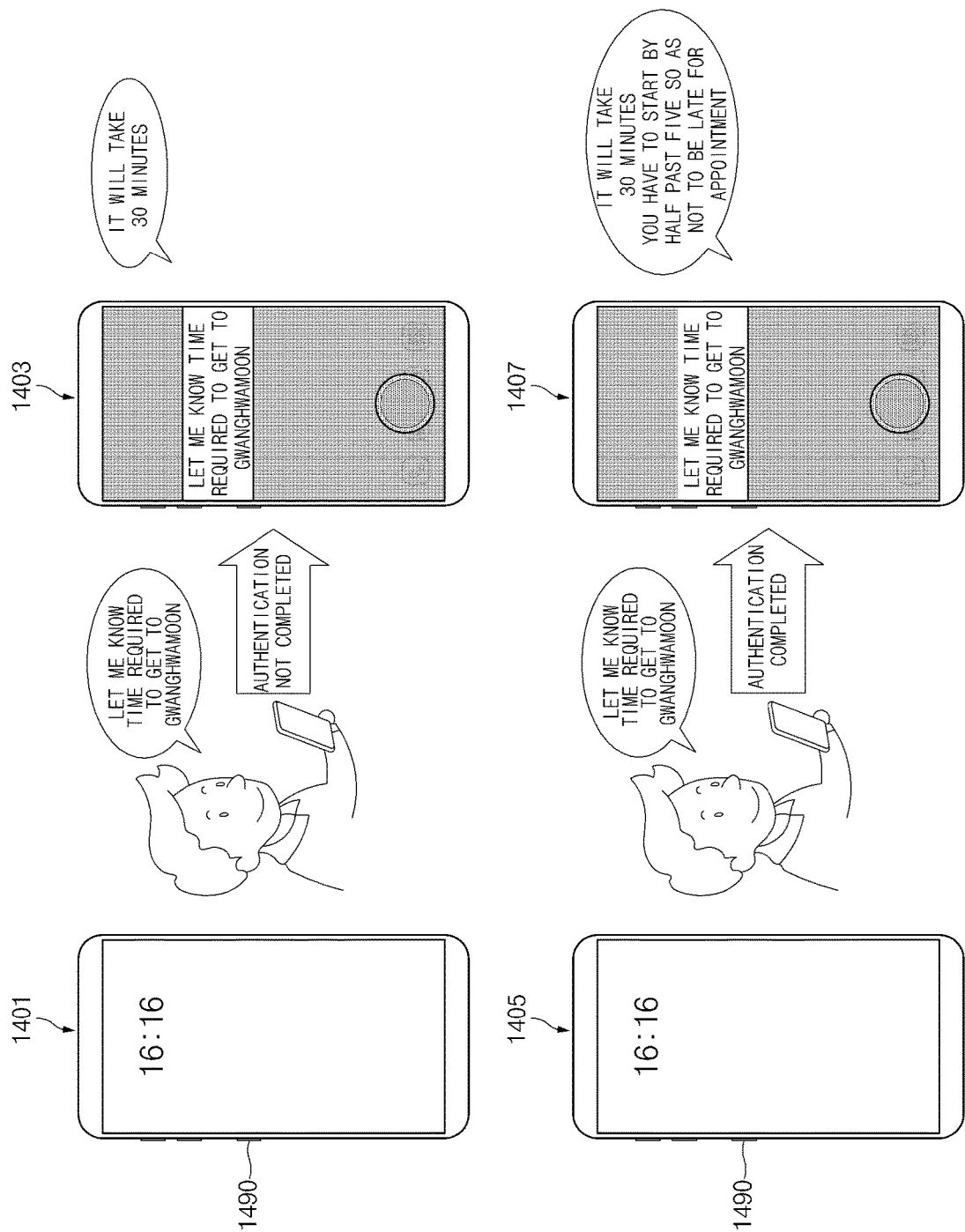
FIG. 14 is a diagram illustrating an example of a diversity of function execution results depending on whether a user is authenticated, according to an embodiment of the present disclosure.

FIG. 14 is a diagram illustrating an example of a diversity of function execution results depending on whether a user is authenticated, according to an embodiment of the present disclosure.

Referring to FIG. 14, the electronic device may include a physical button 1490 associated with executing a voice command function and a fingerprint recognition sensor disposed adjacent to or inside the physical button 1490 to perform fingerprint recognition. The processor 150 may perform user authentication by collecting fingerprint information of a finger brought into contact with the physical button 1490 while executing the voice command function in response to an operation of pressing the physical button 1490.

The processor 150 may provide an entire function execution state for the voice command function if the user authentication is completed by performing the user authentication in response to the selection of the physical button 1490. For example, the processor 150 may execute the voice command function in response to the selection of the physical button 1490 and may execute the entire function corresponding to a collected user voice input. The entire function may include, for example, a function by which the processor 150, when executing a function for the user voice input, accesses all information stored in the memory 140 without any restriction on access to the memory 140 and provides a consequential result.

The processor 150 may execute a partial function for the user voice input depending on the input type of the physical button 1490. The partial function may include, for example, a function by which the processor 150, when executing a function for the user voice input, outputs a result based on access to some information stored in the memory 140. For example, if the voice command function is executed by an operation (e.g., a short press) of pressing the physical button 1490 for a short period of time, the processor 150 may provide a partial function execution state when executing a function for the user voice input. In the partial function execution state, the processor 150 may maintain a lock screen and may output a result according to the partial function execution.

According to various embodiments, if the physical button 1490, to which the voice command function execution is allocated, is selected as in a state 1401, the processor 150 may execute the voice command function and may collect a user voice input. If the selection of the physical button 1490 is input as a signal corresponding to an operation of a specified first pattern (e.g., a short press) or user authentication is not performed or fails, the processor 150 may output a first result for the user voice input, as in a state 1403. The first result may include, for example, basic information about the user voice input. The basic information may include, for example, a calculated value (e.g., distance, location, required time, or the like) as information in which a user's personal information is not included.

According to various embodiments, if the physical button 1490, to which the voice command function execution is allocated, is selected as in a state 1405, the processor 150 may execute the voice command function and may collect a user voice input. If the selection of the physical button 1490 is input as a signal corresponding to an operation of a specified second pattern (e.g., a long press) or user authentication is completed, the processor 150 may output a second result for the user voice input, as in a state 1407. The second result may include, for example, basic information about the user voice input and additional information. The additional information may include, for example, user information relating to a calculated value (e.g., schedule information relating to location or electronic-device usage history information relating to location) as the user's personal information.

Figure 15:
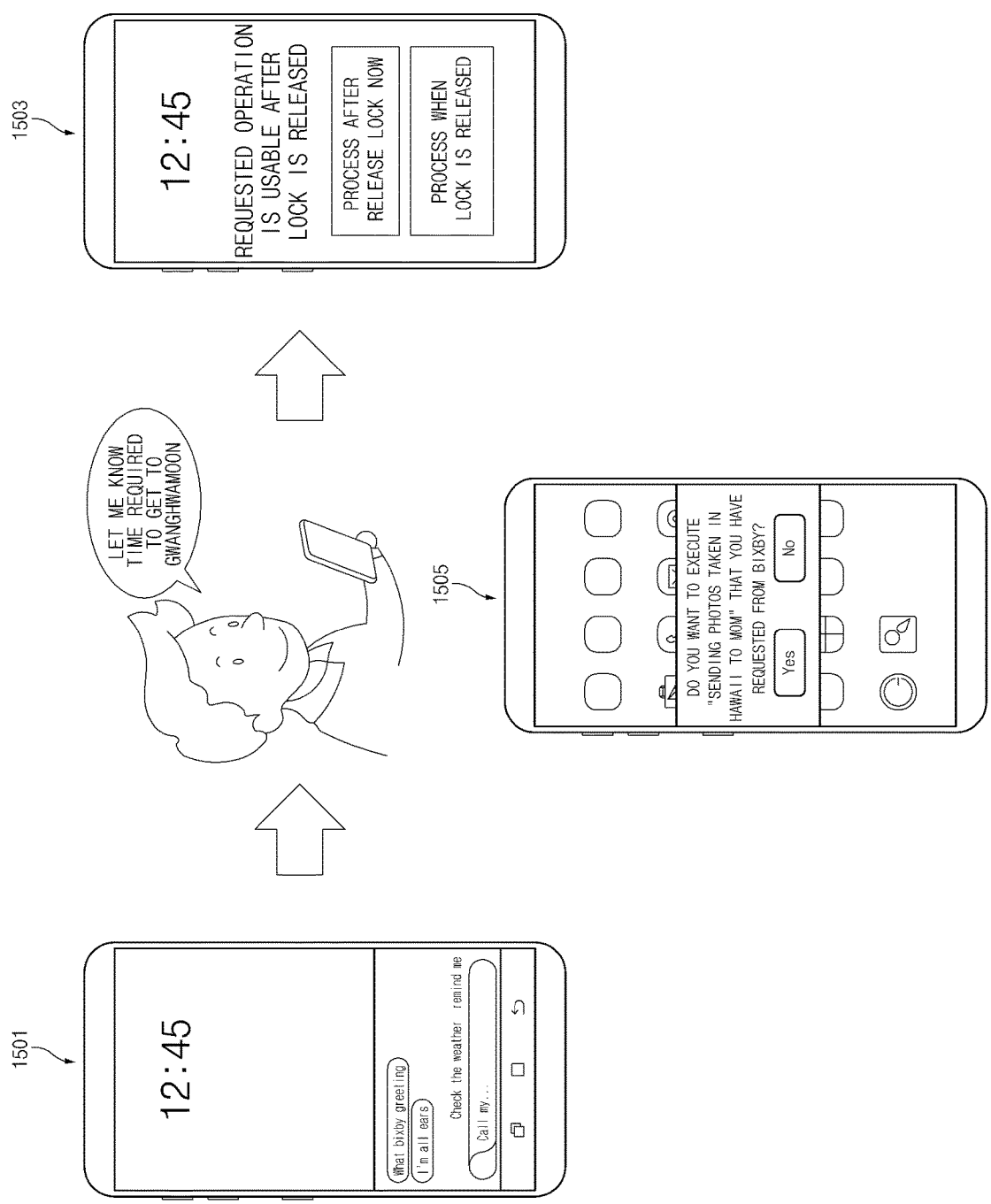
FIG. 15 is a diagram illustrating an example of function execution based on a voice command in a locked state, according to an embodiment of the present disclosure.

FIG. 15 is a diagram illustrating an example of function execution based on a voice command in a locked state, according to an embodiment of the present disclosure.

Referring to FIG. 15, in a state 1501, the processor 150 may output a lock screen on the display 120 in response to a request to execute a voice command function. According to an embodiment, the processor 150 may output, on the lock screen, a voice command function indication area associated with executing the voice command function. If a user voice input is received in the state in which the lock screen is maintained, the processor 150 may determine a characteristic of the received user voice input. For example, the processor 150 may determine whether a function to be executed by the user voice input is relatively private or public. According to an embodiment, the processor 150 may determine whether to access a specified memory area while a function of the electronic device is being executed by the user voice input. Here, the specified memory area may include, for example, an area in which user information or personal information is stored. For example, the specified memory area may include a scheduler, a personal picture storage area, an e-mail storage area, a phone-book storage area, or the like.

As in a state 1503, the processor 150 may output a screen to request unlock in the case where entire function execution (e.g., execution of functions requiring access to all information stored in the memory 140) is required to execute a function according to the user voice input in a partial function execution state (e.g., a state in which the voice command function is executed while the lock screen is maintained so that the processor 150 is partially accessible to information stored in the memory 140). The screen to request unlock may include, for example, items for selecting whether to perform unlock now and execute the function according to the user voice input or whether to execute the function according to the user voice input in the case where unlock is performed later.

According to various embodiments, in the case where the user voice input requires the entire function execution in the partial function execution state, the processor 150 may buffer an action list according to the user voice input (e.g., an application to be performed in response to the user voice input and application steps). If the lock screen is unlocked as in a state 1505, the processor 150 may output a pop-up window to inquire whether to perform the buffered actions. The processor 150 may perform the buffered actions, or may delete the buffered information, in response to a user selection. To support the buffering operation, the memory 140 of the electronic device may include a buffer module or a buffer area for storing the action list.

In regard to the above-described buffering operation, the processor 150 may collect a rule set for the actions to be performed in response to the user voice input (or an execution sequence list of the actions (or operations)) and may determine whether the corresponding rule set is executable in the partial function execution state. In this regard, the electronic device may store and manage a database for a state (e.g., the partial function execution state or the entire function execution state) in which rule sets are executable. The processor 150 may store the rule set in a buffer if receiving a user input for requesting that the function according to the user voice input is executed after unlock. Thereafter, if an unlock event occurs, the processor 150 may perform an operation according to the action list stored in the buffer.

For example, a user voice input "Send photos taken in Hawaii to my mom" is collected in a partial function execution state, the processor 150 may store, in the buffer, action lists to be performed according to the user voice input. If locking is released, the processor 150 may search for photos taken in Hawaii, output a search screen, collect information about the mom from a phone-book list, output a collection screen, execute a message, output a message screen, attach the photos taken in Hawaii to the message, output an attachment screen, transmit the message to the mom, and output a transmission screen, according to the action lists stored in the buffer. In the above-described operation, the processor 450 may output a confirmation window to confirm whether to perform the buffered actions and may perform or cancel the actions according to a user selection.

Figure 16:
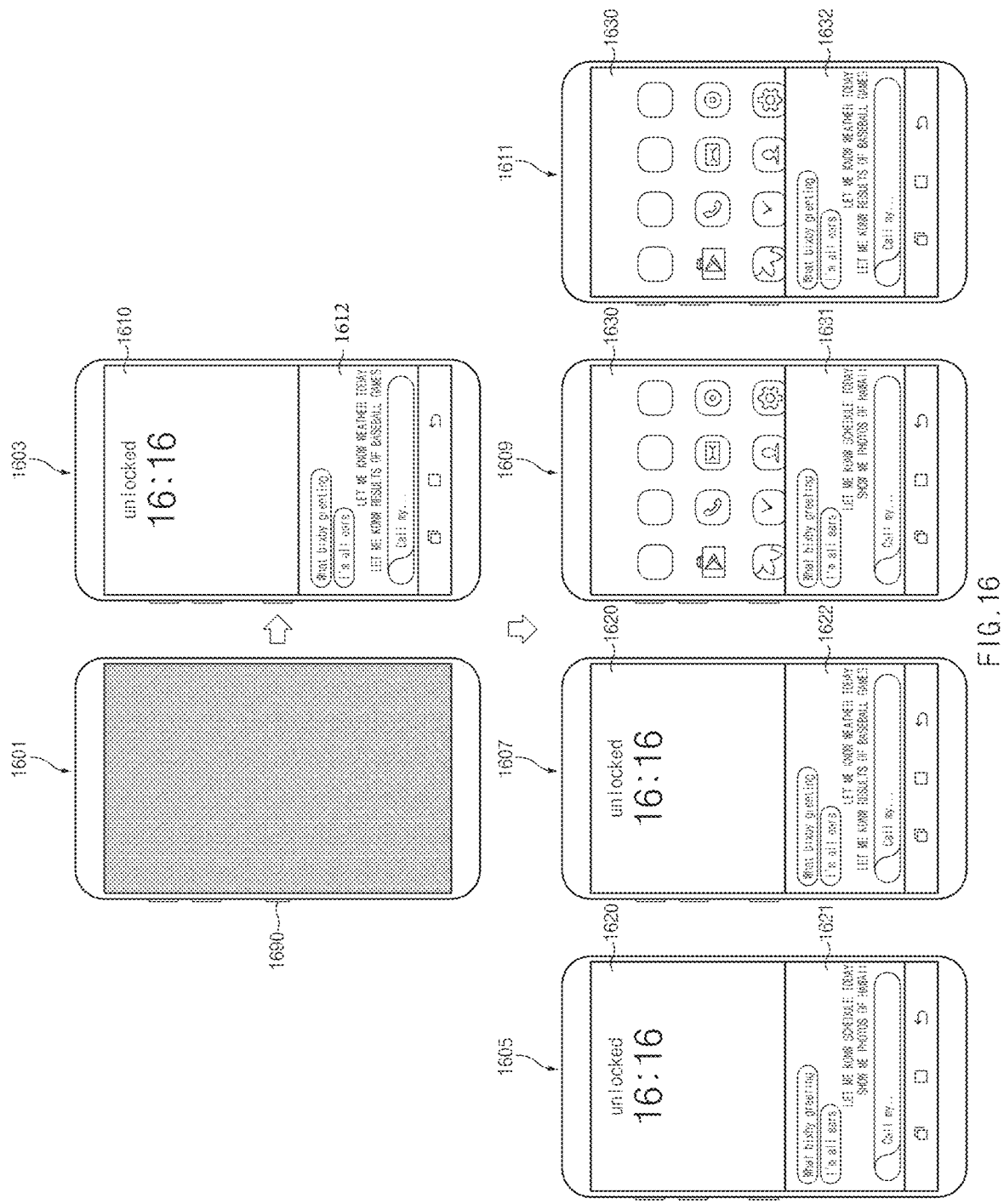
FIG. 16 is a diagram illustrating an example of a screen interface for outputting a function execution result depending on whether authentication is performed, according to an embodiment of the present disclosure.

FIG. 16 is a diagram illustrating an example of a screen interface for outputting a function execution result depending on whether authentication is performed, according to an embodiment of the present disclosure.

Referring to FIG. 16, if the processor 150 of the electronic device is requested to execute a voice command function with the display 120 in a turned-off state 1601, the processor 150 may identify a lock setting and may make an execution range of the voice command function different according to the lock setting. According to an embodiment, the display 120 may be in a turned-off state, as in a state 1601. If a physical button 1690 associated with executing a voice command function is pressed, the processor 150 may turn on the display 120 and may output a specified screen (e.g., a lock screen), as in a state 1603. In this operation, the processor 150 may identify a lock setting value. The lock setting may include locking or unlocking, the type of locking, or the like. For example, the processor 150 may output, on the display 120, a screen that includes a lock screen indication area 1610 and a voice command function indication area 1612 area 1611.

According to an embodiment, in the case where a lock setting corresponds to a specified first locked state (e.g., a state configured such that locking is released using an iris, a fingerprint, a face, or the like), if the physical button 1690 is pressed while the display 120 is turned off, the processor 150 may perform authentication based on background processing and may execute the voice command function according to the authentication result. In this operation, the processor 150 may perform iris recognition, fingerprint recognition, face recognition, or the like through background processing. For example, the processor 150 may automatically perform fingerprint sensing while the physical button 1690 is being pressed, based on a fingerprint sensor disposed inside the physical button 1690. According to an embodiment, if the physical button 1690 is pressed, the processor 150 may automatically activate an iris recognition sensor to collect a user's iris information and may perform authentication based on the user's iris information. According to another embodiment, if the physical button 1690 is pressed, the processor 150 may automatically activate an RGB camera sensor to collect the user's face information and may compare the collected face information of the user with face information stored in advance to perform user authentication. According to an embodiment, the processor 150 may perform voice print authentication for a user voice input (e.g., a comparison between a pattern of a currently input voice and a voice pattern stored in advance). The fingerprint sensing, the iris sensing, the face recognition, and the voice print authentication may be performed through background processing. In regard to the fingerprint authentication, the iris authentication, the voice print authentication, and the face recognition, biometric information including at least one of a fingerprint, an iris, a voice, and a face may be stored in advance. The user's biometric information may be encrypted and stably stored in a security module in the electronic device.

According to an embodiment, a lock setting may correspond to a second locked state (e.g., a state in which a lock screen is releasable by a gesture input). In this case, the processor 150 may output information according to the execution of a voice command function without performing separate user authentication in the state in which a lock screen is output on the display 120. For example, as in a state 1605, the processor 150 may output, on the display 120, a screen that includes a locked state indication area 1620 indicating a locked state (e.g., silent unlocked), in which locking is releasable by a specified gesture motion (e.g., a touch drag) without any separate authentication operation, and a voice command function indication area 1621 indicating a voice command function. If the processor 150 is requested to execute a voice command function in the state in which a lock screen not requiring user authentication has been set, the processor 150 may output a relatively public hint (e.g., information indicating news, weather, or the like) on the display 120.

According to an embodiment, if user authentication based on background processing is completed, as in a state 1607, the processor 150 may output information (e.g., unlocked) indicating the completion of authentication to inform that a locked state is released. According to various embodiments, the processor 150 may output, on the display 120, the lock screen area 1620, which is unlocked according to the completion of authentication and a gesture input, and an area 1622 for instructing the execution of a voice command function. In this operation, the processor 150 may output specified information (e.g., information indicating a schedule or gallery function that is relatively private) on the display 120 according to unlock based on background processing. Additionally or alternatively, the processor 150 may output an execution result of a function according to a user voice input collected in the process of executing a voice command function. If a specified period of time passes after the function execution result is output, the processor 150 may change to the first locked state (e.g., a state in which a lock screen is releasable by a gesture input) or may change to a specified screen state (e.g., a home screen output state).

Although it has been described that a relatively public hint is provided in the second locked state and a relatively private hint is provided in the state in which the user authentication is completed, the present disclosure is not limited thereto. For example, the processor 150 may also provide a relatively private hint in the second locked state and a relatively public hint in the state in which the user authentication is completed. According to an embodiment, the processor 150 may provide both a relatively private hint and a relatively public hint in the state in which the user authentication is completed.

According to an embodiment, as in a state 1609, the processor 150 may change a background screen associated with executing a voice command function to a specified home screen if user authentication is completed. The processor 150 may provide a relatively private hint when providing a hint in the state 1609. The processor 150 may output, on the display 120, a function execution area 1630 (e.g., a home screen area) specified according to unlock and an area 1631 for instructing voice command function execution. For example, information including a relatively private hint may be displayed in the voice command function execution indication area 1631.

According to an embodiment, as in a state 1611, if user authentication is completed, the processor 150 may change a background screen associated with executing a voice command function to a home screen and may provide a relatively public hint when providing a hint. The processor 150 may output, on the display 120, a function execution area 1630 (e.g., a home screen area) specified according to unlock and an area 1632 for instructing voice command function execution. For example, information including a relatively public hint may be displayed in the voice command function execution indication area 1632.

In the above-described operation, the processor 150 may release a locked state and may provide a home screen as a background screen associated with executing a voice command function, as in the state 1609 or 1611, in the case where user authentication is performed (e.g., in the case where a password or a lock pattern is input).

According to various embodiments, in the case of user authentication (e.g., fingerprint authentication, iris authentication, voice print authentication, and face recognition using the physical button 1690) based on background processing, the processor 150 may remove a lock screen and may provide a voice command function with a home screen in the background. The processor 150 may maintain a lock screen output state in the case where the user authentication based on background processing fails or a user needs to enter explicit authentication information since pattern lock or password lock is set.

In regard to releasing a locked state and executing a voice command function using iris recognition, the processor 150 may extract iris-related data from image data collected through an iris recognition camera disposed on a front side of the electronic device and may compare the extracted data with iris data stored in the memory 140 to perform user authentication. In this operation, in the case where a user presses the physical button 1690 associated with executing the voice command function and makes a speech, the processor 150 may recognize the user speech and may simultaneously determine whether the user making the speech corresponds to the user authenticated through the iris recognition. In the case where the user identification is completed through the iris recognition before the user speech is completed, the processor 150 may access all information stored in the memory 140 and may provide an entire function execution state to provide a service corresponding to the user speech. If authentication is not performed before the user speech is completed, the processor 150 may provide a partial function execution state (e.g., a state in which a limited service is provided) that the processor 150 is able to support in the locked state, and may output guide information that an entire function execution state according to a user voice input is provided after normal authentication is completed.

In regard to releasing a locked state and executing a voice command function using face recognition, the processor 150 may extract feature points in a face from image data obtained through an RGB camera disposed on a front side of the electronic device and may compare the extracted feature points with feature points stored in advance. Based on the comparison result, the processor 150 may determine whether the currently obtained face information agrees with face information stored in advance and may perform user authentication according to the determination result. In the case where a user presses the physical button 1690 associated with executing the voice command function and makes a speech, the processor 150 may recognize the user speech and may simultaneously determine whether the user making the speech corresponds to the user authenticated through the face recognition. In the case where the user identification is completed through the face recognition before the user speech is completed, the processor 150 may provide an entire function execution state, and if authentication is not performed before the user speech is completed, the processor 150 may provide a partial function execution state in the locked state. In the partial function execution state, the processor 150 may output information that authentication is required in relation to providing an entire function execution state. Since face recognition is an authentication method greatly affected by environmental factors including a dark place, an auxiliary authentication method may be included together in preparation for a situation in which face recognition is not effectively performed. For example, in the case where authentication through face recognition is not completed in the situation in which user speech is completed, the processor 150 may guide another authentication method (e.g., fingerprint authentication, voice print authentication, or the like).

Figure 17:
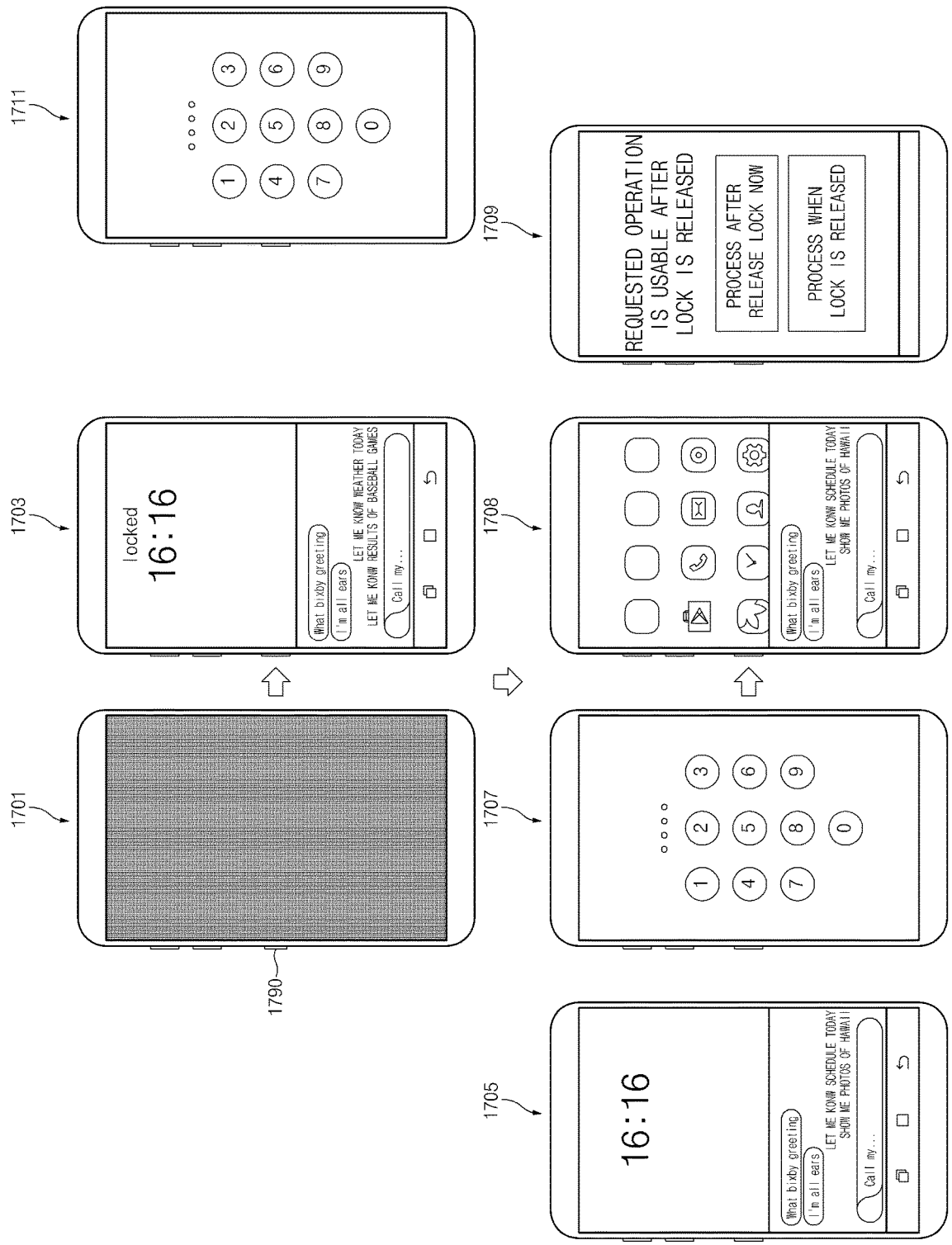
FIG. 17 is a diagram illustrating an example of a screen interface relating to various lock screen processing algorithms depending on the types of functions, according to an embodiment of the present disclosure.

FIG. 17 is a diagram illustrating an example of a screen interface relating to various lock screen processing algorithms depending on the types of functions, according to an embodiment of the present disclosure.

Referring to FIG. 17, the display 120 of the electronic device may be in a turned-off state, as in a state 1701. The electronic device may include a physical button 1790 associated with executing a voice command function. If the physical button 1790 is pressed, the processor 150 may output a screen associated with executing the voice command function on the display 120 in a locked state, as in a state 1703.

The processor 150, after executing the voice command function, may analyze a user voice input and may execute a function, or may output a result, according to the analyzed voice input result. In this operation, in the case where the electronic device is in a locked state at present and the function to be executed or the result to be output requires an entire function execution state, the processor 150 may provide information that it is not possible to execute the corresponding function or output the corresponding result in the current state, as in a state 1705. Additionally or alternatively, as in a state 1707, the processor 150 may output an input screen for authentication (e.g., a number input screen or a pattern lock screen) on the display 120. If authentication is completed, the processor 150 may release the locked state and may execute the function, or may output the result, according to the user voice input, as in a state 1708. In response to releasing the locked state, the processor 150 may output a home screen on the display 120.

According to various embodiments, in the case where unlock is required to execute the function according to the user voice input in the locked state, the processor 150 may output, on the display 120, a pop-up window for indicating that unlock is necessary for the function, as in a state 1709. In the case where a specified period of time passes after the output of the pop-up window or an item for requesting unlock now is selected, the processor 150 may output a screen (e.g., a number input screen or a pattern lock screen) for a specified type of authentication on the display 120, as in a state 1711.

According to various embodiments, if the physical button 1790 associated with executing the voice command function is pressed in the state in which the display 120 is turned off, the processor 150 may automatically release the locked state and then may provide an entire function execution state.

Figure 18A:
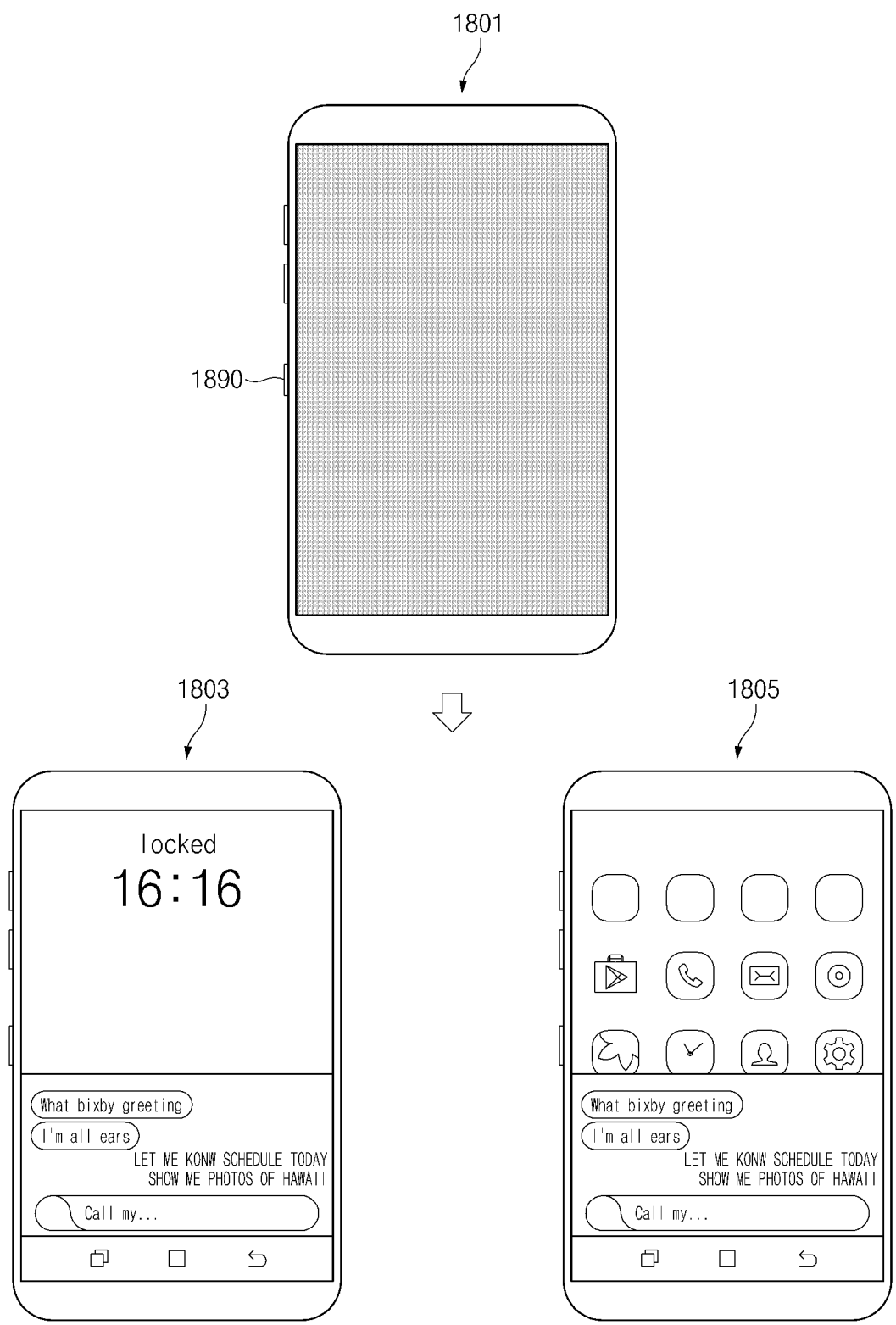
FIG. 18A is a diagram illustrating an example of a screen interface for outputting various function execution results depending on a turned-off state of a display, according to an embodiment of the present disclosure.

FIG. 18A is a diagram illustrating an example of a screen interface for outputting various function execution results depending on a turned-off state of a display, according to an embodiment of the present disclosure.

Referring to FIG. 18A, the processor 150 of the electronic device may turn on the display 120 in response to pressing of a power button or a home button in the state in which the display 120 is turned off, as in a state 1801. Thereafter, if a physical button 1890 associated with executing a voice command function is pressed, the processor 150 may output, on the display 120, a screen including an area indicating the voice command function in a locked state, as in a state 1803. According to various embodiments, in the case where a lock setting corresponds to a lock screen that is releasable by a specified gesture input, when the physical button 1890 is pressed, the processor 150 may release the lock screen and may output an area indicating the voice command function on a specified screen (e.g., a home screen), as in a state 1805. According to various embodiments, when the physical button 1890 is pressed while the display 120 is turned off, the processor 150 may output the lock screen, which includes the area indicating the voice command function and is released by the gesture input, as in the state 1803, or may release the lock screen and may output the area indicating the voice command function with the specified screen in the background, as in the state 1805.

Figure 18B:
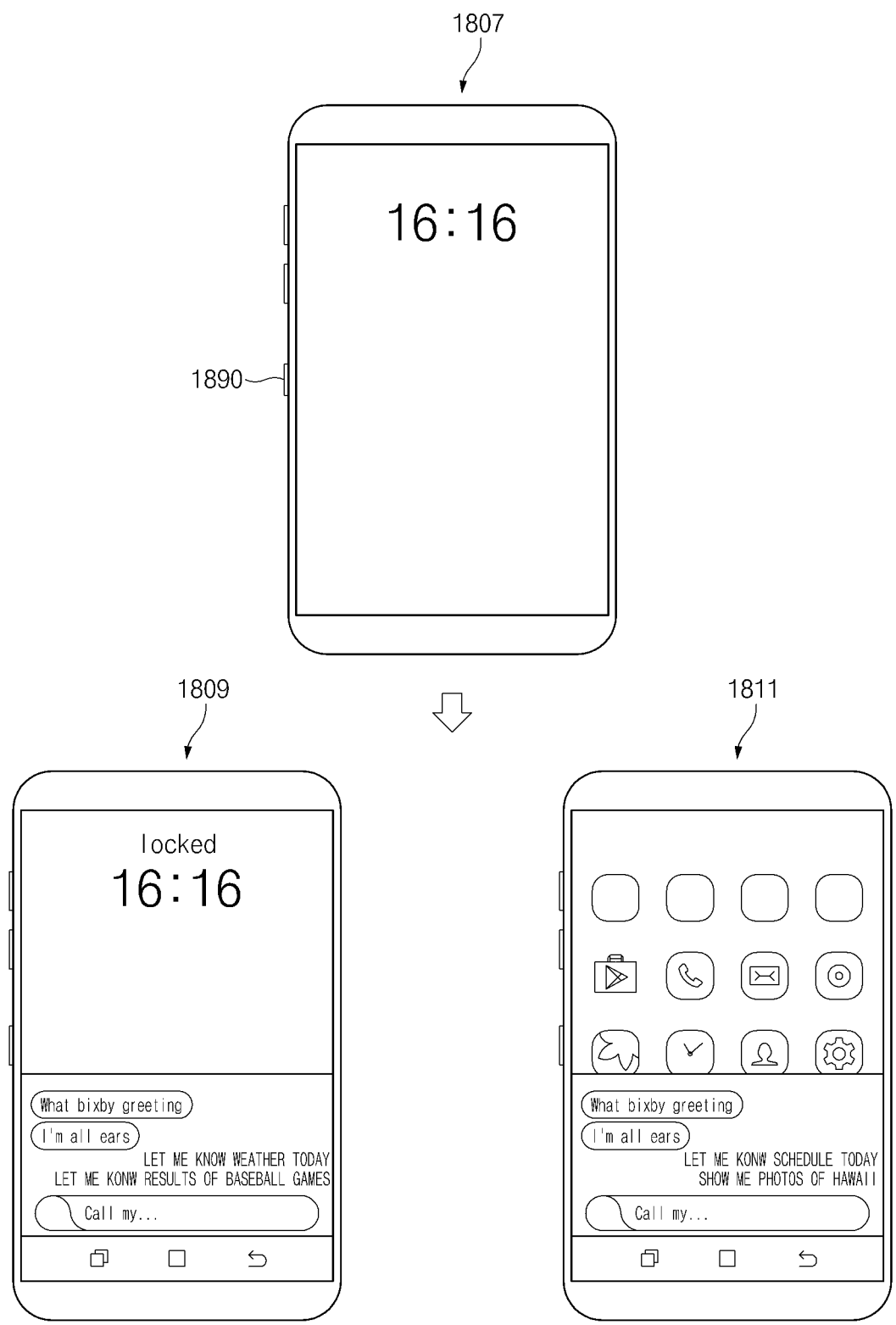
FIG. 18B is a diagram illustrating an example of a screen interface for outputting various function execution results depending on a turned-on state of a display, according to an embodiment of the present disclosure.

FIG. 18B is a diagram illustrating an example of a screen interface for outputting various function execution results depending on a turned-on state of a display, according to an embodiment of the present disclosure.

Referring to FIG. 18B, if a physical button 1890 associated with executing a voice command function is pressed while the display 120 is turned on as in a state 1807, the processor 150 of the electronic device may output, on the display 120, a screen including an area indicating the voice command function while maintaining a locked state, as in a state 1809. According to an embodiment, as in a state 1811, the processor 150 may unlock a lock screen and may output an area indicating the voice command function on a specified screen (e.g., a home screen).

According to an example embodiment of the present disclosure, an electronic device is provided. The electronic device may include a housing including a first surface, a second surface opposite the first surface, and side surfaces, a touch screen display exposed through the first surface, a wireless communication circuit disposed inside the housing, an input button exposed through one of the side surfaces or the first surface, a microphone exposed through the housing, a processor disposed inside the housing and electrically connected with the wireless communication circuit, the input button, the microphone, and the touch screen display, and a memory located inside the housing and electrically connected with the processor and including a user interactive application having a first user interface, wherein the memory stores at least one instruction which, when executed by the processor, causes the processor to maintain a locked state of the electronic device while a lock screen is being displayed on the touch screen display, to receive user authentication information through a biometric sensor in the locked state, to change the device state to an unlocked state while the lock screen is being output on the touch screen display, to execute the user interactive application in response to a first user input received through the input button or the microphone, to receive a user request through the touch screen display or the microphone after the receipt of the first user input while the electronic device is unlocked, to transmit first data relating to the user request to a server through the wireless communication circuit, to receive second data relating to at least one instruction from the server through the wireless communication circuit and to perform an action based on at least a part of the second data, and wherein the action includes at least one of: a first type function performed in the locked state of the electronic device, a second type function performed in a state in which a lock setting is released using the first user interface and the lock screen is displayed, a third type function set to instruct the use of the first user interface and requiring the execution of another application program, and a fourth type function set to change a home screen and automatically execute another application program.

According to an example embodiment of the present disclosure, an electronic device is provided. The electronic device may include a display, a memory configured to store at least one piece of information to be output on the display, an input unit comprising input circuitry configured to receive an input of an execution signal for executing a specified voice command function based on a voice input received from a user, and a processor electrically connected with the display, the input unit, and the memory, wherein the processor is configured to confirm (or obtain information indicated) a locked state of the electronic device when receiving the execution signal and the user voice input associated with executing the voice command function, and to provide any one of an entire function execution state in which access to the entire information stored in the memory is allowed and a partial function execution state in which access to a part of the information stored in the memory is allowed, based on the locked state in relation to executing a function corresponding to the user voice input or outputting a result corresponding to the user voice input.

According to various example embodiments of the present disclosure, the processor may be configured to output the result corresponding to the user voice input based on the entire function execution state in a case where the display is in an unlocked state or has no lock setting.

According to various example embodiments of the present disclosure, the processor may be configured to output the result corresponding to the user voice input based on the entire function execution state if the display is in a locked state that is releasable by a gesture input.

According to various example embodiments of the present disclosure, the processor may be configured to release the locked state in response to the receipt of the execution signal and to output the result corresponding to the user voice input based on the entire function execution state if the display is in a locked state that is releasable by a gesture input.

According to various example embodiments of the present disclosure, the processor may be configured to buffer at least a part of the result corresponding to the user voice input if the display is in a locked state and to output the buffered result if the locked state is released.

According to various example embodiments of the present disclosure, the processor may be configured to output the result corresponding to the user voice input based on the partial function execution state if the display is in a locked state.

According to various example embodiments of the present disclosure, the processor may be configured to output the result corresponding to the user voice input again based on the entire function execution state if specified user authentication is completed in the partial function execution state.

According to various example embodiments of the present disclosure, the processor may be configured to determine whether the result corresponding to the user voice input has to be performed based on the entire function execution state and to output guide information to request user authentication where the display is in a locked state and the result corresponding to the user voice input has to be performed based on the entire function execution state.

According to various example embodiments of the present disclosure, the processor may be configured to automatically perform user authentication and to provide any one of the partial function execution state and the entire function execution state based on a result of the user authentication if the display is in a locked state.

According to various example embodiments of the present disclosure, the input unit (or input device) may include a physical button associated with the input of the execution signal and a fingerprint sensor disposed inside the physical button or in an area adjacent to the physical button, and wherein the processor is configured to perform fingerprint authentication based on fingerprint information automatically detected when the execution signal is input and output the result corresponding to the user voice input based on the entire function execution state when the fingerprint authentication is completed.

According to various example embodiments of the present disclosure, the electronic device may further comprise a sensor configured to recognize the user's iris or face, wherein the processor is configured to perform user authentication by automatically recognizing the user's iris or face when the execution signal is input and output the result corresponding to the user voice input based on the entire function execution state when the user authentication is completed.

According to various example embodiments of the present disclosure, the processor may be configured to output a relatively public hint in response to the execution of the voice command function if the display is in a locked state.

According to various example embodiments of the present disclosure, the processor may be configured to output a relatively private hint in response to the execution of the voice command function if the display is in an unlocked state or has no lock setting.

According to various example embodiments of the present disclosure, the processor may be configured to output information for instructing a partial function execution state of the voice command function while maintaining at least a part of a lock screen if the display is in a locked state.

According to various example embodiments of the present disclosure, the processor may be configured to release a lock setting and to output information for instructing an entire function execution state of the voice command function with a specified screen in a background if specified user authentication is completed while the display is locked.

Figure 19:
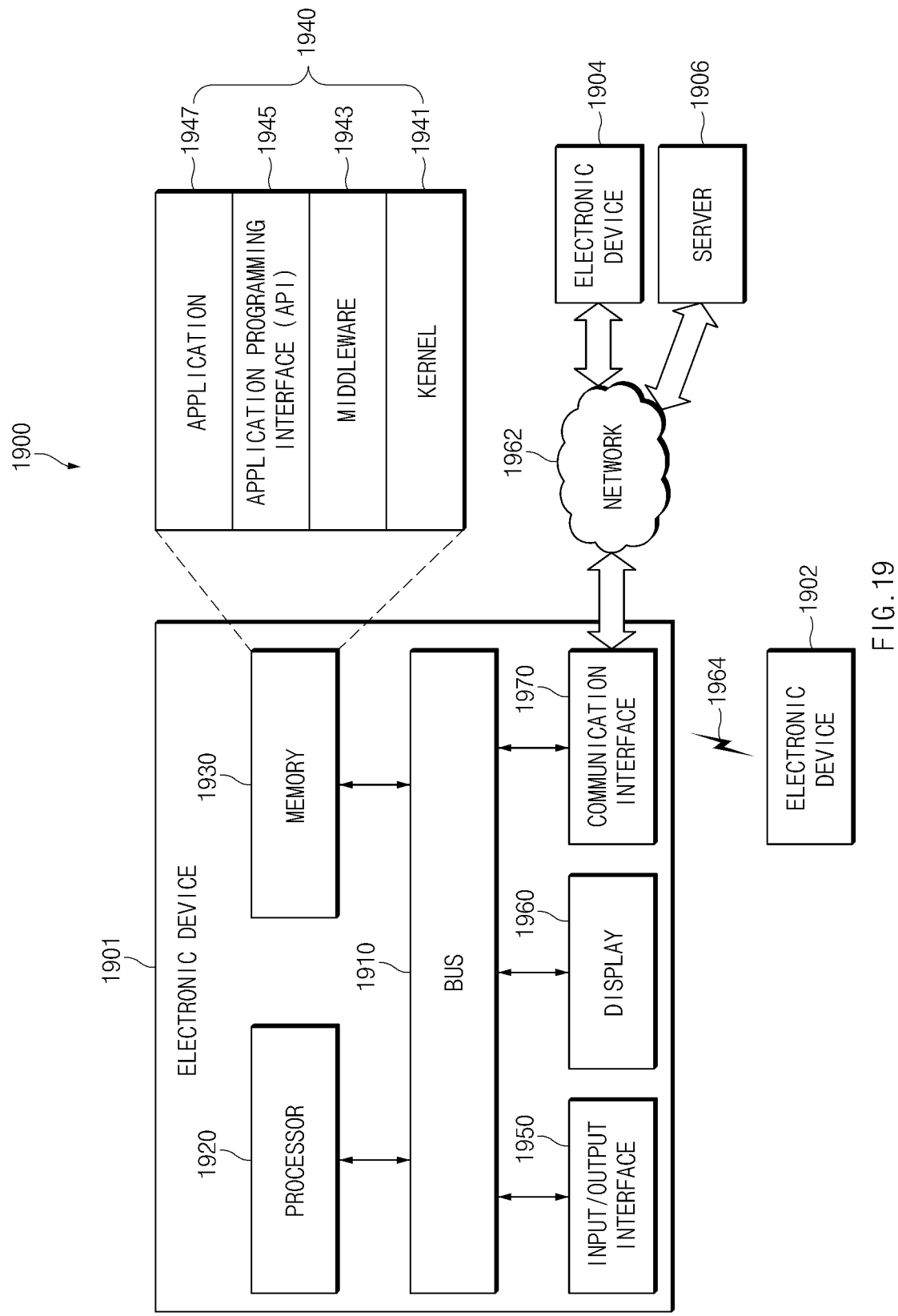
FIG. 19 is a block diagram illustrating an electronic device in a network environment according to various embodiments of the present disclosure.

FIG. 19 is a block diagram illustrating an electronic device in a network environment according to various embodiments of the present disclosure.

Referring to FIG. 19, according to various embodiments, an electronic device 1901 in a network environment 1900 will be described. The electronic device 1901 may include a bus 1910, a processor (e.g., including processing circuitry) 1920, a memory 1930, an input/output interface (e.g., including input/output circuitry) 1950, a display 1960, and a communication interface (e.g., including communication circuitry) 1970.

Referring to FIG. 19, in various embodiments, an electronic device 1901 and a first external electronic device 1902, a second external electronic device 1904, or a server 1906 may connect with each other through a network 1962 or local-area communication 1964. The electronic device 1901 may include a bus 1910, a processor 1920, a memory 1930, an input and output interface 1950, a display 1960, and a communication interface 1970. In various embodiments, at least one of the components may be omitted from the electronic device 1901, or other components may be additionally included in the electronic device 1901.

The bus 1910 may be, for example, a circuit which connects the components 1920 to 1970 with each other and transmits a communication signal (e.g., a control message and/or data) between the components.

The processor 1920 may include various processing circuitry, such as, for example, and without limitation, one or more of a dedicated processor, a central processing unit (CPU), an application processor (AP), or a communication processor (CP), or the like. For example, the processor 1920 may perform calculation or data processing about control and/or communication of at least another of the components of the electronic device 1901.

The memory 1930 may include a volatile and/or nonvolatile memory. The memory 1930 may store, for example, a command or data associated with at least another of the components of the electronic device 1901. According to an embodiment, the memory 1930 may store software and/or a program 1940. The program 1940 may include, for example, a kernel 1941, a middleware 1943, an application programming interface (API) 1945, and/or an least one application program 1947 (or "at least one application"), and the like. At least part of the kernel 1941, the middleware 1943, or the API 1945 may be referred to as an operating system (OS).

The kernel 1941 may control or manage, for example, system resources (e.g., the bus 1910, the processor 1920, or the memory 1930, and the like) used to execute an operation or function implemented in the other programs (e.g., the middleware 1943, the API 1945, or the application program 1947). Also, as the middleware 1943, the API 1945, or the application program 1947 accesses a separate component of the electronic device 1901, the kernel 1941 may provide an interface which may control or manage system resources.

The middleware 1943 may play a role as, for example, a go-between such that the API 1945 or the application program 1947 communicates with the kernel 1941 to communicate data.

Also, the middleware 1943 may process one or more work requests, received from the application program 1947, in order of priority. For example, the middleware 1943 may assign priority which may use system resources (the bus 1910, the processor 1920, or the memory 1930, and the like) of the electronic device 1901 to at least one of the at least one application program 1947. For example, the middleware 1943 may perform scheduling or load balancing for the one or more work requests by processing the one or more work requests in order of the priority assigned to the at least one of the at least one application program 1947.

The API 1945 may be, for example, an interface in which the application program 1947 controls a function provided from the kernel 1941 or the middleware 1943. For example, the API 1945 may include at least one interface or function (e.g., a command) for file control, window control, image processing, or text control, and the like.

The input/output interface 1950 may include various input/output circuitry and play a role as, for example, an interface which may transmit a command or data input from a user or another external device to another component (or other components) of the electronic device 1901. Also, input and output interface 1950 may output an instruction or data received from another component (or other components) of the electronic device 1901 to the user or the other external device.

The display 1960 may include, for example, a liquid crystal display (LCD), a light emitting diode (LED) display, an organic LED (OLED) display, a microelectromechanical systems (MEMS) display, or an electronic paper display, or the like. The display 1960 may display, for example, a variety of content (e.g., text, images, videos, icons, or symbols, and the like) to the user. The display 1960 may include a touch screen, and may receive, for example, touch, gesture, proximity, or a hovering input using an electronic pen or part of a body of the user.

The communication interface 1970 may establish communication between, for example, the electronic device 1901 and an external device (e.g., a first external electronic device 1902, a second external electronic device 1904, or a server 1906). For example, the communication interface 1970 may connect to a network 1962 through wireless communication or wired communication and may communicate with the external device (e.g., the second external electronic device 1904 or the server 1906).

The wireless communication may use, for example, at least one of long term evolution (LTE), LTE-advanced (LIE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1964. The local-area communication 1964 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1901 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1962 may include a telecommunications network, for example, at least one of a computer network (e.g., a local area network (LAN) or a wide area network (WAN)), the Internet, or a telephone network.

Each of the first and second external electronic devices 1902 and 1904 may be the same as or different device from the electronic device 1901. According to an embodiment, the server 1906 may include a group of one or more servers. According to various embodiments, all or some of operations executed in the electronic device 1901 may be executed in another electronic device or a plurality of electronic devices (e.g., the first external electronic device 1902, the second external electronic device 1904, or the server 1906). According to an embodiment, if the electronic device 1901 should perform any function or service automatically or according to a request, it may request another device (e.g., the first external electronic device 1902, the second external electronic device 1904, or the server 106) to perform at least part of the function or service, rather than executing the function or service for itself or in addition to the function or service. The other electronic device (e.g., the first external electronic device 1902, the second external electronic device 1904, or the server 1906) may execute the requested function or the added function and may transmit the executed result to the electronic device 1901. The electronic device 1901 may process the received result without change or additionally and may provide the requested function or service. For this purpose, for example, cloud computing technologies, distributed computing technologies, or client-server computing technologies may be used.

The above-described electronic device 1901 may be connected to another electronic device or a server 1906 through a network and may receive contents from the other electronic device or the server 1906.

Figure 20:
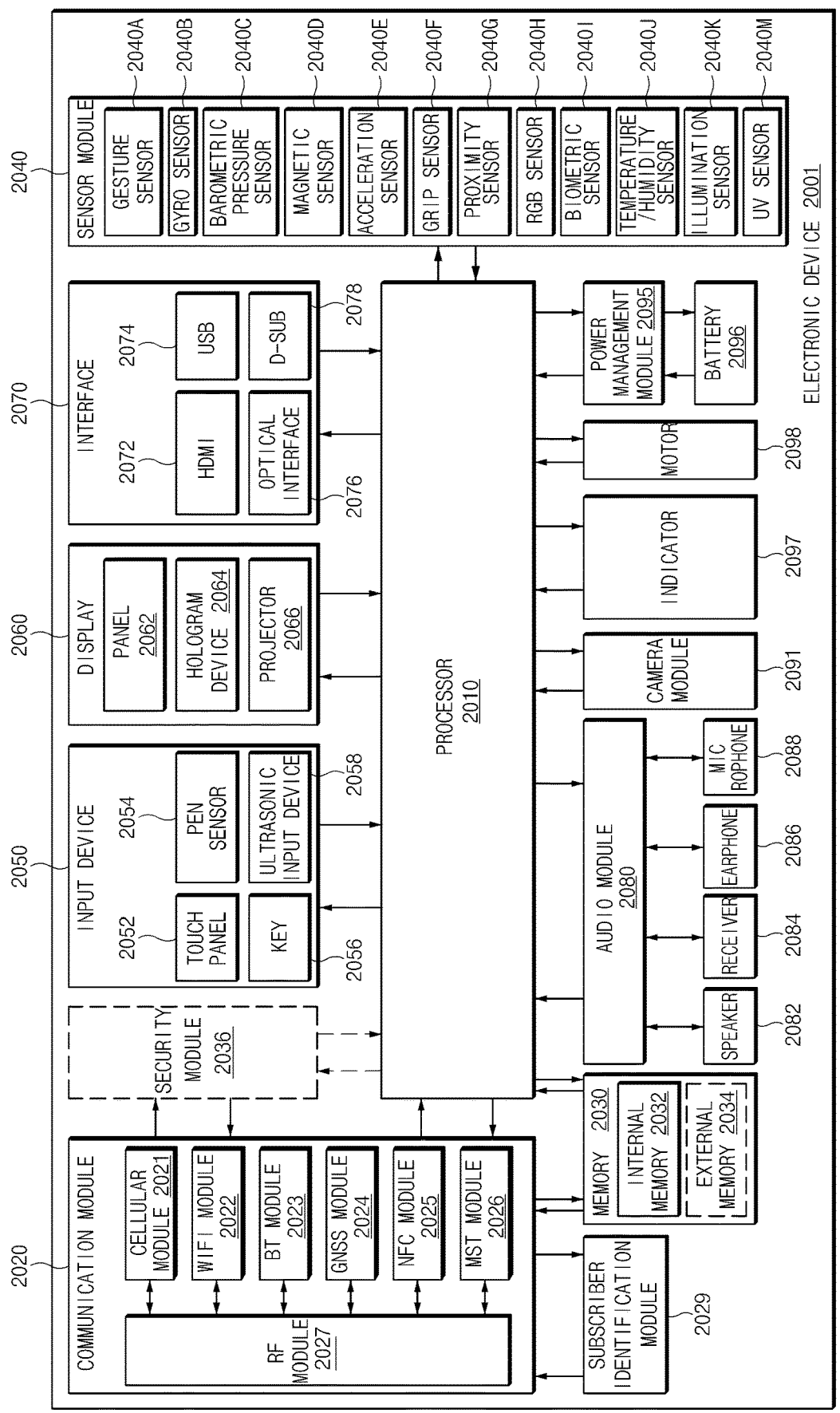
FIG. 20 is a block diagram illustrating an example configuration of an electronic device according to various embodiments of the present disclosure.

FIG. 20 is a block diagram illustrating an example configuration of an electronic device according to various embodiments of the present disclosure.

Referring to FIG. 20, an electronic device 2001 may include all or a part of the electronic device 1901 illustrated in FIG. 19. The electronic device 2001 may include one or more processors (e.g., an application processor (AP)) (e.g., including processing circuitry) 2010, a communication module (e.g., including communication circuitry) 2020, a subscriber identification module 2029, a memory 2030, a security module 2036, a sensor module 2040, an input device (e.g., including input circuitry) 2050, a display 2060, an interface (e.g., including interface circuitry) 2070, an audio module 2080, a camera module 2091, a power management module 2095, a battery 2096, an indicator 2097, and a motor 2098.

The processor 2010 may include various processing circuitry and drive, for example, an operating system (OS) or an application program to control a plurality of hardware or software components connected thereto and may process and compute a variety of data. The processor 2010 may be implemented with, for example, a system on chip (SoC). According to an embodiment, the processor 2010 may include a graphic processing unit (GPU) (not shown) and/or an image signal processor (not shown). The processor 2010 may include at least some (e.g., a cellular module 2021) of the components shown in FIG. 20. The processor 2010 may load a command or data received from at least one of other components (e.g., a non-volatile memory) into a volatile memory to process the data and may store various data in a non-volatile memory.

The communication module 2020 may have the same or similar configuration to a communication interface 1970 of FIG. 19. The communication module 2020 may include various communication circuitry, such as, for example, and without limitation, the cellular module 2021, a wireless-fidelity (Wi-Fi) module 2022, a Bluetooth (BT) module 2023, a global navigation satellite system (GNSS) module 2024 (e.g., a GPS module, a Glonass module, a Beidou module, or a Galileo module), a near field communication (NFC) module 2025, an MST module 2026, and a radio frequency (RF) module 2027.

The cellular module 2021 may provide, for example, a voice call service, a video call service, a text message service, or an Internet service, and the like through a communication network. According to an embodiment, the cellular module 2021 may identify and authenticate the electronic device 2001 in a communication network using the SIM 2029 (e.g., a SIM card). According to an embodiment, the cellular module 2021 may perform at least part of functions which may be provided by the processor 2010. According to an embodiment, the cellular module 2021 may include a communication processor (CP).

The Wi-Fi module 2022, the BT module 2023, the GNSS module 2024, the NFC module 2025, or the MST module 2026 may include, for example, a processor for processing data transmitted and received through the corresponding module. According to various embodiments, at least some (e.g., two or more) of the cellular module 2021, the Wi-Fi module 2022, the BT module 2023, the GNSS module 2024, the NFC module 2025, or the MST module 2026 may be included in one integrated chip (IC) or one IC package.

The RF module 2027 may transmit and receive, for example, a communication signal (e.g., an RF signal). Though not shown, the RF module 2027 may include, for example, a transceiver, a power amplifier module (PAM), a frequency filter, or a low noise amplifier (LNA), or an antenna, and the like. According to another embodiment, at least one of the cellular module 2021, the Wi-Fi module 2022, the BT module 2023, the GNSS module 2024, the NFC module 2025, or the MST module 2026 may transmit and receive an RF signal through a separate RF module.

The SIM 2029 may include, for example, a card which includes a SIM and/or an embedded SIM. The SIM 2029 may include unique identification information (e.g., an integrated circuit card identifier (ICCID)) or subscriber information (e.g., an international mobile subscriber identity (IMSI)).

The memory 2030 (e.g., a memory 1930 of FIG. 19) may include, for example, an embedded memory 2032 and/or an external memory 2034. The embedded memory 2032 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 2034 may include a flash drive, for example, a compact flash (CF), a secure digital (SD), a micro-SD, a mini-SD, an extreme digital (xD), a multimedia car (MMC), or a memory stick, and the like. The external memory 2034 may operatively and/or physically connect with the electronic device 2001 through various interfaces.

The security module 2036 may be a module which has a relatively higher secure level than the memory 2030 and may be a circuit which stores secure data and guarantees a protected execution environment. The secure module 2036 may be implemented with a separate circuit and may include a separate processor. The secure module 2036 may include, for example, an embedded secure element (eSE) which is present in a removable smart chip or a removable SD card or is embedded in a fixed chip of the electronic device 2001. Also, the secure module 2036 may be driven by an OS different from the OS of the electronic device 2001. For example, the secure module 2036 may operate based on a java card open platform (JCOP) OS.

The sensor module 2040 may measure, for example, a physical quantity or may detect an operation state of the electronic device 2001, and may convert the measured or detected information to an electrical signal. The sensor module 2040 may include at least one of, for example, a gesture sensor 2040A, a gyro sensor 2040B, a barometric pressure sensor 2040C, a magnetic sensor 2040D, an acceleration sensor 2040E, a grip sensor 2040F, a proximity sensor 2040G, a color sensor 2040H (e.g., red, green, blue (RGB) sensor), a biometric sensor 2040I, a temperature/ humidity sensor 2040J, an illumination sensor 2040K, or an ultraviolet (UV) sensor 2040M. Additionally or alternatively, the sensor module 2040 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 2040 may further include a control circuit for controlling at least one or more sensors included therein. According to various embodiments, the electronic device 2001 may further include a processor configured to control the sensor module 2040, as part of the processor 2010 or to be independent of the processor 2010. While the processor 2010 is in a sleep state, the electronic device 2001 may control the sensor module 2040.

The input device 2050 may include various input circuitry, such as, for example, and without limitation, a touch panel 2052, a (digital) pen sensor 2054, a key 2056, or an ultrasonic input device 2058, or the like. The touch panel 2052 may use at least one of, for example, a capacitive type, a resistive type, an infrared type, or an ultrasonic type. Also, the touch panel 2052 may further include a control circuit. The touch panel 2052 may further include a tactile layer and may provide a tactile reaction to a user.

The (digital) pen sensor 2054 may be, for example, part of the touch panel 2052 or may include a separate sheet for recognition. The key 2056 may include, for example, a physical button, an optical key, or a keypad. The ultrasonic input device 2058 may allow the electronic device 2001 to detect a sound wave using a microphone (e.g., a microphone 2088) and to verify data through an input tool generating an ultrasonic signal.

The display 2060 (e.g., a display 1960 of FIG. 19) may include a panel 2062, a hologram device 2064, or a projector 2066. The panel 2062 may include the same or similar configuration to the display 160 or 1960. The panel 2062 may be implemented to be, for example, flexible, transparent, or wearable. The panel 2062 and the touch panel 2052 may be integrated into one module. The hologram device 2064 may show a stereoscopic image in a space using interference of light. The projector 2066 may project light onto a screen to display an image. The screen may be positioned, for example, inside or outside the electronic device 2001. According to an embodiment, the display 2060 may further include a control circuit for controlling the panel 2062, the hologram device 2064, or the projector 2066.

The interface 2070 may include various interface circuitry, such as, for example, and without limitation, a high-definition multimedia interface (HDMI) 2072, a universal serial bus (USB) 2074, an optical interface 2076, or a D-subminiature 2078, or the like. The interface 2070 may be included in, for example, a communication interface 170 or 1970 shown in FIG. 2 or 19. Additionally or alternatively, the interface 2070 may include, for example, a mobile high definition link (MHL) interface, an SD card/multimedia card (MMC) interface, or an infrared data association (IrDA) standard interface.

The audio module 2080 may convert a sound and an electric signal in dual directions. At least part of components of the audio module 2080 may be included in, for example, an input and output interface 1950 (or a user interface) shown in FIG. 19. The audio module 2080 may process sound information input or output through, for example, a speaker 2082, a receiver 2084, an earphone 2086, or the microphone 2088, and the like.

The camera module 2091 may be a device which captures a still image and a moving image. According to an embodiment, the camera module 2091 may include one or more image sensors (not shown) (e.g., a front sensor or a rear sensor), a lens (not shown), an image signal processor (ISP) (not shown), or a flash (not shown) (e.g., an LED or a xenon lamp).

The power management module 2095 may manage, for example, power of the electronic device 2001. According to an embodiment, though not shown, the power management module 2095 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 2096 and voltage, current, or temperature thereof while the battery 2096 is charged. The battery 2096 may include, for example, a rechargeable battery or a solar battery.

The indicator 2097 may display a specific state of the electronic device 2001 or part (e.g., the processor 2010) thereof, for example, a booting state, a message state, or a charging state, and the like. The motor 2098 may convert an electric signal into mechanical vibration and may generate vibration or a haptic effect, and the like. Though not shown, the electronic device 2001 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 21:
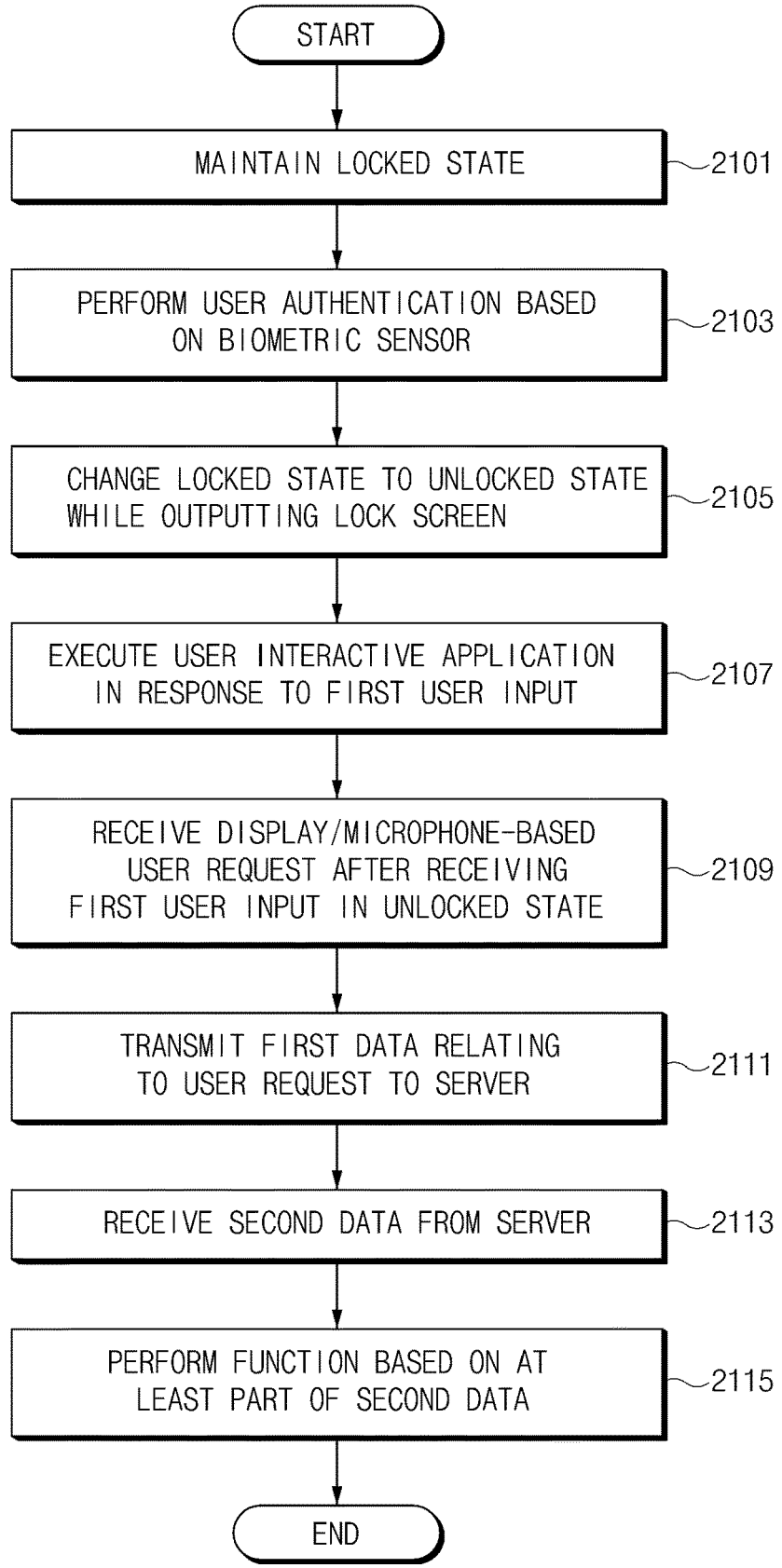
FIG. 21 is a flowchart illustrating an example of an operating method of an electronic device, according to various embodiments.

FIG. 21 is a flowchart illustrating an example of an operating method of an electronic device, according to various embodiments.

Referring to FIG. 21, in regard to an operating method of an electronic device, the processor 150 may, in operation 2101, maintain a locked state. The locked state may include, for example, a lock setting state. In operation 2103, the processor 150 may perform user authentication based on a biometric sensor while maintaining the locked state. In operation 2105, the processor 150 may change the locked state to an unlocked state while outputting a lock screen on the display 120.

In operation 2107, the processor 150 may execute a user interactive application in response to a first user input. The first user input may include, for example, a user input corresponding to an operation of pressing an input button associated with executing a voice command function. In operation 2109, the processor 150 may receive a display/microphone-based user request after receiving the first user input in the unlocked state. In regard to the execution of the voice command function, the user request may include a sentence uttered by a user or an operation of touching the display 120 to make a request to execute a specific function in the state in which the lock screen is output.

In operation 2111, the processor 150 may transmit first data relating to the user request to a server. In operation 2113, the processor 150 may receive second data corresponding to the first data from the server. In operation 2115, the processor 150 may perform a function based on at least a part of the second data. For example, the processor 150 may perform at least one of a first type function performed in the locked state of the electronic device, a second type function unlocked using the first user interface and performed in the state in which the lock screen is displayed, a third type function set to instruct the use of the first user interface and requiring execution of another application program, and a fourth type function set to change a home screen and to automatically execute another application program.

Figure 22:
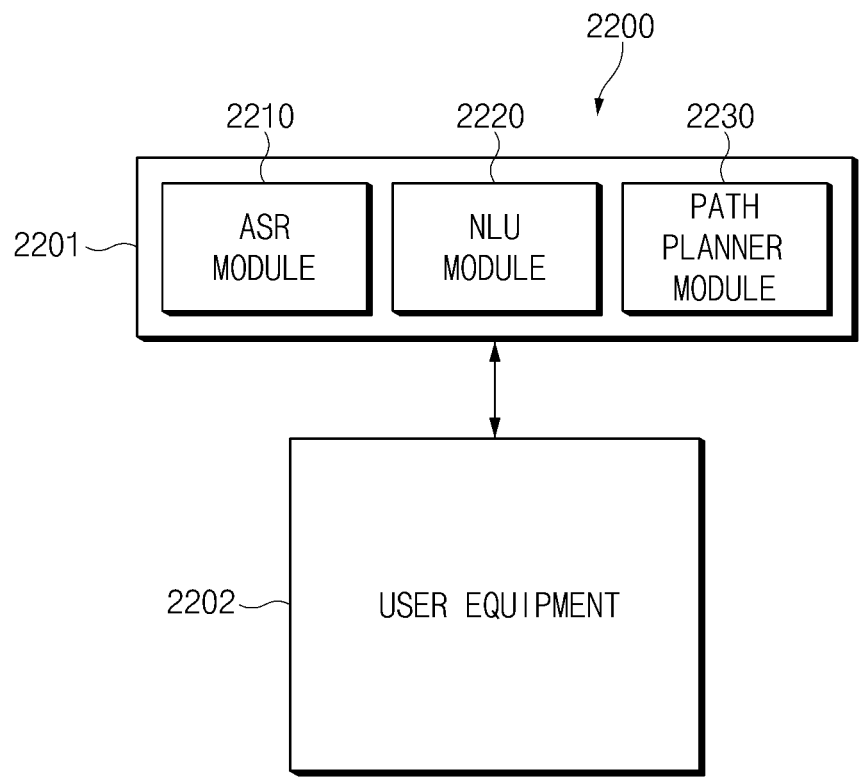
FIG. 22 is a block diagram illustrating an example of an integrated intelligent system according to an embodiment of the present disclosure.

FIG. 22 is a block diagram illustrating an example of an integrated intelligent system 2200 according to an embodiment of the present disclosure.

Referring to FIG. 22, an intelligent server 2201 may include an automatic speed recognition (ASR) module (e.g., including various processing circuitry and/or program elements) 2210, a natural language understanding (NLU) module (e.g., including various processing circuitry and/or program elements) 2220, and a path planner module (e.g., including various processing circuitry and/or program elements) 2230. The intelligent server 2201 may include at least a part of the intelligent server 200 described above with reference to FIGS. 1 to 2B.

The automatic speech recognition module 2210, the natural language understanding module 2220, and the path planner module 2230 of the intelligent server 2201 may generate a path rule. According to an embodiment, the automatic speech recognition (ASR) module 2210 may convert a user input received from user equipment 2202 into text data. According to an embodiment, the automatic speech recognition module 2210 may receive, from the user equipment 2202, at least one of a voice signal associated with executing a voice command function and a voice signal relating to a voice-unlock function (or speech information for voice unlock) and may perform speech recognition on the received voice signal. For example, the automatic speech recognition module 2210 may convert the speech information for voice unlock into text and may transmit the converted text to the user equipment 2202 (e.g., a client program of the user equipment 2202 associated with the voice-unlock function).

According to various embodiments, the automatic speech recognition module 2210 may at least temporarily store the speech information for voice unlock received from the user equipment 2202. The automatic speech recognition module 2210, if receiving the speech information for voice unlock from the user equipment 2202, may perform text conversion and may perform authentication to determine whether the converted text is identical to authentication information (e.g., text for authentication) set in advance. The automatic speech recognition module 2210 may provide the authentication result to the user equipment 2202. Authentication information (e.g., authentication speech information registered in advance for voice unlock or authentication text corresponding to the speech information registered for voice unlock) stored and managed in the automatic speech recognition module 2210 may be updated through cooperation with the user equipment 2202.

In regard to the above-described operation, the automatic speech recognition module 2210 may process the function of the speech recognition module described above with reference to FIG. 2B. Information about an acoustic model and a language model may be stored in, for example, an automatic speech recognition database. The authentication information (e.g., the authentication speech information received from the user equipment 2202 or the authentication text corresponding thereto) may be stored in the automatic speech recognition database (e.g., 211 of FIG. 2B). The speech information for voice unlock and the authentication speech information may be stored in the form of audio. As described above, the intelligent server 2201 may further include a speaker recognition module.

According to an embodiment, the natural language understanding module 2220 may discern user intent by performing a syntactic analysis and a semantic analysis, similarly to the natural language understanding module 220 described above with reference to FIG. 2B. According to an embodiment, the path planner module 2230 may generate a path rule using the user intent discerned by the natural language understanding module 2220, similarly to the path planner module 230 described above with reference to FIG. 2B. The generated path rule may be transmitted to the user equipment 2202.

In regard to the voice-unlock function applied to the voice command function, the user equipment 2202 may include a display, an input unit (e.g., a microphone), and a processor and may collect speech information and output at least some results of the voice command function depending on whether voice unlock is performed.

Figure 23:
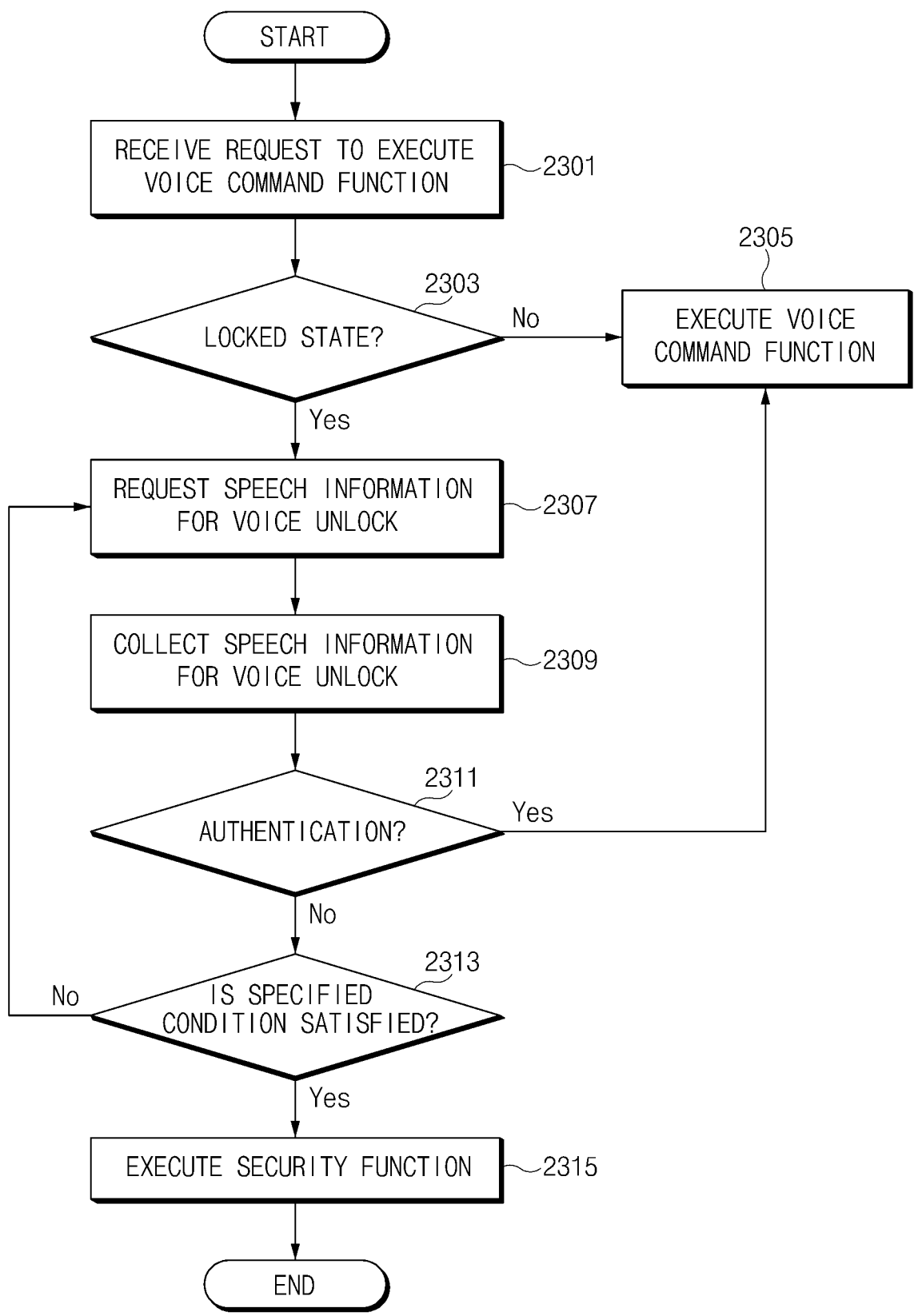
FIG. 23 is a flowchart illustrating an example of an operating method of user equipment in relation to an integrated intelligent service operation, according to an embodiment of the present disclosure.

FIG. 23 is a flowchart illustrating an example of an operating method of user equipment in relation to an integrated intelligent service operation, according to an embodiment of the present disclosure.

Referring to FIG. 23, in operation 2301, the user equipment 2202 may receive a request to execute a voice command function (e.g., Bixby function). In this regard, the user equipment 2202 may collect voice signals associated with executing the voice command function (e.g., wake-up signal+speech information relating to the voice command) through at least one microphone. Alternatively, if a wake-up voice signal is collected in a sleep state in which at least one microphone is turned on, the user equipment 2202 may activate a plurality of microphones and then may collect voice signals for a specified period of time as speech information relating to the voice command function. The voice signals collected by the user equipment 2202 may be transmitted to the above-described automatic speech recognition module 2210, and the automatic speech recognition module 2210 may perform text conversion on the collected voice signals. The converted text may be used by the natural language understanding module 2220 to extract intent associated with executing a function of the user equipment 2202, and the extracted intent may be used by the path planner module 2230 to generate a path rule. The path planner module 2230 may transmit the generated path rule to the user equipment 2202.

If the path rule is received from the intelligent server 2201, the user equipment 2202 may, in operation 2303, determine whether the user equipment 2202 is in a locked state. In the case where the user equipment 2202 is in an unlocked state or there is no lock setting, the user equipment 2202 may, in operation 2305, execute the aforementioned voice command function based on the collected speech information relating to the voice command function.

In the case where the determination result in operation 2303 shows that there is a lock setting, the user equipment 2202 may, in operation 2307, request speech information for voice unlock. For example, the user equipment 2202 may output specified display information (e.g., text or an image for making a request to perform speech for voice unlock) on the display. Alternatively, the user equipment 2202 may output specified audio information (e.g., an audio signal for making a request to perform speech for voice unlock) through a speaker. In this operation, the user equipment 2202 may use display information or audio information stored in a memory and relating to the voice unlock request. Alternatively, the user equipment 2202 may request display information or audio information relating to the voice unlock request from the intelligent server 2201 (e.g., the NLG module), and if receiving the display information or the audio information relating to the voice unlock request from the intelligent server 2201, the user equipment 2202 may output at least one of the received display information and the received audio information. A user may make a specified speech according to the voice unlock request.

In operation 2309, the user equipment 2202 may collect speech information for voice unlock. In this regard, the user equipment 2202 may activate at least one microphone, or may maintain the at least one microphone in the activated state, and may collect the speech information for voice unlock for a specified period of time or until a specified event is detected (e.g., end point detection (EPD) relating to speech).

In operation 2311, the user equipment 2202 may perform authentication on the collected speech information for voice unlock. In this operation, the user equipment 2202 may provide the collected speech information for voice unlock to the intelligent server 2201 (e.g., the automatic speech recognition module 2210) and may receive text corresponding to the speech information for voice unlock from the intelligent server 2201. The user equipment 2202 may compare the received text and authentication information stored in advance (e.g., authentication text stored for voice unlock) and may determine a success or failure in the authentication depending on whether the received text agrees with the authentication information stored in advance. According to various embodiments, the user equipment 2202 may perform speech recognition on the collected speech information for voice unlock by itself, may convert the speech information into text, and may compare the converted text and the authentication text stored in advance to determine a success or failure in the authentication. Alternatively, the user equipment 2202 may compare the collected speech information for voice unlock with a voice signal stored in advance and may determine a success or failure in the authentication according to the comparison result (e.g., matching of feature points, matching of a specific pattern of the voice signal, matching of frequency analysis of the voice signal, or the like).

In the case where the collected speech information for voice unlock is normally processed, the user equipment 2202 may proceed to operation 2305 to execute the voice command function. For example, in the case where the authentication succeeds, the user equipment 2202 may execute the path rule received from the intelligent server 2201 in relation to the voice command function.

In the case where the collected speech information for voice unlock is not normally processed, the user equipment 2202 may, in operation 2313, determine whether a specified condition is satisfied. For example, the user equipment 2202 may determine whether the authentication procedure for the speech information for voice unlock has repeatedly failed a specified number of times. Alternatively, the user equipment 2202 may determine whether a specified period of time has elapsed after the start of collection of the speech information for voice unlock in the state in which the authentication has not succeeded. In another case, the user equipment 2202 may determine whether a termination request signal has been received in relation to processing of the speech information for voice unlock.

In the case where the specified condition is satisfied, the user equipment 2202 may, in operation 2315, execute a security function. For example, the user equipment 2202 may perform lock setting so as not to be used for a specified period of time. In this operation, the user equipment 2202 may maintain the sleep state (the state in which the display is turned off). In another embodiment, the user equipment 2202 may transmit, to a specified electronic device, a message that the attempt to release the locked state has failed. Alternatively, the user equipment 2202 may output an audio signal (e.g., an alert sound, an alarm sound, or the like) that has volume greater than a specified magnitude. In another case, the user equipment 2202 may change to a sleep state or a locked state (e.g., a state in which pattern lock set in advance is output on a screen).

Figure 24:
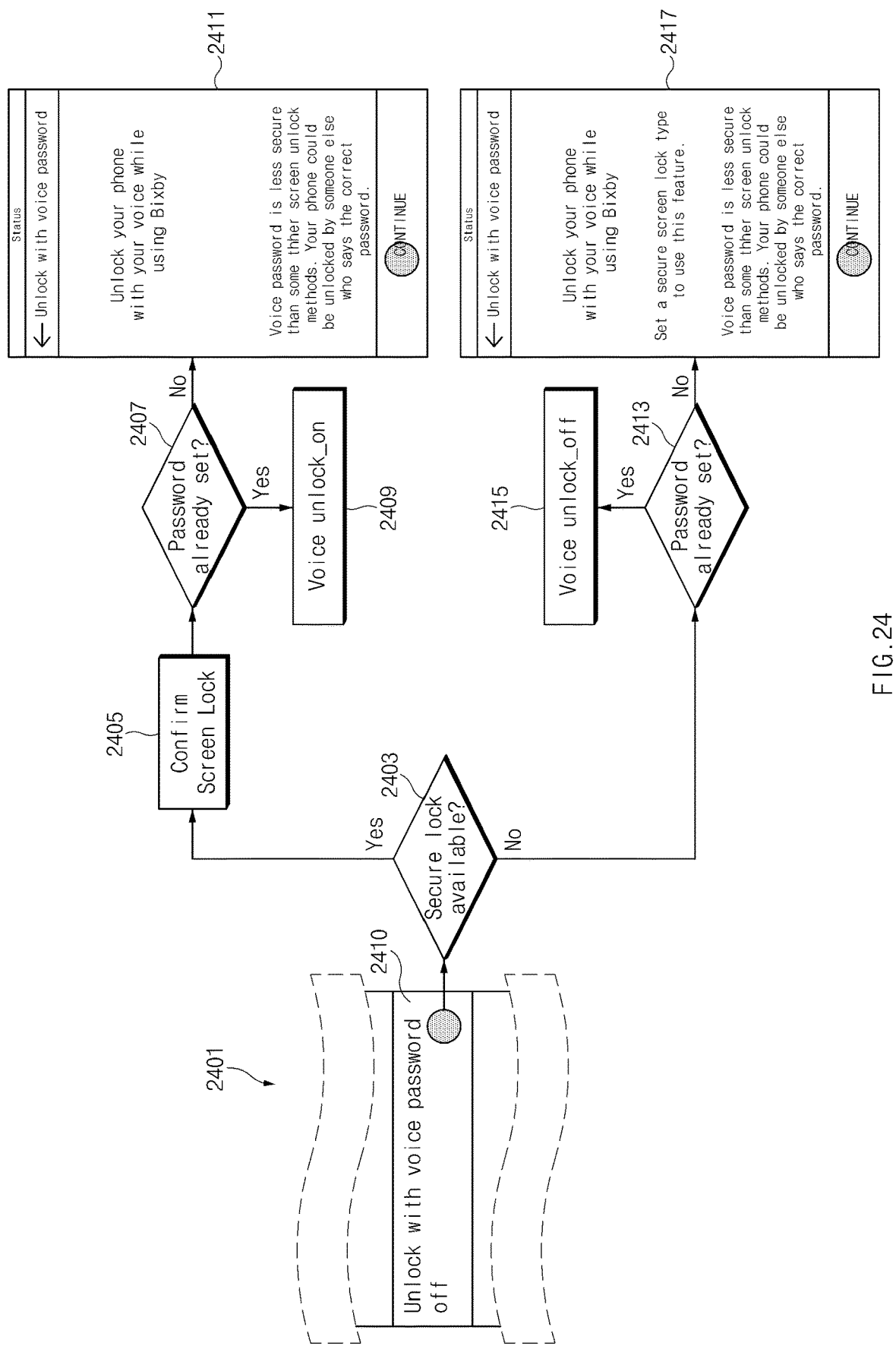
FIG. 24 is a diagram illustrating an example of a screen interface relating to a voice-unlock function operation applied to a voice command function, according to an embodiment of the present disclosure.

FIG. 24 is a diagram illustrating an example of a screen interface relating to a voice-unlock function operation applied to a voice command function, according to an embodiment of the present disclosure.

Referring to FIG. 24, as in a state 2401, the user equipment 2202 may output, on the display, a menu including a voice-unlock function setting item 2410 according to an embodiment. If the voice-unlock function setting item 2410 is selected, the user equipment 2202 may determine whether a lock setting is available (secure lock available, hereinafter, referred to as a normal security function setting), as in a state 2403. For example, the user equipment 2202 may determine whether pattern lock (e.g., unlock setting through a specified pattern input), number lock (e.g., lock setting cancelled in the case where a specified number is input), or password lock (e.g., lock setting cancelled in the case where specified letters are input) is available.

If a normal security function is available, the user equipment 2202 may perform a screen lock processing process, as in a state 2405. For example, the user equipment 2202 may provide a lock function relating to the pattern lock, the number lock, or the password lock (e.g., a function of outputting a pattern lock screen, a number lock screen, or a password lock screen) and may perform unlock according to a user input. In this operation, a user may confirm the previously registered pattern, number, or password setting, or may set a new pattern, number, or password.

If it is determined that the normal security function is available, the user equipment 2202 may determine whether authentication information for voice unlock (e.g., authentication information compared with speech information for voice unlock) has been set or registered, as in a state 2407. In the case where the authentication information for voice unlock has already been set, the user equipment 2202 may turn on a voice-unlock function (e.g., a function of performing unlock using specified voice or voice corresponding to specified text in the process of executing a voice command function), as in a state 2409. In the case where the authentication information for voice unlock has not been set, the user equipment 2202 may output a screen relating to voice unlock authentication applied to the voice command function operation, as in a state 2411. The user equipment 2202 may output information that the lock setting is releasable by voice in the voice command function operation, on the screen relating to the voice unlock authentication. If a continue item on the screen in the state 2411 is selected, the user equipment 2202 may output at least one screen interface relating to a registration process of the authentication information for voice unlock.

If it is determined that the normal security function is not available, the user equipment 2202 may determine whether the authentication information for voice unlock has been set, as in a state 2413, and in the case where the authentication information for voice unlock has already been set, the user equipment 2202 may turn off the voice-unlock function (e.g., a function of performing unlock using voice in relation to the execution of the voice command function), as in a state 2415. In the case where the authentication information for voice unlock has not been set (or registered), the user equipment 2202 may output a setting screen of the voice-unlock function relating to the voice command function operation, as in a state 2417. If a continue item on the screen in the state 2417 is selected, the user equipment 2202 may output a screen interface relating to at least one of a process of setting the normal security function (e.g., pattern lock, number lock, password lock, or the like) and a process of registering the authentication information for voice unlock.

Figure 25:
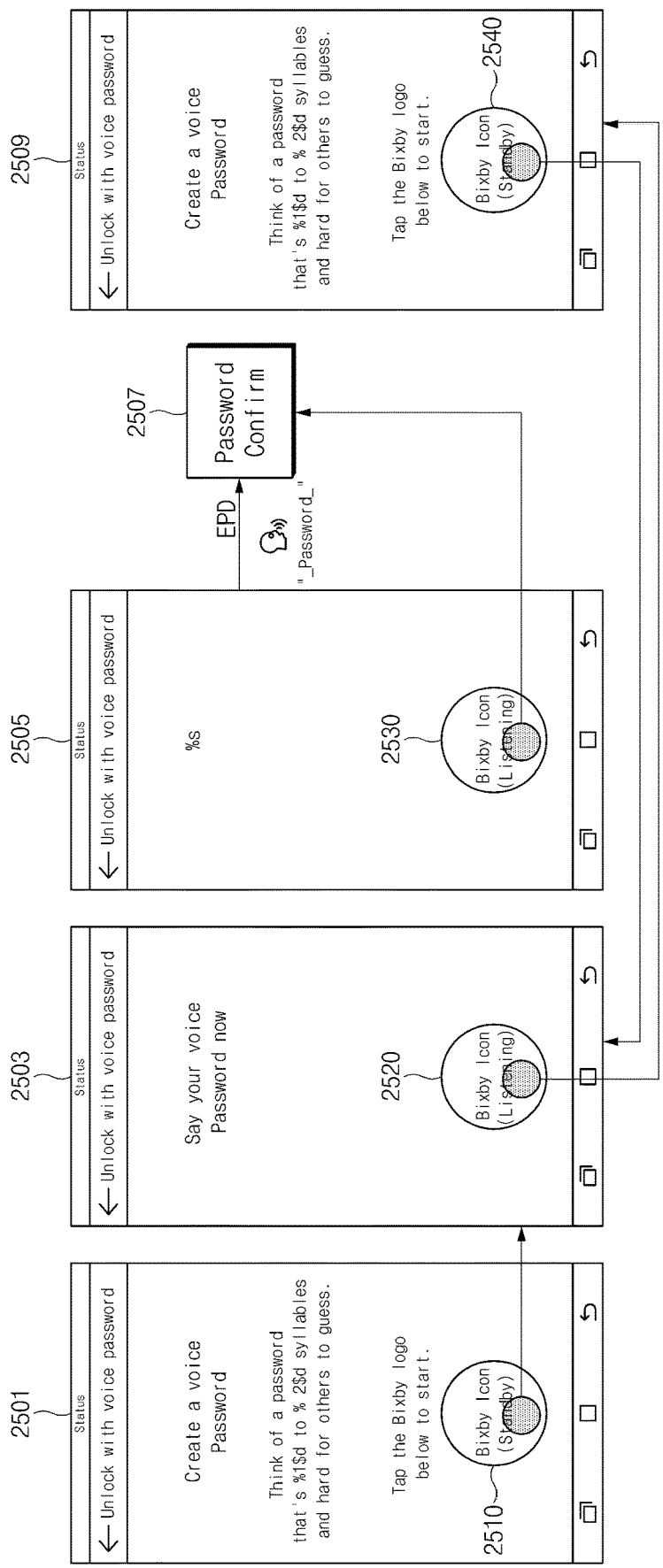
FIG. 25 is a diagram illustrating an example of a method for setting authentication information for voice unlock applied to a voice command function, according to an embodiment of the present disclosure.

FIG. 25 is a diagram illustrating an example of a method for setting authentication information for voice unlock applied to a voice command function, according to an embodiment of the present disclosure.

Referring to FIG. 25, in regard to a voice-unlock function applied to a voice command function, the user equipment 2202, if requested to set authentication information for voice unlock, may output a speech setting screen relating to the authentication information on the display, as in a state 2501. The speech setting screen may include, for example, a start button item 2510 for setting the start of speech.

If the start button item 2510 is selected, the user equipment 2202 may output at least one of display information and audio information to instruct a user to make a speech, as in a state 2503. In this operation, the user equipment 2202 may use at least one microphone to collect speech information uttered by the user. The user equipment 2202 may display a first indication item 2520 to inform the user that the speech information is being collected. In the case where the user makes a speech, the user equipment 2202 may collect the speech information using the microphone and may output text corresponding to the collected speech information on the display, as in a state 2505. While outputting the text corresponding to the collected speech information, the user equipment 2202 may display a second indication item 2530 to inform the user that the user equipment 2202 continues to collect speech information. In regard to the text output, the user equipment 2202 may transmit the speech information uttered by the user to the intelligent server 2201 and may receive text information corresponding to the speech information from the intelligent server 2201. Alternatively, the user equipment 2202 may convert the speech information into text based on a local speech recognition function and may output the converted text on the display.

If a specified period of time has elapsed or a specified event occurs, the user equipment 2202 may perform an operation of confirming the authentication information, as in a state 2507. The operation of confirming the authentication information may include an operation of confirming whether text corresponding to a voice signal uttered by the user corresponds to user intent. The specified event may include, for example, obtaining end point detection (EPD), obtaining a pressed state (e.g., a short press, a long press, a hold, a tap, or a double tap) of a specified hardware button (e.g., a button associated with executing the voice command function, a home button, a power button, a volume button, or the like), collecting a specified touch event (e.g., a specified number of touches within a specified period of time, a plurality of point touches, a pinch zoom-in, a pinch zoom-out, or the like) on a touch screen, and obtaining an input signal of a specified pattern using a stylus pen.

According to various embodiments, the user equipment 2202 may output a speech setting standby screen, as in a state 2509. The speech setting standby screen may include, for example, a standby indication item 2540. If the standby indication item 2540 is selected, the user equipment 2202 may enter the state 2503 to collect user speech information. In the case where the first indication item 2520 or the second indication item 2530 is pressed in the state in which the user speech information is collected and in the state in which the specified period of time has not elapsed or EPD is not obtained, the user equipment 2202 may output a speech setting standby screen, as in the state 2509. In the speech setting standby screen state, the user equipment 2202 may stop collecting separate speech information and may output information relating to the voice-unlock function. The information may include, for example, information that notifies the user that the voice-unlock function applied to the voice command function performs unlock in the case where a text conversion value is identical, without confirming a unique pattern of speech. The above-described information may also include contents that the unique pattern of speech is also confirmed according to a change in the characteristics of the voice-unlock function.

Figure 26:
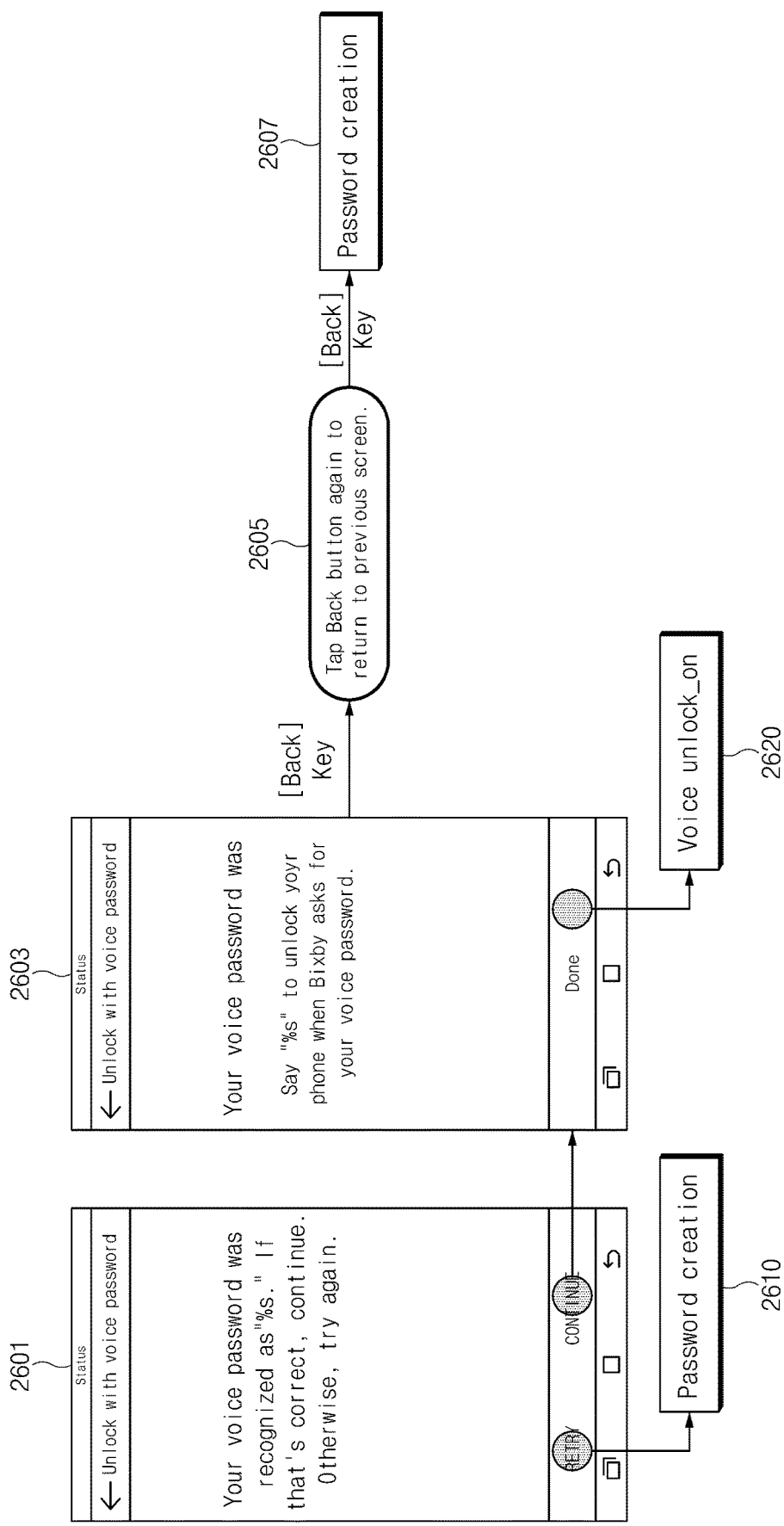
FIG. 26 is a diagram illustrating an example of a screen interface relating to authentication information identification in a voice-unlock function applied to a voice command function, according to an embodiment of the present disclosure.

FIG. 26 is a diagram illustrating an example of a screen interface relating to authentication information identification in a voice-unlock function applied to a voice command function, according to an embodiment of the present disclosure.

Referring to FIG. 26, the user equipment 2202 may output, on the display, information converted into text to correspond to collected speech information, as in a state 2601. A user may identify the text information displayed on the display to confirm whether the text information is identical to the speech uttered by the user. In the case where the text information differs from the speech that the user wants to utter or the user wants to enter different speech information, the user may request the previous screen (e.g., may request the previous screen by selecting a retry button item). When the previous screen is requested, the user equipment 2202 may proceed to an initial setting process of authentication information for voice unlock relating to a voice-unlock function (e.g., may move to a state of outputting the initial setting screen of the authentication information for voice unlock), as in a state 2601. Here, the state 2610 may correspond to the state 2501 of the initial setting process of the authentication information for voice unlock, which has been described above with reference to FIG. 25.

In the case where the text information is identical to the speech that the user wants to utter, the user may request the next setting screen (e.g., may request the next screen by selecting a continue button item). In response, the user equipment 2202 may output a registration screen to register the collected text information as the authentication information relating to the voice-unlock function, as in a state 2603. If an input (e.g., a selection of a done button item) for instructing completion of registration is made on the registration screen, the user equipment 2202 may turn on (or activate) a voice authentication function, as in a state 2620. If an input (e.g., a selection of a back key button) for requesting return to the previous function is made in the state 2603, the user equipment 2202 may output information (e.g., toast pop-up) to confirm the request for the return to the previous function, as in a state 2605. For example, the user equipment 2202 may output information to request the user to press the back key once more in the case where the user wants to return to the previous screen. In the case where the back key is pressed once more, the user equipment 2202 may change to a state of outputting a screen associated with setting the authentication information for voice unlock, as in a state 2607. For example, the user equipment 2202 may proceed to the initial setting process of the authentication information for voice unlock, which corresponds to the state 2501 described with reference to FIG. 25 (may output the screen in the state 2501).

Figure 27:
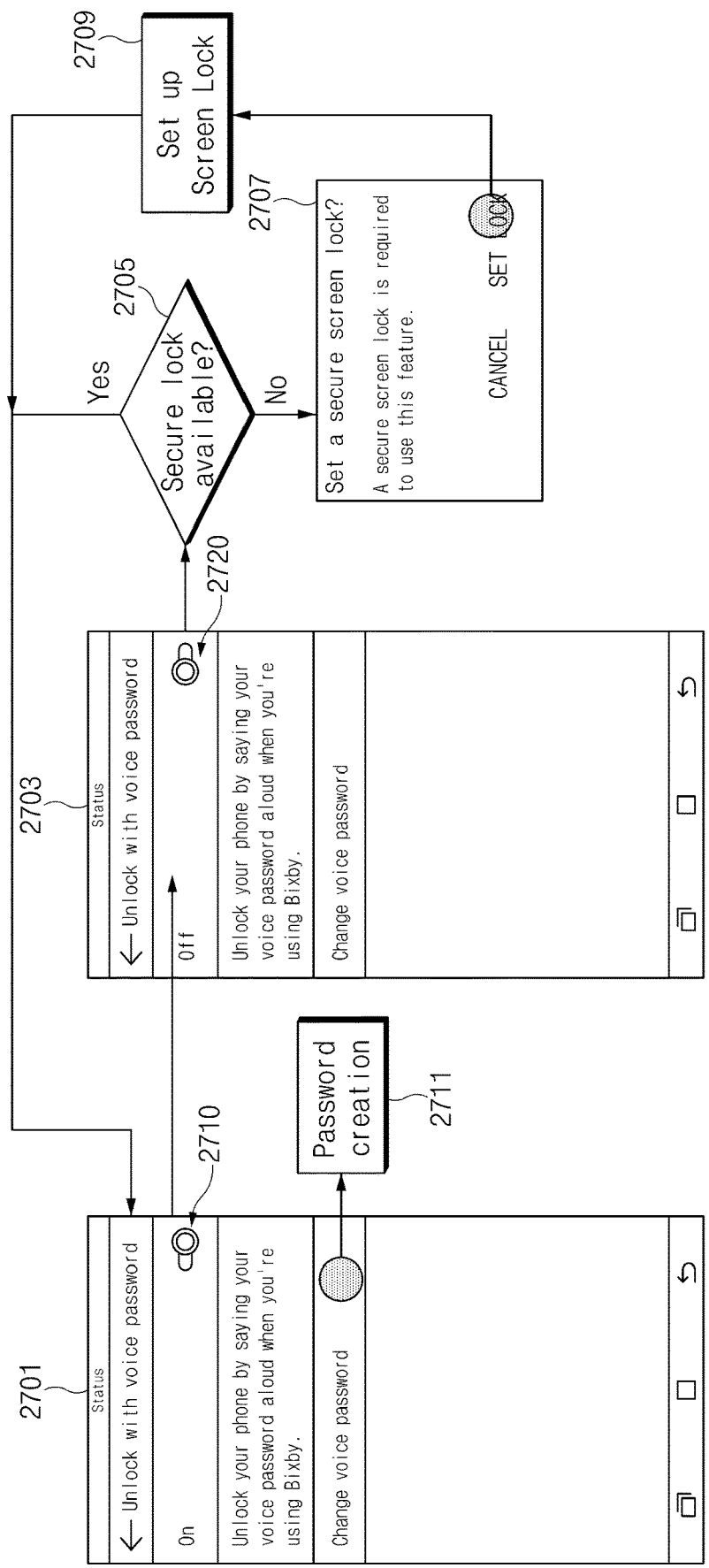
FIG. 27 is a diagram illustrating an example of a screen interface associated with setting a voice-unlock function applied to a voice command function, according to an embodiment of the present disclosure.

FIG. 27 is a diagram illustrating an example of a screen interface associated with setting a voice-unlock function applied to a voice command function, according to an embodiment of the present disclosure.

Referring to FIG. 27, the user equipment 2202 may output a setting screen of a voice-unlock function on the display, as in a state 2701. For example, the user equipment 2202 may provide a setting item relating to at least one of a selection of a setting function of an electronic device, a configuration of a voice command function, and a configuration of the voice-unlock function. If the setting item is selected is selected (or in the case where a voice-based setting function relating to the configuration of the voice-unlock function is called), the user equipment 2202 may output the setting screen of the voice-unlock function.

The setting screen of the voice-unlock function may include an item for manipulating (or determining) whether to activate or deactivate the voice-unlock function. For example, if the voice-unlock function is in an activated (e.g., turned-on) state, the user equipment 2202 may display the setting item corresponding to that in a turned-on state 2710, as in the state 2701. In the case where the setting item is manipulated to change the voice-unlock function to a deactivation state (e.g., turned-off) state, the user equipment 2202 may display the setting item in a turned-off state 2720, as in a state 2703.

In the case where a user input is received to change the voice-unlock function to an activation state while the voice-unlock function is in the deactivation state, the user equipment 2202 may determine whether a normal security function is available, as in a state 2705. The normal security function may include a lock setting function, such as the pattern lock, the number lock, or the password lock mentioned above. In the case where the normal security function is available, the user equipment 2202 may proceed to the state 2701 to output a screen indicating the voice-unlock function as an activation state.

In the case where the normal security function is not available, the user equipment 2202 may proceed to a state 2707 to output a screen (or pop-up) associated with setting the normal security function. In the case where the setting of the normal security function is cancelled on the screen associated with setting the normal security function, the user equipment 2202 may proceed to the state 2701 without setting the normal security function. If a setting item (e.g., set lock) is selected on the screen associated with setting the normal security function, the user equipment 2202 may proceed to a state 2709 to set screen lock. In this operation, the user equipment 2202 may change the previously registered pattern lock, number lock, or password lock to an activation state, or may receive a new pattern or number from a user. If the setting of the normal security function is completed, the user equipment 2202 may proceed to the state 2701 to output a screen indicating that the voice-unlock function applied to the voice command function is in an activated state.

According to various embodiments, in the state 2701 indicating the activation of the voice-unlock function, the user equipment 2202 may provide a change item (e.g., change voice password) to change authentication information for voice unlock. If the change item is selected, the user equipment 2202 may proceed to an initial setting process of the authentication information for voice unlock (e.g., the aforementioned state 2501), as in a state 2711.

Figure 28A:
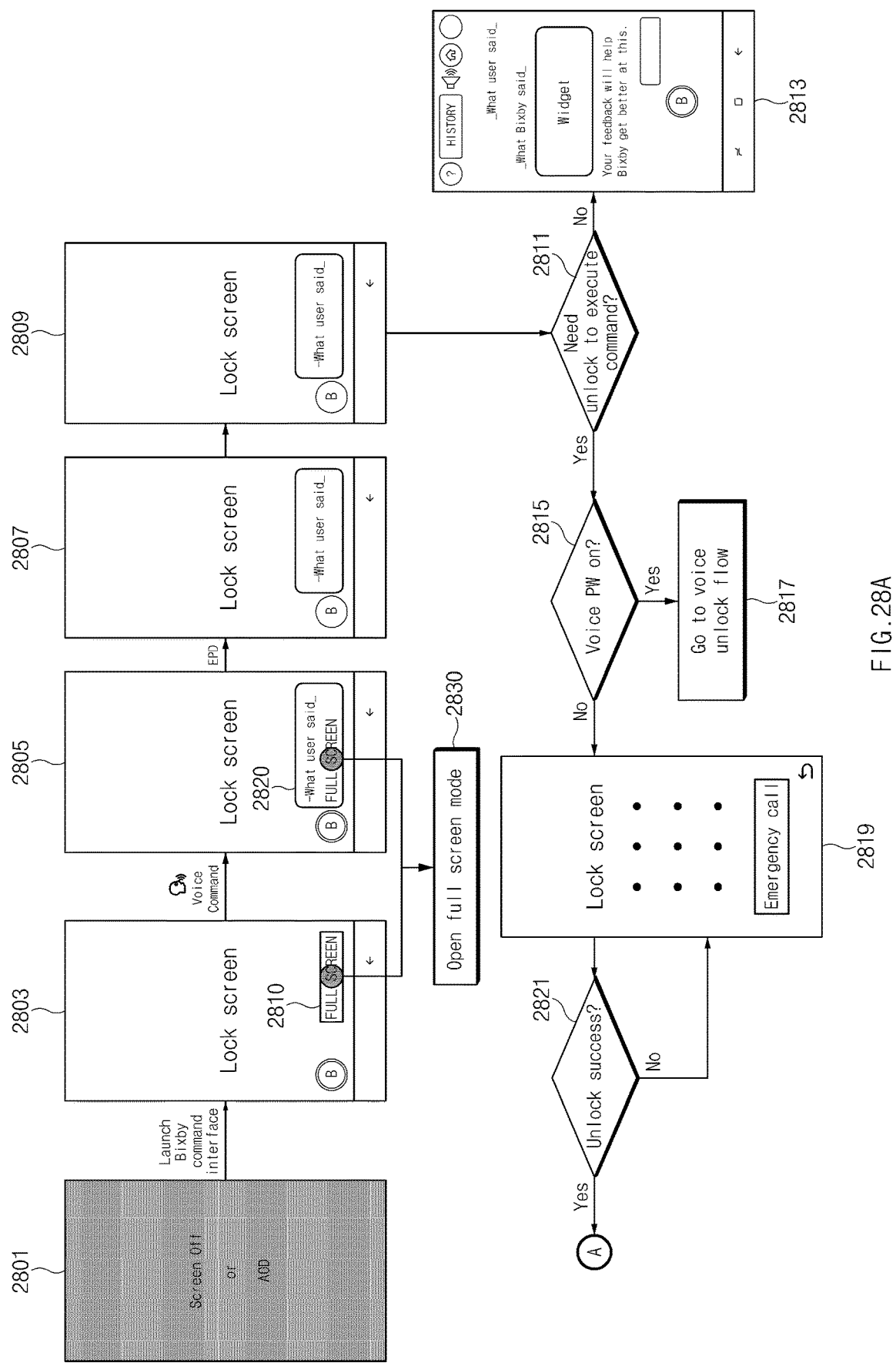
FIGS. 28A and 28B are diagrams illustrating an example of a voice-unlock function operation applied to execution of a voice command function, according to an embodiment of the present disclosure.
Figure 28B:
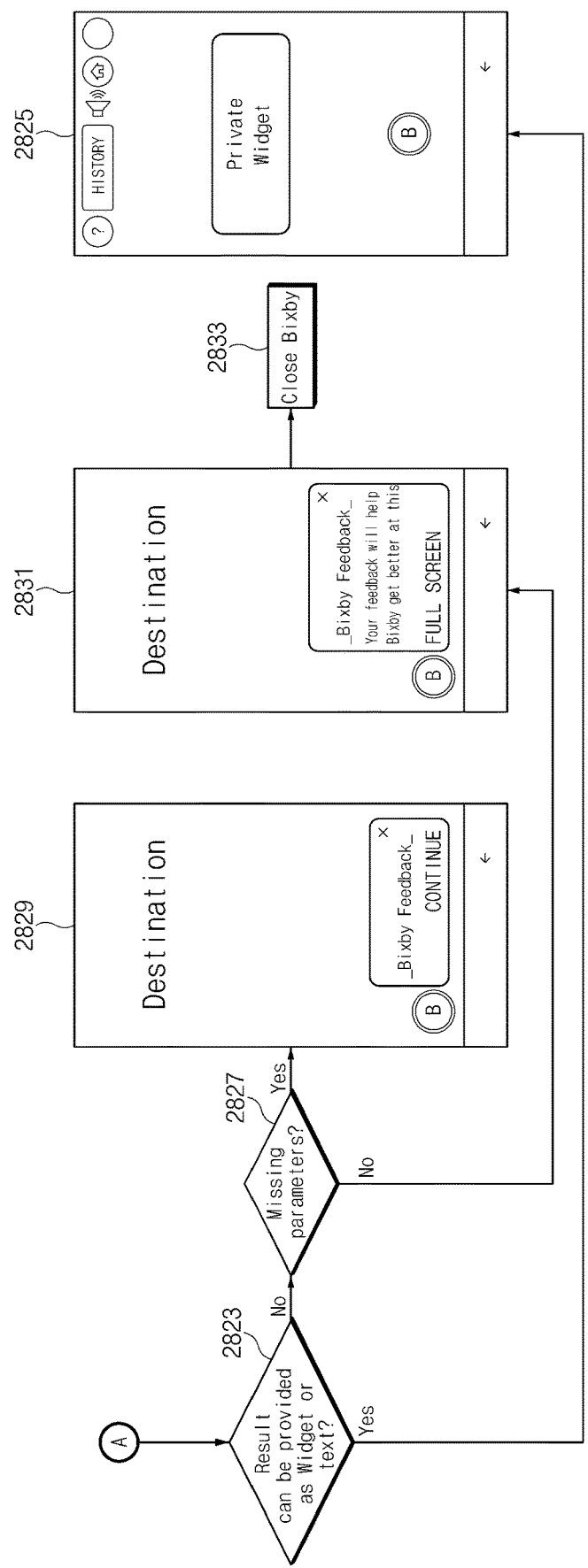

FIGS. 28A and 28B are diagrams illustrating an example of a voice-unlock function operation applied to the execution of a voice command function, according to an embodiment of the present disclosure.

Referring to FIGS. 28A and 28B, the user equipment 2202 may be in an always-on display (AOD) state (a state in which at least a part of the processor is asleep while the display is being restrictively operated), as in a state 2801. Alternatively, the user equipment 2202 may be maintained in a standby or sleep state (e.g., a state in which the display is turned off). To wake up an electronic device (a main processor) based on user speech, the user equipment 2202 in the AOD or sleep state may maintain at least one microphone in an activated state (may drive the microphone using a low-power processor distinguished from the main processor). According to various embodiments, the user equipment 2202 may include a separate physical button or a home button associated with executing a voice command function, and in the case where the corresponding button is pressed, the user equipment 2202 may execute an application associated with executing the voice command function.

According to various embodiments, if a specified user voice input for waking up the electronic device or a user voice input (e.g., "Hi, galaxy" or "Hi, Bixby") associated with executing the voice command function is collected, the user equipment 2202 may turn on the display, as in a state 2803. According to various embodiments, in the state 2803, the user equipment 2202 may output, on a side of the display, an icon (e.g., "B") indicating that an intelligent app (Bixby) associated with executing the voice command function is executed. In the state 2803, the user equipment 2202 may activate at least one microphone and may be in a state (e.g., Listening) in which user speech information relating to the voice command function is collected.

According to various embodiments, in the states 2803 and 2805, the user equipment 2202 may output full-screen view items 2810 and 2820 relating to the voice command function, and if the full-screen view items 2810 and 2820 are selected, the user equipment 2202 may output, on the display, a full screen configured in relation to the voice command function, as in a state 2830. Even though the full screen relating to the voice command function is output on the display, the user equipment 2202 may be maintained in a screen-locked state. Alternatively, the full screen relating to the voice command function may have a lock function and may be displayed instead of a lock screen.

If user speech information (e.g., a voice command) associated with executing the voice command function is collected, the user equipment 2202 may stream the collected user speech information to the intelligent server 2201, as in the state 2805. In this operation, the user equipment 2202 may stream obtained user speech information to the intelligent server 2201 in real time until a specified event occurs (e.g., EPD is obtained or a specified physical button is pressed or released). If the specified event is obtained (e.g., the EPD is obtained or the specified physical button is pressed) or a specified period of time passes, the user equipment 2202 may process a path rule received from the intelligent server 2201, as in a state 2807. In a state 2809, the user equipment 2202 may analyze the contents of the path rule to determine whether to perform the received path rule. The above-described states 2803 to 2809 may include a state in which a normal security function, for example, screen lock is available.

In a state 2811, the user equipment 2202 may determine whether unlock is required in relation to the execution of the path rule. In the case where unlock is not required, the user equipment 2202 may output a screen according to the execution of the path rule, as in a state 2813. For example, if receiving a path rule relating to clock information, weather information, voice volume control, brightness control of an electronic device, or the like that is set to not require unlock, the user equipment 2202 may output a function execution screen according to the corresponding path rule on the display without performing an unlock process.

In the case where unlock is required to execute the path rule, the user equipment 2202 may determine whether a voice-unlock function has been set, as in a state 2815. If the voice-unlock function has been set, the user equipment 2202 may perform the voice-unlock function, as in a state 2817. In this operation, the user equipment 2202 may output information to make a request to collect speech information for voice unlock, as described above with reference to FIG. 23. If a user makes a speech for voice unlock, the user equipment 2202 may collect speech information. The user equipment 2202 may collect text corresponding to the speech information through the intelligent server 2201 and then may compare the collected text with authentication information to determine whether authentication succeeds or not. If the voice-unlock function is successfully authenticated, the user equipment 2202 may perform a function according to the path rule obtained in relation to the execution of the voice command function.

In the case where the determination result in the state 2815 shows that the voice-unlock function has not been set, the user equipment 2202 may proceed to a state 2819 to output a lock screen according to a normal security function. In a state 2821, the user equipment 2202 may determine whether lock set according to the normal security function is unlocked. In the case where unlock fails, the user equipment 2202 may return to the state 2819. If the lock set according to the normal security function is unlocked, the user equipment 2202 may proceed to a state 2823 of FIG. 28B to determine whether an execution result of the voice command function is of a specified type (e.g., a widget or text) (Result can be provided as widget or text?).

The specified type may include, for example, data attributes associated with providing simple information with security (e.g., displaying the user's schedule information, displaying the user's appointments, displaying the user's financial information, or the like). According to various embodiments, the specified type may include, for example, information set to require unlock and satisfying a specified condition (e.g., information set to be output according to the execution of a single program). The specified condition relating to the specified type may vary depending on a change in settings or a design method. For example, the specified condition may include a condition for information selected by a user input, information associated with a specific program (e.g., an e-mail, a message, or the like), or the like. In the case where the execution result of the voice command function is of the specified type, the user equipment 2202 may output simple information with security on the display, as in a state 2825.

In the case where the execution result of the voice command function is not of the specified type, the user equipment 2202 may determine whether a parameter is required, as in a state 2827. The parameter may include input information that the user has to additionally enter into the user equipment 2202 according to the execution of the voice command function. In the case where the parameter is additionally required, the user equipment 2202 may continue to execute an intelligent app and may collect a user input in relation to the additional input of the parameter, as in a state 2829. The user input may be collected through the user's speech or may be input through a key input, a touch screen, or the like. In the case where the parameter does not need to be additionally input, the user equipment 2202 may execute a function according to the path rule and may output at least a part of a function execution screen on the display, as in a state 2831. If the user equipment 2202 is requested to end the voice command function, the user equipment 2202 may end the voice command function, as in a state 2833. For example, if a specified period of time passes or a user input to make a request to end the voice command function is generated in the state 2831, the user equipment 2202 may end the voice command function, as in the state 2833.

Figure 29A:
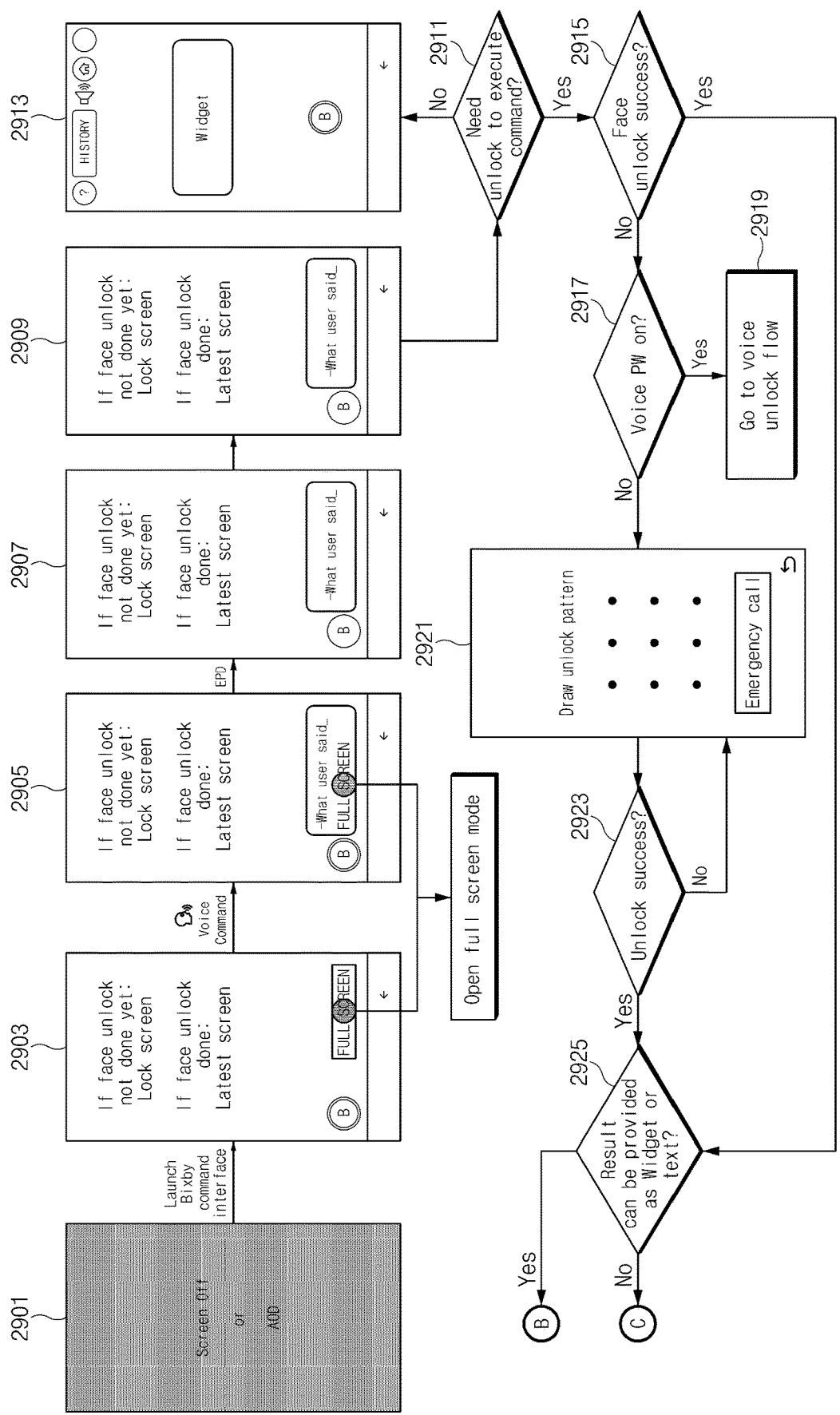
FIGS. 29A and 29B are diagrams illustrating an example of face recognition and a voice-unlock function operation applied to the execution of a voice command function, according to an embodiment of the present disclosure.
Figure 29B:
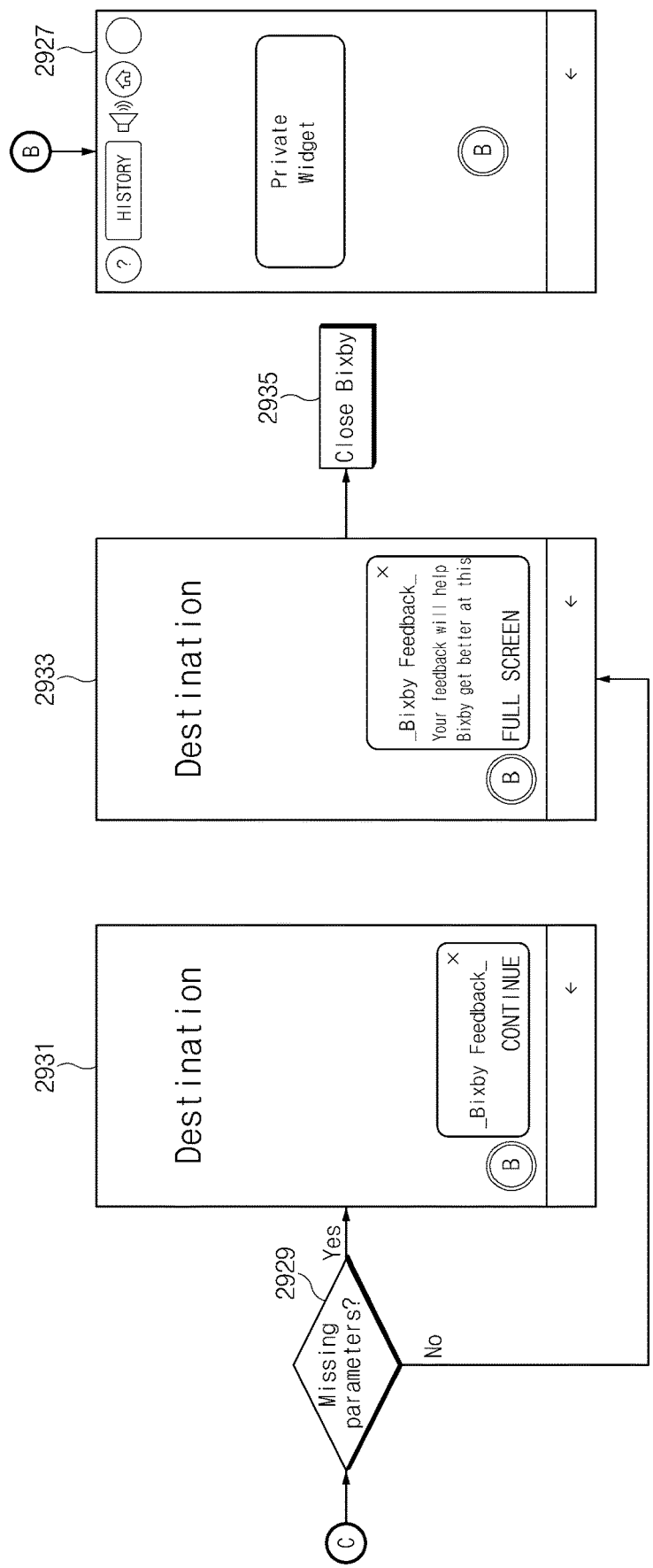

FIGS. 29A and 29B are diagrams illustrating an example of face recognition and a voice-unlock function operation applied to the execution of a voice command function, according to an embodiment of the present disclosure.

Referring to FIGS. 29A and 29B, the user equipment 2202 may be in an AOD state, as in a state 2901. The AOD state may include, for example, a state in which limited information (e.g., time information) is displayed on at least a part of a display area and a state in which at least one microphone is activated. If an input associated with executing a voice command function (e.g., pressing of a physical button associated with executing the voice command function or a user voice input for waking up the voice command function) is generated, the user equipment 2202 may output an execution screen of the voice command function on the display, as in a state 2903. If the AOD state changes to a state in which the display is turned on, the user equipment 2202 may recognize a user's face using a camera (e.g., at least one of an infra-red (IR) camera and an RGB camera) according to settings. The user equipment 2202 may output a lock screen on the display if failing to recognize the user's face and may output a setting screen (e.g., a screen right before the entrance to the AOD state, a virtual key input screen, or the like) on the display if succeeding in recognizing the user's face.

In the state 2903, the user equipment 2202 may output, on the display, an icon ("B") informing the user that the voice command function is being executed, as in the above-described state 2803. The user equipment 2202 may activate at least one microphone and may be in a state (e.g., Listening) in which user speech information relating to the voice command function is collected. If user speech information (e.g., a voice command) relating to the voice command function is collected, the user equipment 2202 may stream the collected user speech information to the intelligent server 2201, as in the state 2905. The user equipment 2202 may output text information corresponding to the user speech information on the display while collecting the above-described speech information. According to various embodiments, in the states 2903 and 2905, the user equipment 2202 may output full-screen view items (e.g., a full screen) relating to the voice command function, and if the full-screen view items are selected, the user equipment 2202 may output a full screen relating to the voice command function on the display.

If the input of the user speech information ends (e.g., EPD is obtained or a specified physical button is pressed long or tabbed twice), the user equipment 2202 may process a voice command function result (e.g., a path rule) corresponding to the user speech information and received from the intelligent server 2201 in relation to the voice command function, as in a state 2907. In a state 2909, the user equipment 2202 may analyze the received result, and in a state 2911, the user equipment 2202 may determine whether unlock is required to operate a device according to the voice command function result. For example, the user equipment 2202 may determine whether the voice command function result corresponds to information set to be output without unlock. In this regard, the user equipment 2202 may store and manage a list of information or information types set to be output without unlock. The information or information types registered in the list may be changed by user settings or may be varied in response to a change in the policy of the voice command function. Alternatively, the intelligent server 2201 may provide an instruction on whether unlock is required for the voice command function result, and in response to the corresponding instruction, the user equipment 2202 may determine whether to perform unlock.

In the case where unlock is not required, the user equipment 2202 may output the voice command function result on the display, as in a state 2913. In the case where unlock is required, the user equipment 2202 may determine whether face authentication has succeeded, as in a state 2915. In the case where the face authentication has failed or there is no setting for performing the face authentication, the user equipment 2202 may determine whether a voice-unlock function has been activated, as in a state 2917. In the case where the voice-unlock function has been activated, the user equipment 2202 may output a result of the voice command function based on the voice-unlock function, as in a state 2919. The operation in the state 2919 may include an operation similar to that in the above-described state 2817 of FIG. 28.

In the case where the voice-unlock function has not been activated, the user equipment 2202 may output a lock screen, in a state 2921, and may determine whether unlock is performed, as in a state 2923. If unlock is performed, the user equipment 2202 may determine whether the voice command function result is of a specified type (e.g., a widget or text), as in a state 2925.

In the case where the voice command function result is of the specified type, the user equipment 2202 may output the specified type of information on the display, as in a state 2927. For example, the user equipment 2202 may output the voice command function result through a widget screen or a text screen. In the case where the voice command function result is not of the specified type, the user equipment 2202 may determine whether a parameter is required, as in a state 2929. In the case where the parameter is required, the user equipment 2202 may output a screen according to the input of an additional parameter, as in a state 2931. For example, the user equipment 2202 may have a status (partial landing) in which a screen requiring the input of an additional parameter is output in the process of outputting a plurality of execution screens. In the case where the parameter is not required, the user equipment 2202 may output the voice command function result according to a specified method, as in a state 2933. If an event for making a request to end the voice command function occurs, the user equipment 2202 may end the voice command function, as in a state 2935.

Figure 30:
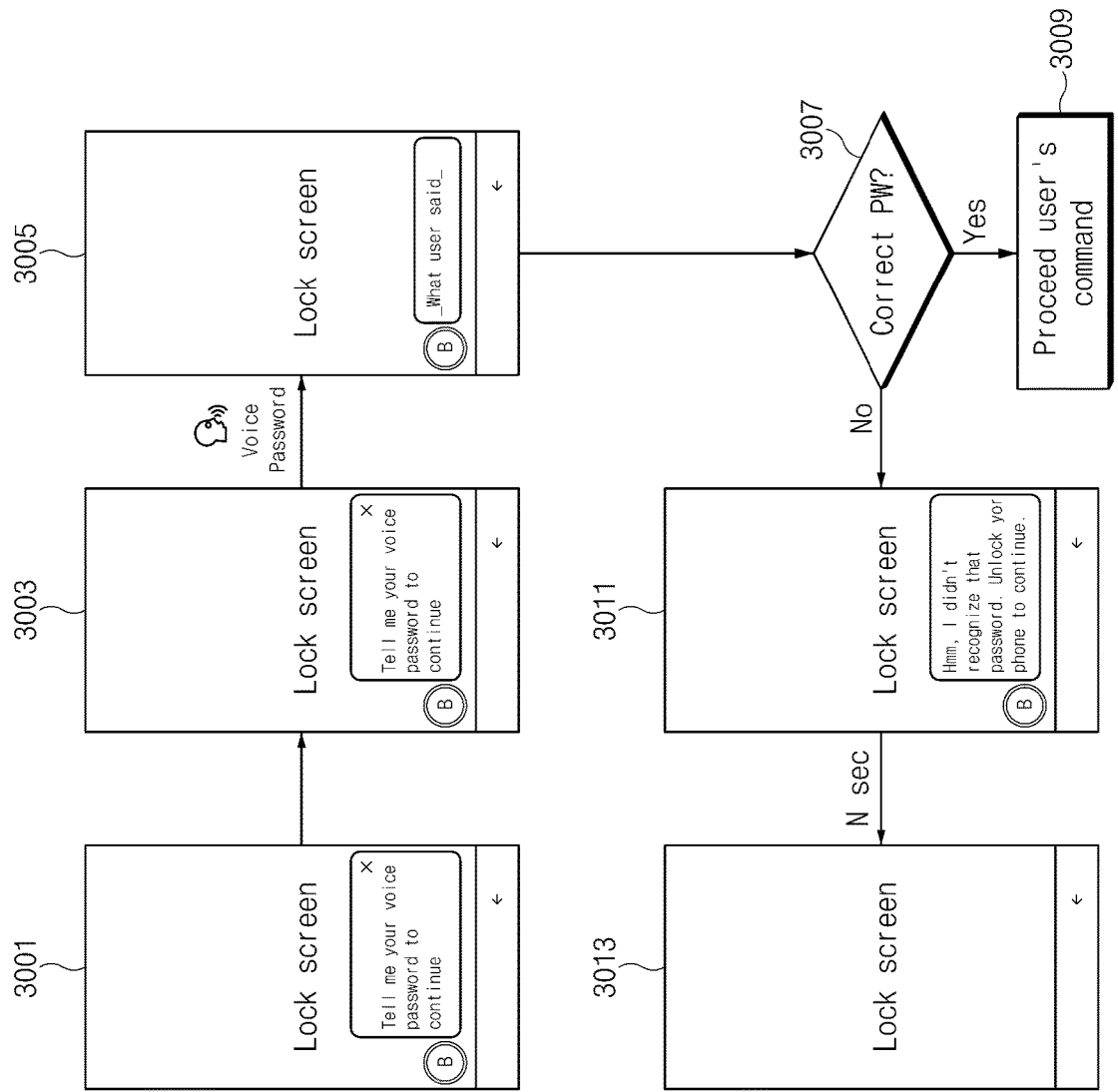
FIG. 30 is a diagram illustrating an example of executing a voice-unlock function, according to an embodiment of the present disclosure.

FIG. 30 is a diagram illustrating an example of executing a voice-unlock function, according to an embodiment of the present disclosure.

Referring to FIG. 30, if an event for making a request to execute a voice command function occurs (e.g., a physical button is pressed or speech information set to wake up the voice command function is collected), the user equipment 2202 may output a screen associated with executing the voice command function, as in a state 3001. In this operation, in the case where a voice-unlock function has been set, the user equipment 2202 may output a lock screen relating to voice unlock on the display, as illustrated in the drawing. The user equipment 2202 may output, on the display, information to request speech relating to voice unlock. Alternatively, the user equipment 2202 may output information to request speech relating to voice unlock in the form of audio.

After outputting information to request speech relating to voice unlock, the user equipment 2202 may be in a standby state for collecting (listening) speech information for voice unlock, as in a state 3003. If the speech information (a voice command) for voice unlock is collected, the user equipment 2202 may output, on the display, text information corresponding to the obtained speech information for voice unlock, as in a state 3005. In this regard, the user equipment 2202 may provide the speech information for voice unlock to the intelligent server 2201 and may receive and output text corresponding to the relevant speech information. Alternatively, the user equipment 2202 may perform speech recognition based on a local speech recognition DB and may output text corresponding to the speech recognition result.

In a state 3007, the user equipment 2202 may determine whether the obtained speech information for voice unlock agrees with registered authentication information. In this regard, the use equipment 2202 may store and manage authentication information for voice unlock in advance. If speech information for voice unlock or text corresponding thereto is obtained, the user equipment 2202 may compare the speech information or the text with the stored authentication information. In the case where the collected speech information agrees with the registered authentication information, the user equipment 2202 may perform the voice command function, as in a state 3009. For example, the user equipment 2202 may be in a standby state for collecting speech information relating to the voice command function. Alternatively, in the case where there is another speech information input together with the speech information for voice unlock, the user equipment 2202 may obtain a path rule corresponding to the relevant speech information from the intelligent server 2201 and may execute a function (the voice command function) according to the obtained path rule. In this operation, the user equipment 2202 may receive the path rule relating to the voice command function from the intelligent server 2201 or may store the received path rule while performing the voice-unlock function.

In the case where the collected speech information does not agree with the registered authentication information, the user equipment 2202 may output information that the speech information different from the authentication information has been collected, based on at least one of the display and the speaker, as in a state 3011. If a specified period of time passes, the user equipment 2202 may output a lock screen on the display, as in a state 3003. The state 3013 may include, for example, a state in which a lock screen relating to the voice unlock function is output. In the state 3013, the user equipment 2202 may forcibly end the voice command function according to the failure in voice unlock.

According to the above-described various embodiments, an electronic device according to an embodiment may include a display, a memory for storing at least one piece of information to be output on the display, an input unit comprising input circuitry configured to collect a voice input received from a user, and a processor electrically connected with the display, the input unit, and the memory. The processor, if requested to execute a voice command function in the state in which a voice lock function is set, may collect speech information, may receive a voice command function result corresponding to the speech information from an intelligent server, and may determine whether to release voice lock, depending on the type of voice command function result.

In the case where the voice command function result corresponds to information defined not to require voice unlock, the processor may output the voice command function result without voice unlock.

In the case where the voice command function result corresponds to information defined such that voice unlock is preliminarily performed, the processor may collect speech information for authentication for releasing the voice lock, and in the case where the speech information for authentication corresponds to authentication information stored in advance, the processor may release the voice lock and may output at least a part of the voice command function result.

In the case where a normal security function (e.g., pattern lock, number lock, or password lock) is set together with the voice lock function, the processor may release the lock of the normal security function when disabling the voice lock function. Additionally, in the case where a protective screen display function is set to remove a protective screen according to occurrence of a sweep event on a touch screen, the processor may remove the protective screen when disabling the voice lock function and may output a screen relating to the voice command function or a screen including at least a part of the voice command function result.

In the case where a face recognition function is set together with the voice lock function, the processor may release a lock setting of the face recognition function when disabling the voice lock function.

According to the above-described various embodiments, an electronic device according to an embodiment may include a display, a memory for storing at least one piece of information to be output on the display, an input unit comprising input circuitry configured to collect a voice input received from a user, and a processor electrically connected with the display, the input unit, and the memory. The processor may identify a locked state to release lock based on speech when receiving at least one of an execution signal and a user voice input associated with executing a voice command function that is executed based on the user's voice input, and if speech information corresponding to pre-stored authentication information for voice unlock or text corresponding to the speech information is collected, the processor may output at least a part of an execution result of the voice command function.

An operating method of user equipment (or an electronic device or a portable terminal) relating to a voice command function, according to various embodiments of the present disclosure, may include receiving an execution signal associated with executing the voice command function that is performed based on recognition of user speech, outputting a screen corresponding to a locked state based on a voice unlock function applied to the voice command function of an electronic device, collecting user speech information, and performing at least a part of the voice command function in the case where at least a part of the speech information agrees with pre-stored authentication information for voice unlock.

The method may further include receiving, from an intelligent server, a voice command function result for the remaining speech information other than speech information for voice unlock and outputting at least a part of the voice command function result received according to the voice unlock.

The terminology "module" used herein may refer, for example, to a unit including one of hardware, software, and firmware or any combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may, for example, and without limitation, include at least one of a dedicated processor, a CPU, an application-specific integrated circuit (ASIC) chip, field-programmable gate arrays (FPGAs), or a programmable-logic device, or the like, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples for illustrating and to aid in understanding but do not limit the present disclosure. Accordingly, it should be understood that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer instructions that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit (e.g., including a controller, processor, or the like) may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code may transform the general purpose computer into a special purpose computer for executing the processing shown herein. Any of the functions and steps provided in the Figures may be implemented in hardware, software or any combination thereof and may be performed in whole or in part within the programmed instructions of a computer. In addition, an artisan understands and appreciates that a "processor" or "microprocessor" may include hardware (e.g., circuitry) in the disclosure.

What is claimed is:

1. An electronic device comprising:
    a housing including a first surface, a second surface opposite the first surface, and side surfaces;
    a touch screen display exposed through the first surface;
    a wireless communication circuit disposed inside the housing;
    an input button exposed through one of the surfaces;
    a microphone exposed through the housing;
    a processor disposed inside the housing and electrically connected with the wireless communication circuit, the input button, the microphone, and the touch screen display; and
    a memory disposed inside the housing and electrically connected with the processor and including an interactive application having a first user interface,
    wherein the memory stores at least one instruction which, when executed by the processor, is configured to cause the electronic device to:
    maintain a locked state of the electronic device while a lock screen is being displayed on the touch screen display;
    receive, in the locked state, user authentication information through a biometric sensor;
    change the electronic device state to an unlocked state while the lock screen is output on at least a portion of the touch screen display;
    execute the interactive application in response to a first input received through at least one of the input button and the microphone;
    receive a request, from a user of the electronic device, through at least one of the touch screen display and the microphone after receiving the first input while the electronic device is unlocked;
    transmit first data relating to the request to a server through the wireless communication circuit;
    receive second data relating to at least one instruction from the server through the wireless communication circuit; and
    perform one or more of a plurality of sequential actions, corresponding to a voice command obtained from the point in time when a voice command function is executed to the point in time when the user's voice input is terminated, based on at least a part of the second data, and
    wherein performing the action includes:
    obtaining information representing a locked state of the electronic device;
    if the information representing the locked state of the electronic device corresponds to an unlocked state of the electronic device, performing each of the plurality of sequential actions based on an entire function execution state in which access to entire information, associated with the action, stored in the memory is allowed; and
    if the information representing the locked state of the electronic device corresponds to a locked state of the electronic device, performing only a portion of the plurality of sequential actions based on a partial function execution state in which access only to a part of the information stored in the memory is allowed and outputting a public hint in response to the execution of the voice command function if the locked state of the electronic device is a first type, and performing each of the plurality of sequential actions based on the entire function execution state and outputting the public hint and a private hint, including instructions associated with the user, in response to the execution of the voice command function, if the locked state of the electronic device is a second type, and outputting, on a screen, results corresponding to the voice command function based on the entire function execution state and information of the locked state type.

2. The electronic device of claim 1, wherein the processor is configured to output the result corresponding to the voice input again based on the entire function execution state if specified user authentication is completed in the partial function execution state.

3. An electronic device comprising:
    a display;
    a memory configured to store at least one piece of information to be output on the display;
    an input device comprising input circuitry configured to receive an input of an execution signal for executing a specified voice command function based on a voice input; and
    a processor electrically connected with the display, the input device, and the memory,
    wherein the processor is configured to:
    obtain information representing a locked state of the electronic device when receiving the execution signal and the voice input associated with executing the voice command function;
    when the information representing the locked state of the electronic device corresponds to an unlocked state of the electronic device, provide an entire function execution state of a function corresponding to the voice command function, wherein the function includes a path rule set to operate a plurality of sequential operations corresponding to a voice command obtained from the point in time when the voice command function is executed to the point in time when the voice input is terminated, and in the entire function execution state access to entire information, associated with the function, stored in the memory is allowed and each of the plurality of sequential operations are performed based on access to the entire information; and when the information representing the locked state of the electronic device corresponds to a locked state of the electronic device, determine a type of the locked state of the electronic device, when the locked state type of the electronic device is a first type, output a public hint and provide a partial function execution state of the function corresponding to the voice command function, wherein in the partial function execution state access only to a part of the information stored in the memory is allowed and only a portion of the plurality of sequential operations are performed based on access only to the part of the information, and when the locked state type of the electronic device is a second type, output the public hint and a private hint including instructions associated with a user and provide the entire function execution state of the function corresponding to the voice command function and output, on a screen, results corresponding to the voice command function based on the entire function execution state and information of the locked state type.

4. The electronic device of claim 3, wherein the processor is configured to output the result corresponding to the voice input based on the entire function execution state in a case where the display is in an unlocked state or has no lock setting.

5. The electronic device of claim 3, wherein the processor is configured to output the result corresponding to the voice input based on the entire function execution state if the display is in a locked state that is releasable by a gesture input.

6. The electronic device of claim 3, wherein the processor is configured to release the locked state in response to receiving the execution signal and to output the result corresponding to the voice input based on the entire function execution state if the display is in a locked state that is releasable by a gesture input.

7. The electronic device of claim 3, wherein the processor is configured to buffer at least a part of the result corresponding to the voice input if the display is in a locked state and to output the buffered result if the locked state is released.

8. The electronic device of claim 3, wherein the processor is configured to:
obtain information related to whether the result corresponding to the voice input has to be performed based on the entire function execution state; and
output guide information requesting user authentication in a case where the display is in a locked state and the result corresponding to the voice input has to be performed based on the entire function execution state.

9. The electronic device of claim 3, wherein the processor is configured to automatically perform user authentication and to provide any one of: the partial function execution state and the entire function execution state based on a result of the user authentication if the display is in a locked state.

10. The electronic device of claim 3, wherein the input device comprises:
a physical button associated with the input of the execution signal; and
a fingerprint sensor disposed inside the physical button or in an area adjacent to the physical button, and wherein the processor is configured to:
perform fingerprint authentication based on fingerprint information automatically detected when the execution signal is input; and
output the result corresponding to the voice input based on the entire function execution state when the fingerprint authentication is completed.

11. The electronic device of claim 3, further comprising:
a sensor configured to recognize an iris or a face,
wherein the processor is configured to:
perform user authentication by automatically recognizing iris and/or the face when the execution signal is input; and
output the result corresponding to the voice input based on the entire function execution state when the user authentication is completed.

12. The electronic device of claim 3, wherein the processor is configured to output information instructing a partial function execution state of the voice command function while maintaining at least a part of a lock screen if the display is in a locked state.

13. The electronic device of claim 3, wherein the processor is configured to release a lock setting and to output information instructing an entire function execution state of the voice command function with a specified screen in a background if specified user authentication is completed while the display is locked.

14. An operating method for function execution based on a voice command in a locked state, the method comprising:
receiving an execution signal associated with executing a voice command function performed based on a voice input;
obtaining information representing a locked state of an electronic device when the execution signal is received;
when the information representing the locked state of the electronic device corresponds to an unlocked state of the electronic device, providing an entire function execution state of a function corresponding to the voice command function, wherein the function includes a path rule set to operate a plurality of sequential operations corresponding to a voice command obtained from the point in time when the voice command function is executed to the point in time when the voice input is terminated and in the entire function execution state access to entire information, associated with the function, stored in a memory is allowed and each of the plurality of sequential operations are performed based on access to the entire information; and when the information representing the locked state of the electronic device corresponds to a locked state of the electronic device, determining a type of the locked state of the electronic device, when the locked state type of the electronic device is a first type, outputting a public hint and providing a partial function execution state of the function corresponding to the voice command function, wherein in the partial function execution state to only a part of the information stored in the memory is allowed and only a portion of the plurality of sequential operations are performed based on access only to the part of the information, when the locked state type of the electronic device is a second type, outputting the public hint and a private hint including instructions associated with a user and providing the entire function execution state of the function corresponding to the voice command function and outputting information of the locked state type and the result corresponding to the voice input based on the entire function execution state if a display of the electronic device is in an unlocked state or has no lock setting.

15. The method of claim 14, wherein the receiving of the execution signal includes at least one of:
   detecting pressing of a physical button in relation to executing the voice command function; and
   obtaining voice corresponding to a specified word based on an activated microphone.

16. The method of claim 14, wherein the providing of the entire function execution state or the partial function execution state includes:
   outputting the result corresponding to the voice input based on the partial function execution state if a display of the electronic device is in a locked state.

17. The method of claim 14, further comprising, when the electronic device is in the locked state, determining whether the electronic device is situated at a specified location, determining that the locked state type of the electronic device is the second type based on determining that the electronic device is situated at a specified location, and determining that the locked state type of the electronic device is the first type based on determining that the electronic device is not situated at a specified location.

* * * * *